(12) United States Patent
Tsukimawashi et al.

(10) Patent No.: US 7,342,070 B2
(45) Date of Patent: Mar. 11, 2008

(54) CONJUGATED DIOLEFIN (CO)POLYMER RUBBER, PROCESS FOR PRODUCING (CO)POLYMER RUBBER, RUBBER COMPOSITION, COMPOSITE, AND TIRE

(75) Inventors: Keisuke Tsukimawashi, Mie (JP); Naokazu Kobayashi, Mie (JP); Tsukasa Toyoshima, Mie (JP); Toshihiro Tadaki, Mie (JP); Kouta Taniguchi, Mie (JP)

(73) Assignee: JSR Corporation, Tokyo (JP)

( * ) Notice: Subject to any disclaimer, the term of this patent is extended or adjusted under 35 U.S.C. 154(b) by 481 days.

(21) Appl. No.: 10/490,847

(22) PCT Filed: Sep. 25, 2002

(86) PCT No.: PCT/JP02/09831

§ 371 (c)(1),
(2), (4) Date: Mar. 26, 2004

(87) PCT Pub. No.: WO03/029299

PCT Pub. Date: Apr. 10, 2003

(65) Prior Publication Data

US 2004/0254301 A1    Dec. 16, 2004

(30) Foreign Application Priority Data

Sep. 27, 2001  (JP)  ............... 2001-297687
Jun. 14, 2002  (JP)  ............... 2002-174067
Jun. 14, 2002  (JP)  ............... 2002-174902
Jun. 17, 2002  (JP)  ............... 2002-175300
Jun. 20, 2002  (JP)  ............... 2002-179342
Jul. 19, 2002  (JP)  ............... 2002-210398

(51) Int. Cl.
*C08F 8/30* (2006.01)
*C08F 136/04* (2006.01)
*C08K 3/36* (2006.01)

(52) U.S. Cl. ............... 525/105; 525/102; 525/342; 526/178; 526/180; 526/335; 526/340; 524/443; 524/572; 152/905

(58) Field of Classification Search ............... 525/102, 525/105, 342; 526/178, 338, 180, 335, 340; 524/443, 572; 152/905
See application file for complete search history.

(56) References Cited

U.S. PATENT DOCUMENTS

| | | | |
|---|---|---|---|
| 5,508,333 A * | 4/1996 | Shimizu | 524/424 |
| 5,652,310 A | 7/1997 | Hsu et al. | |
| 5,821,290 A * | 10/1998 | Labauze | 524/188 |
| 6,111,045 A * | 8/2000 | Takagishi et al. | 526/338 |
| 6,362,272 B1 * | 3/2002 | Tadaki et al. | 524/555 |
| 2004/0254301 A1 | 12/2004 | Tsukimawashi et al. | |

FOREIGN PATENT DOCUMENTS

JP    2001-131229    5/2001

OTHER PUBLICATIONS

U.S. Appl. No. 10/591,279, filed Aug. 31, 2006, Kobayashi, et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

Disclosed are a conjugated diolefin (co) polymer rubber formed from either a conjugated diolefin or a conjugated diolefin and an aromatic vinyl compound, wherein the (co) polymer rubber has a primary amino group and an alkoxysilyl group which are bonded to a (co) polymer chain; a process for producing the same; a rubber composition; a composite; and a tire. The (co) polymer rubber has satisfactory processability, and can give an automotive tire tread having a balance among wear resistance, failure characteristics, low hysteresis loss and wet-skid characteristics.

29 Claims, No Drawings

CONJUGATED DIOLEFIN (CO)POLYMER RUBBER, PROCESS FOR PRODUCING (CO)POLYMER RUBBER, RUBBER COMPOSITION, COMPOSITE, AND TIRE

TECHNICAL FIELD

The present invention relates to a conjugated diolefin (co)polymer rubber, a process for producing the same, a rubber composition and a tire. More particularly, the present invention relates to a conjugated diolefin-based (co)polymer rubber which can provide an automotive tire tread having good processability and a balance among wear resistance, failure characteristics, low hysteresis loss and wet-skid characteristics, a process for producing the same, a rubber composition and a tire.

Further, the present invention relates to a conjugated diolefin (co)polymer rubber having improved cold flow properties and an excellent balance among various characteristics, a process producing the same, etc.

Still further, the present invention relates to a conjugated diolefin (co)polymer rubber in which the Moony viscosity of the resulting rubber is stable and small in changes with time, a process for producing the same, a rubber composition and a tire.

Yet still further, the present invention relates to a rubber-inorganic compound composite in which an inorganic compound (inorganic filler) for various rubbers is mixed with a novel conjugated diolefin (co)polymer rubber to form a masterbatch.

BACKGROUND ART

With a recent demand for a reduction in fuel consumption of automobiles, a conjugated diolefin-based (co)polymer rubber having low rolling resistance, and excellent wear resistance and failure characteristics, and also having steering stability represented by wet-skid resistance has been desired as a rubber material for tires.

In order to reduce the rolling resistance of a tire, the hysteresis loss of vulcanized rubber may be lowered. As indexes for the evaluation of vulcanized rubber, impact resilience at 50 to 80° C., tan δ at 50 to 80° C., Goodrich heat build-up, and the like are used. A rubber material having either high impact resilience at 50 to 80° C., or low tan δ at 50 to 80° C. or low Goodrich heat build-up is preferred.

As a rubber material having low hysteresis loss, natural rubber, polyisoprene rubber, polybutadiene rubber or the like is known. However, they have the problem of low wet-skid resistance.

As for the reducing of the hysteresis loss without impairing the wet-skid resistance, a method was proposed, wherein a functional group was introduced into a terminal of a styrene-butadiene copolymer which was polymerized by use of an organic lithium initiator in a hydrocarbon solvent and had a variety of structure. There are known a styrene-butadiene copolymer obtained by modifying or coupling a terminal of a polymer with a tin compound (Japanese Patent Laid-Open Publication (Sho) 57-55912) and a styrene-butadiene copolymer obtained by modifying a terminal of a polymer with an isocyanate compound or the like (Japanese Patent Laid-Open Publication (Sho) 61-141741). These modified polymers exert the effects of reducing the hysteresis loss without impairing the wet-skid resistance and providing excellent wear resistance and failure characteristics, particularly in a composition comprising carbon black as a reinforcing agent.

On the other hand, there has recently been proposed a method of using as a rubber material for tires a rubber composition comprising silica or a mixture of silica and carbon black as a reinforcing agent. A tire tread comprising silica or a mixture of silica and carbon black has low rolling resistance and excellent steering stability represented by wet-skid resistance. On the other hand, the tire tread has the problem that the tensile strength and wear resistance of a vulcanizate are low. The above-mentioned modified styrene-butadiene copolymer becomes a rubber material for tires having excellent wear resistance and failure characteristics in the composition using carbon black as the reinforcing agent. However, in the composition using silica as the reinforcing agent, the improving effect thereof is small.

In order to improve the tensile strength and wear resistance of the vulcanizate comprising silica or a mixture of silica and carbon black as the reinforcing agent, rubber compositions each containing a polymer into which a functional group having an affinity for silica is introduced have been proposed. Japanese Patent Examined Publication (Sho) 49-36957 proposes a method of reacting a silicon tetrahalide, a trihalosilane, etc. to produce a polymer. Further, Japanese Patent Examined Publication (Sho) 52-5071 discloses a method for producing a polymer modified with a silane halide compound. Furthermore, Japanese Patent Laid-Open Publication (Hei) 1-188501 discloses an alkylsilyl group-introduced diene-based rubber, and Japanese Patent Laid-Open Publication (Hei) 5-230286 discloses a silyl halide group-introduced diene-based rubber. In addition, Japanese Patent Laid-Open Publication (Hei) 7-233217 discloses a diene-based rubber into which a tertiary amino group and an alkoxysilyl group is introduced.

The physical properties are improved to a certain degree by using each of these modified polymers in the composition comprising silica or a mixture of silica and carbon black. However, the tensile strength and wear resistance of the vulcanizate are not sufficiently improved yet. In particular, when a mixture of silica and carbon black is incorporated, a reduction in hysteresis loss is also insufficient with an increase in the ratio of carbon black. Further, in general, a silica-containing composition is inferior in processability to a carbon black-containing composition, which poses the problem of high processing cost. When the above-mentioned polymer into which a functional group having an affinity for silica is introduced is used, the processability thereof is unfavorably apt to deteriorate.

Modified polymers which have hitherto been known are mainly classified into two types, polymers suitable for carbon black mixing and polymers suitable for silica mixing. When the kind of reinforcing agent is changed in producing a tire etc., it has been necessary to select a rubber to be used again. Further, when a mixture of silica and carbon black is contained, even the use of either of the types of modified polymers has increased or decreased the effect thereof in correlation with the mixing ratio of silica to carbon black.

In both the carbon black mixing and the silica mixing, amino group-introduce polymers are conceivable as effective modified polymers. For the carbon black mixing, there are proposed (1) polymers each having an amino group introduced into a polymerization terminal by use of a lithium amide initiator (refer to Japanese Patent Laid-Open Publication (Sho) 59-38209, Japanese Patent Examined Publication (Hei) 5-1298, Japanese Patent Laid-Open Publication (Hei) 6-279515, Japanese Patent Laid-Open Publication (Hei) 6-199923 and Japanese Patent Laid-Open Publication (Hei) 7-53616) and (2) polymers each obtained by modifying a polymer terminal of a styrene-butadiene copolymer which is polymerized by use of an organic lithium initiator and has a variety of structure with a nitrogen-containing compound such as a urea compound (refer to Japanese Patent Laid-Open Publication (Sho) 61-27338), a dialkyl aminobenzophenone compound (refer to Japanese Patent Laid-Open Publication (Sho) 58-162604 and Japanese Patent Laid-Open Publication (Sho) 58-189203) or a lactam compound (Japanese Patent Laid-Open Publication (Sho) 61-43402). Further, as polymers for silica mixing, amino group-introduced diene-based rubbers are proposed in Japanese Patent Laid-Open Publication (Hei) 1-101344, Japanese Patent Laid-Open Publication (Sho) 64-22940 and Japanese Patent Laid-Open Publication (Hei) 9-71687.

The polymers obtained by these methods have achieved the improvements of various characteristics to a certain degree. However, the above-mentioned literatures mainly describe in detail the methods for introducing amino groups into the polymers, but make reference to nothing more than general matters with respect to the relationship between the structure of the polymer itself and each performance.

Further, these diene-based rubbers into which amino groups etc. are introduced also have high cold flow properties in some cases, and have trouble with storage stability etc., thus practically having problems.

Furthermore, there is generally known a method of polymerizing a conjugated diolefin alone or an aromatic vinyl compound therewith in the presence of an anionic polymerization initiator, and coupling the resulting living polymer using a silicon halide compound such as tetrachlorosilane as a coupling agent to produce a branched conjugated diolefin (co)polymer rubber useful for automobile tires etc. However, such a coupling agent contains a halogen atom as a reactive site, and produces a halogen-containing compound such as LiCl as a by-product after the coupling reaction. On the other hand, it has been desired that a halide existing in a rubber is reduced.

For this purpose, various coupling agents of the non-halogen family have been proposed. For example, there is proposed a method for producing a conjugated diene-based polymer having a specific branched structure, using an alkoxysilane as the coupling agent (Japanese Patent Laid-Open Publication (Hei) 7-2958).

However, when the alkoxysilane is used as the coupling agent, the resulting branched conjugated diolefin (co)polymer rubber has the problem not observed in the coupling reaction with a conventional polysilicon halide compound that a polymer component having a structure other than a desired branched structure is formed with an elapse of time.

In order to solve this problem, Japanese Patent Laid-Open Publication (Hei) 10-25313 proposes a method of polymerizing a conjugated diene-based monomer using an organic lithium compound as an initiator in a hydrocarbon solvent to produce a living polymer, and coupling it using an alkoxysilane compound, followed by treatment by addition of at least one kind of Lewis base selected from a tertiary diamine, a chain ether having two or more oxygen atoms in one molecule or a cyclic ether to the above-mentioned hydrocarbon solvent, as a method for producing a halogen-free branched conjugated diene-based polymer effectively and stably.

However, also in this method, the Mooney viscosity of the resulting polymer is not stabilized, and it is difficult to restrain the change in the Mooney viscosity of the polymer with an elapse of time.

In recent years, needs for granular rubber chemical masterbatches etc. in the market have become strong from the following background.

(a) From the aspect of the working environment in workplaces, scattering of fine powdery rubber chemicals etc. is prevented.

(b) Rubber chemicals to be added to rubber compositions can be mixed for a short period of time, and are excellent in dispersibility in the compositions.

(c) It is possible to automatically measure the rubber compositions.

In order to solve the above (a) and (b), for example, sheet-like rubber chemical masterbatches using usual rubbers and rubber chemicals treated with oil have hitherto been known. However, from the automatic metering of the rubber chemicals and handling advantages, demands for granular chemical masterbatches have recently been increased.

As technology relating to the rubber chemical masterbatch, Japanese Patent Laid-Open Publication (Hei) 1-223130 proposes a rubber compounding agent composition comprising three components of a rubber chemicals, a rubber and an ethylene-vinyl acetate copolymer, and an oil. However, depending on the type of the rubber chemicals or the composition ratio of three components, the composition has adhesion, and has a problem with regard to processing or storage of the composition. For example, when a sheet-like masterbatch is produced, sheeting is performed with rolls. In this case, when the adhesion of the composition is high, the sheet adheres to the rolls, resulting in poor release properties, which causes significantly impaired workability in some cases. Further, a mixed composition as described above is formed by granulation with an extrusion granulator in some cases, in order to rationalize the metering. When the adhesion of the composition is high, granules adhere to one another by their own weight (blocking) during storage of a granulated product to form a block, thereby impairing their function in some cases. In particular, this tendency is significant in storage at a summer season when the outdoor air temperature is elevated.

On the other hand, Japanese Patent Laid-Open Publication (Sho) 53-41342 describes that a rubber is selected as a binder and a process oil for rubber is selected as an oil in producing a masterbatch according to a composition comprising the rubber, a vulcanization accelerator, etc. However, this masterbatch has the problem of the adhesion of itself, and has the problem of the above-mentioned blocking.

In order to solve the above-mentioned problems, Japanese Patent Laid-Open Publication (Hei) 7-224188 proposes a rubber-plastic chemical masterbatch comprising (a) rubber-plastic chemicals, (b) 1,2-polybutadiene and (c) a softening agent as indispensable components, maintaining a good shape which is the intended purpose of the masterbatch, further preventing the adhesion of a composition without impairing good dispersibility in a rubber, a elastomer or a plastic, and improving roll processability or blocking properties during storage. However, this masterbatch has insufficient fluidity, insufficient dispersibility of various chemicals, and it is difficult to disperse the chemicals in the masterbatch in large amount. Further, a technique is required for preparing the masterbatch, and the preparation takes a long period of time.

Additionally, the technical idea that an affinity for an inorganic filler is intended by giving a specific functional group to a rubber component itself used in a masterbatch is not found in the above-mentioned prior art.

An object of the present invention is to provide a conjugated diolefin (co)polymer rubber having good processability in both carbon black mixing and silica mixing, and usable as a material for a tread of a tire for low fuel consumption, a large sized tire or a high performance tire in which low hysteresis loss properties and wet-skid characteristics are improved at the same time without impairing wear resistance and failure characteristics, or low hysteresis loss properties, wear resistance and failure characteristics are improved at the same time in a balanced manner without impairing wet-skid characteristics; a process for producing the same; a rubber composition; and a tire.

Another object of the present invention is to provide a conjugated diolefin (co)polymer rubber further improved also in cold flow properties; a process for producing the same, etc.

Still another object of the present invention is to provide a conjugated diolefin (co)polymer rubber in which the conjugated diolefin (co)polymer rubber having alkoxysilyl groups bound to a (co)polymer chain can be stably produced with respect to Mooney viscosity, and the subsequent variation in Mooney viscosity with the elapse of time can also be restrained; a process for producing the same; etc.

A further object of the present invention is to provide a rubber-inorganic compound composite giving a high-performance masterbatch in which a rubber chemical, particularly an inorganic compound, can be dispersed uniformly and in large amounts, using a novel conjugated diolefin (co)polymer rubber having a specific functional group and an affinity for an inorganic compound (inorganic filler), and which can be easily prepared by ordinary rubber kneading technology. A still further object of the present invention is to provide a masterbatch having more excellent characteristics by uniform dispersion of an inorganic compound.

DISCLOSURE OF THE INVENTION

The present inventors have made intensive studies in view of the present situation as described above. As a result, the present invention has been attained by a conjugated diolefin (co)polymer rubber, a process for producing a (co)polymer rubber, a rubber composition, a composite and a tire having the following constitutions:

1. A conjugated diolefin (co)polymer rubber (hereinafter also referred to as "copolymer rubber (i)") formed from either a conjugated diolefin or a conjugated diolefin and an aromatic vinyl compound, wherein the (co)polymer rubber has a primary amino group and an alkoxysilyl group which are bonded to a (co)polymer chain;

2. The conjugated diolefin (co)polymer rubber described in the above 1, wherein the content of the primary amino group is from 0.5 to 200 mmol/kg of (co)polymer rubber polymer, and the content of the alkoxysilyl group is from 0.5 to 200 mmol/kg of (co)polymer rubber polymer;

3. The conjugated diolefin (co)polymer rubber described in the above 1 or 2, which is represented by the following formula (1) or (2):

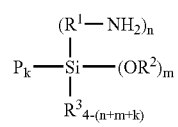

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

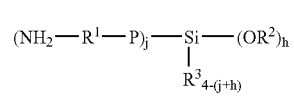

wherein P, $R^1$, $R^2$ and $R^3$ have the same definitions as given for the above-mentioned formula (1), j is an integer of 1 to 3, and h is an integer of 1 to 3, with the proviso that j+h is an integer of 2 to 4;

4. The conjugated diolefin (co)polymer rubber described in any one of the above 1 to 3, wherein (1) the content of polymerization units of the aromatic vinyl compound is from 0% by weight to less than 5% by weight based on the (co)polymer rubber, the content of polymerization units of the conjugated diolefin is from more than 95% by weight to 100% by weight based on the (co)polymer rubber, and the content of polymerization units of a copolymerizable third monomer is from 0% by weight to less than 25% by weight based on the (co)polymer rubber, and (2) the vinyl bond content is 10 mol % or more based on the polymerization units of the conjugated diolefin;

5. The conjugated diolefin copolymer rubber described in any one of the above 1 to 3, wherein (1) the content of polymerization units of the aromatic vinyl compound is from 5% by weight to less than 30% by weight based on the copolymer rubber, the content of polymerization units of the conjugated diolefin is from more than 70% by weight to 95% by weight based on the copolymer rubber, and the content of polymerization units of a copolymerizable third monomer is from 0% by weight to less than 25% by weight based on the copolymer rubber, and (2) the vinyl bond content is 50 mol % or more based on the polymerization units of the conjugated diolefin;

6. The conjugated diolefin copolymer rubber described in any one of the above 1 to 3, wherein (1) the content of polymerization units of the aromatic vinyl compound is from 30 to 50% by weight based on the copolymer rubber, the content of polymerization units of the conjugated diolefin is from 50 to 70% by weight based on the copolymer rubber, and the content of polymerization units of a copolymerizable third monomer is from 0 to 20% by weight based on the copolymer rubber, and (2) the vinyl bond content is from 15 to 50 mol % based on the polymerization units of the conjugated diolefin;

7. The conjugated diolefin copolymer rubber described in any one of the above 1 to 3, wherein (1) the content of polymerization units of the aromatic vinyl compound is from 5% by weight to 60% by weight based on the copolymer rubber, (3) the content of an aromatic vinyl compound single chain having one polymerization unit of the aromatic vinyl compound is less than 40% by weight based on the total bonded aromatic vinyl compound, and (4) the content of an aromatic vinyl compound long chain having 8 or more continuous aromatic vinyl compound units is 10% by weight or less based on the total bonded aromatic vinyl compound;

8. The conjugated diolefin (co)polymer rubber described in any one of the above 1 to 7, which has a weight average molecular weight of 150,000 to 2,000,000;

9. The conjugated diolefin (co)polymer rubber described in any one of the above 1 to 8, wherein the molecular weight distribution measured by GPC is polymodal;

10. The conjugated diolefin (co)polymer rubber described in any one of the above 1 to 8, wherein the molecular weight distribution measured by GPC is monomodal, and the ratio (Mw/Mn) of the weight average molecular weight (Mw) to the number average molecular weight (Mn) is from 1.3 to 4.0;

11. The conjugated diolefin (co)polymer rubber described in any one of the above 1 to 10, wherein a bifunctional or higher functional monomer is copolymerized in the (co) polymer chain, and/or at least part of the (co)polymer chains are coupled by use of a bifunctional or higher functional coupling agent;

12. The conjugated diolefin (co)polymer rubber described in the above 10, wherein the content of polymerization units of the bifunctional or higher functional monomer is from 0.001 to 5% by weight based on the (co)polymer rubber;

13. The conjugated diolefin (co)polymer rubber described in the above 11 or 12, wherein the bifunctional or higher functional coupling agent is a tin compound;

14. The conjugated diolefin (co)polymer rubber described in any one of the above 1 to 13, which contains a compound residue derived from a compound having two or more alkoxysilyl groups on the same carbon atom;

15. A conjugated diolefin (co)polymer rubber (hereinafter also referred to as "(co)polymer rubber (ii)") obtained from either a conjugated diolefin or a conjugated diolefin and an aromatic vinyl compound, wherein the (co)polymer rubber contains an alkoxysilyl group bonded to a (co)polymer chain, and a compound residue derived from a compound having two or more alkoxysilyl groups on the same carbon atom;

16. A process for producing the conjugated (co)polymer rubber described in any one of the above 1 to 6 and 8 to 14, which comprises polymerizing either a conjugated diolefin or a conjugated diolefin and an aromatic vinyl compound in a hydrocarbon solvent by anionic polymerization using at least one compound selected from the group consisting of an organic alkali metal and an organic alkali earth metal as an initiator, then reacting a polymerization active terminal thereof with at least one amino group-containing alkoxysilane compound represented by the following formula (3) or (4), and thereafter conducting hydrolysis:

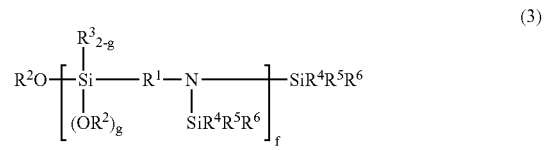

wherein $R^1$, $R^2$ and $R^3$ have the same definitions as given for the above-mentioned formula (1), $R^4$, $R^5$ and $R^6$ are each independently an alkyl group or aryl group having 1 to 20 carbon atoms, or two of them may combine with each other to form a ring together with silicon atoms to which they are bonded, g is an integer of 1 or 2, and f is an integer of 1 to 10,

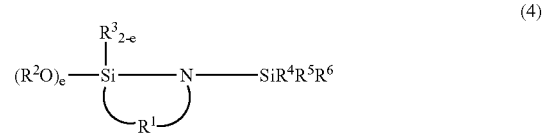

wherein $R^1$, $R^2$ and $R^3$ have the same definitions as given for the above-mentioned formula (1), $R^4$, $R^5$ and $R^6$ have the same definitions as given for the above-mentioned formula (3), and e is an integer of 1 or 2;

17. A process for producing the conjugated diolefin copolymer rubber described in the above 7, which comprises, in polymerizing a conjugated diolefin and an aromatic vinyl compound in a hydrocarbon solvent by anionic polymerization using at least one compound selected from the group consisting of an organic alkali metal and an organic alkali earth metal as an initiator, using (a) at least one potassium salt selected from the group consisting of a potassium alkoxide, a potassium phenoxide, a potassium salt of an organic carboxylic acid, a potassium salt of an organic sulfonic acid and a potassium salt of an organic phosphorous acid partial ester in an amount of 0.01 to 0.5 mole per gram atom of the organic alkali metal and/or the organic alkali earth metal and (b) at least one selected from the group consisting of an alcohol, a thioalcohol, an organic carboxylic acid, an organic sulfonic acid, an organic phosphorous acid, a primary amine and a secondary amine in an amount of 0.1 to 5 moles per mole of (a) the potassium salt and in an amount of 0.1 mole or less per gram atom of the organic alkali metal and/or the organic alkali earth metal, reacting a polymerization active terminal thus obtained with at least one amino group-containing alkoxysilane compound represented by the above-mentioned formula (3) or (4), and thereafter conducting hydrolysis;

18. A process for producing the conjugated diolefin copolymer rubber described in the above 14 or 15 comprising polymerizing either a conjugated diolefin or a conjugated diolefin and an aromatic vinyl compound in a hydrocarbon solvent by anionic polymerization using at least one compound selected from the group consisting of an organic alkali metal and an organic alkali earth metal as an initiator, and then reacting a polymerizable active terminal thereof with an alkoxysilane-based compound to produce a conjugated diolefin (co)polymer rubber having an alkoxysilyl group bonded to a (co)polymer chain, wherein a compound having two or more alkoxyl groups on the same carbon atom, which is represented by the following formula (5) or (6), is added to conduct treatment:

$$R^1{}_n CH_m (OR^2)_k \qquad (5)$$

wherein $R^1$ and $R^2$, which may be the same or different, and each of which may be the same or different when pluralities of $R^1$'s and $R^2$'s are present, are each an alkyl group having 1 to 20 carbon atoms, an aryl group, a vinyl group or an alkyl halide group, n is an integer of 0 to 2, m is an integer of 0 to 2, and k is an integer of 2 to 4, with the proviso that n+m+k is 4,

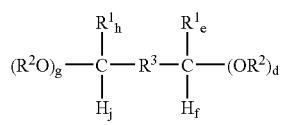

(6)

wherein $R^1$ and $R^2$ have the same definitions as given for the above-mentioned formula (5), $R^3$'s an alkylene group having 1 to 12 carbon atoms, h is an integer of 0 or 1, j is an integer of 0 or 1, and g is an integer of 2 or 3, with the proviso that h+j+g is 3, f is an integer of 0 or 1, e is an integer of 0 or 1, and d is an integer of 2 or 3, with the proviso that f+e+d is 3;

19. The process for producing a conjugated diolefin (co)polymer rubber described in the above 18, wherein the above-mentioned alkoxysilane-based compound is an amino group-containing alkoxysilane compound;

20. A process for producing a conjugated diolefin (co) polymer rubber, which comprises polymerizing either a conjugated diolefin or a conjugated diolefin and an aromatic vinyl compound in a hydrocarbon solvent by anionic polymerization using a lithium amide initiator represented by the following formula (7) or (8):

$$(R^4 R^5 R^6 Si)_2\text{—}N\text{—}R^1\text{—}Li \qquad (7)$$

wherein $R^1$ has the same definition as given for the above-mentioned formula (1), and $R^4$, $R^5$ and $R^6$ have the same meanings as given for the above-mentioned formula (3),

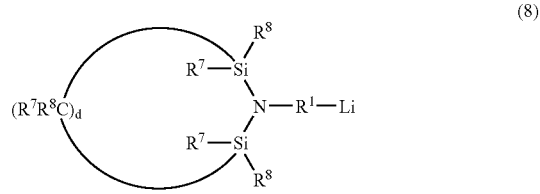

wherein $R^1$ has the same definition as given for the above-mentioned formula (1), $R_7$ and $R_8$ are each independently hydrogen, an alkyl group having 1 to 20 carbon atoms or an aryl group, and d is an integer of 1 to 7, then, reacting a polymerizable active terminal thereof with a compound represented by the following formula (9):

wherein $R_2$ and $R_3$ have the same definitions as given for the above-mentioned formula (1), X is a halogen atom, c is an integer of 0 to 2, and b is an integer of 1 to 4, with the proviso that c+b is an integer of 2 to 4, and thereafter conducting hydrolysis;

21. A process for producing the conjugated diolefin copolymer rubber described in the above 7, which comprises, in polymerizing a conjugated diolefin and an aromatic vinyl compound in a hydrocarbon solvent by anionic polymerization using the lithium amide initiator represented by the above-mentioned formula (7) or (8), using (a) at least one potassium salt selected from the group consisting of a potassium alkoxide, a potassium phenoxide, a potassium salt of an organic carboxylic acid, a potassium salt of an organic sulfonic acid and a potassium salt of an organic phosphorous acid partial ester in an amount of 0.01 to 0.5 mole per gram atom of an organic alkali metal and/or an organic alkali earth metal and (b) at least one selected from the group consisting of an alcohol, a thioalcohol, an organic carboxylic acid, an organic sulfonic acid, an organic phosphorous acid, a primary amine and a secondary amine in an amount of 0.1 to 5 moles per mole of (a) the potassium salt and in an amount of 0.1 mole or less per gram atom of the organic alkali metal and/or the organic alkali earth metal, reacting a polymerizable active terminal thus obtained with an alkoxysilane compound represented by the above-mentioned formula (9), and thereafter conducting hydrolysis;

22. An oil-extended (co)polymer rubber containing an extender oil in an amount of 10 to 100 parts by weight based on 100 parts by weight of the conjugated diolefin (co) polymer rubber described in any one of the above 1 to 15;

23. The oil-extended (co)polymer rubber described in the above 22, wherein the viscosity gravity constant (V. G. C) of the extender oil is from 0.790 to 1.100;

24. A rubber composition containing a filler in an amount of 20 to 120 parts by weight based on 100 parts by weight of all rubber components comprising the conjugated diolefin (co)polymer rubber described in any one of the above 1 to 15 in an amount of 30% by weight or more based on all rubber components;

25. The rubber composition described in the above 24, wherein at least 1 part by weight of the above-mentioned filler is silica, and the rubber composition further contains a silane coupling agent in an amount of 0.5 to 20% by weight based on the silica;

26. A rubber-inorganic compound composite containing (I) the conjugated diolefin (co)polymer rubber described in any one of the above 1 to 15 and (II) an inorganic compound;

27. The rubber-inorganic compound composite described in the above 26, wherein inorganic compound (II) is blended in an amount of 1 to 1,000 parts by weight based on 100 parts by weight of component (I);

28. The rubber-inorganic compound composite described in the above 26 or 27, wherein inorganic compound (II) is at least one selected from the group consisting of silica, carbon black and a compound represented by the following formula (10):

$$vM^1 \cdot wM^2 \cdot xSiO_y \cdot zH_2O \cdot nA \qquad (10)$$

wherein M1 represents Na or K, M2 is at least one metal selected from Mg, Fe, Al, Ti Mn and Ca, a metal oxide or a metal hydroxide, A represents F or Cl, and v, w, x, y, z and n are a number of 0 to 1, a number of 1 to 5, a number of 0 to 10, a number of 2 to 5, 0 to 10 and a number of 0 to 2, respectively; and 29. A tire in which the rubber composition described in the above 24 and/or 25 is used in a tread member or a sidewall member.

BEST MODE FOR CARRYING OUT THE INVENTION

Copolymer Rubber (i)

Copolymer rubber (i) of the present invention is a (co)polymer obtained by (co)polymerizing either a conjugated diolefin or a conjugated diolefin and an aromatic vinyl compound, and characterized in that the (co)polymer rubber has a primary amino group and an alkoxysilyl group which are bonded to a (co)polymer chain.

The content of the primary amino group bonded to the (co)polymer rubber is preferably from 0.5 to 200 mmol/kg of (co)polymer rubber polymer. The content is more preferably from 1 to 100 mmol/kg of (co)polymer rubber polymer, and particularly preferably from 2 to 50 mmol/kg of (co)polymer rubber polymer. The (co)polymer rubber polymer as used herein means the weight of only a polymer not containing additives such as an antioxidant added during production or after production.

The primary amino group may be bonded to any of a polymerization initiating terminal, a polymerization terminating terminal, a main chain of the (co)polymer and a side chain, as long as it is bonded to the (co)polymer chain. However, the primary amino group is preferably introduced to the polymerization initiating terminal or the polymerization terminating terminal, in that the disappearance of energy at a (co)polymer terminal is inhibited to improve hysteresis loss characteristics.

Further, when the number of the primary amino groups bonded to the polymer chain exceeds 200 mmol/kg of (co)polymer rubber polymer, an interaction with the reinforcing agent such as carbon black or silica becomes too high. As a result, compounding viscosity increases to deteriorate processability. On the other hand, when the number of the primary amino groups is less than 0.5 mmol/kg of (co)polymer rubber polymer, the effect of introduction of the primary amino group becomes difficult to appear. That is to say, improvements in the hysteresis loss characteristics, wear resistance and failure characteristics of the resulting (co)polymer rubber are unfavorably insufficient.

Further, the content of the alkoxysilyl group bonded to the polymer chain of the (co)polymer rubber is preferably from 0.5 to 200 mmol/kg of (co)polymer rubber polymer. The content is more preferably from 1 to 100 mmol/kg of (co)polymer rubber polymer, and particularly preferably from 2 to 50 mmol/kg of (co)polymer rubber polymer.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

Further, when the number of the alkoxysilyl groups bonded to the polymer chain exceeds 200 mmol/kg of (co)polymer rubber polymer, an interaction with the reinforcing agent such as carbon black or silica becomes too high. As a result, compounding viscosity increases to deteriorate processability. On the other hand, when the number of the alkoxysilyl groups is less than 0.5 mmol/kg of (co)polymer rubber polymer, the effect of introduction of the alkoxysilyl group comes not to appear. That is to say, improvements in the hysteresis loss characteristics, wear resistance and failure characteristics of the resulting (co)polymer rubber are unfavorably insufficient.

According to a first production process, the (co)polymer rubber of the present invention can be produced by polymerizing either a conjugated diolefin or a conjugated diolefin and an aromatic vinyl compound in a hydrocarbon solvent by anionic polymerization using an organic alkali metal and/or an organic alkali earth metal as an initiator, adding a compound having a primary amino group protected with a protective group and an alkoxysilyl group to react it with a living polymer chain terminal at the time when the polymerization has substantially completed, and then conducting deblocking (hydrolysis). According to this production process, (1) the primary amino group and the alkoxysilyl group can be easily introduced at the same time by a single-step reaction, and (2) it is possible to obtain a high introduction rate.

The compound having a primary amino group protected with a protective group and an alkoxysilyl group includes, for example, the compound represented by the above-mentioned formula (3) or (4).

In the above-mentioned formulas (3) and (4), the alkylene groups having 1 to 12 carbon atoms of $R^1$ include, for example, a methylene group, an ethylene group and a propylene group.

The alkyl groups having 1 to 20 carbon atoms of $R^2$ and $R^3$ include, for example, a methyl group, an ethyl group and a propyl group.

The aryl groups having 1 to 20 carbon atoms of $R^2$ and $R^3$ include, for example, a phenyl group, toluyl group and a naphthyl group.

Further, in the above-mentioned formula (4), the ring formed by combining two of $R^4$, $R^5$ and $R^6$ together with silicon atoms to which they are bonded may be a 4- to 7-membered ring.

Furthermore, the protective groups for the amino group include, for example, an alkylsilyl group. The alkylsilyl groups include, for example, a trimethylsilyl group, a triethylsilyl group, a triphenylsilyl group, a methyldiphenylsilyl group and an ethylmethylphenylsilyl group.

The alkoxysilane compounds containing the amino group protected with the protective group include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilne, N,N-bis(trimethylsilyl)-aminoethyltriethoxysilne, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane.

The reaction of the living polymer chain terminal, for example, $P^-Li^+$, with N,N-bis(trimethylsilyl)aminopropylmethyldimethoxysilane can be represented by the following reaction formula (11);

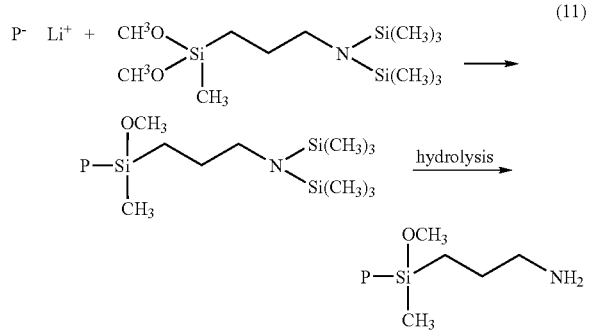

wherein P represents a (co)polymer chain of a conjugated diolefin or a conjugated diolefin and an aromatic vinyl compound.

Similarly, the reaction of the living polymer chain terminal with 1-trimethylsilyl-2,2-dimethoxy-1-aza-2-silacyclopentane can be represented by the following formula (12):

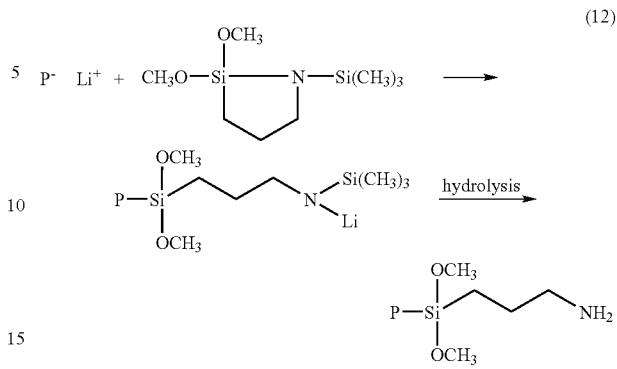

Further, the above-mentioned silacyclopentane can be allowed to react with two molecules of the living (co) polymer chain terminals, and in that case, the reaction can be represented by the following reaction formula (13):

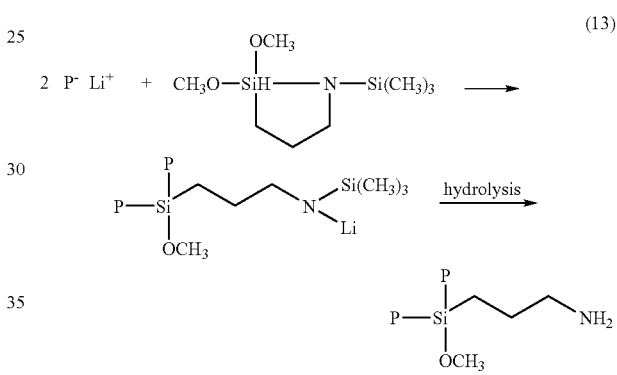

According to a second production process, the (co)polymer rubber of the present invention can be produced by polymerizing either a conjugated diolefin or a conjugated diolefin and an aromatic vinyl compound in a hydrocarbon solvent by anionic polymerization using a lithium amide initiator represented by the above-mentioned formula (7) or (8), adding a compound represented by the above-mentioned formula (9) to react it with a living polymer chain terminal at the time when the polymerization has substantially completed, and then conducting deblocking (hydrolysis).

The (co)polymer rubber of the present invention is preferably one represented by the above-mentioned formula (1) or (2), as understandable from the above-mentioned reaction examples.

The (co)polymer rubber of the present invention is obtained by (co)polymerizing either the conjugated diolefin or the conjugated diolefin and the aromatic vinyl compound, optionally with a copolymerizable third monomer.

As the conjugated diolefin used in the production of the (co)polymer rubber of the present invention, there is preferably used, for example, 1,3-butadiene, isoprene, 2,3-dimethyl-1,3-butadiene, 2-chloro-1,3-butadiene, 1,3-pentadiene, a mixture thereof or the like.

The amount of the conjugated diolefin used is usually from 40 to 100% by weight, and preferably from 50 to 95% by weight, based on all monomers. Less than 40% by weight results in inferior rolling resistance and wear resistance, and in hardening of the rubber at low temperatures to deteriorate grip performance and wet-skid resistance.

The aromatic vinyl compounds include, for example, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinylbenzyl)dimethyl aminoethyl ether, N,N-dimethylaminoethylstyrene, 2-t-butylstyrene, 3-t-butylstyrene, 4-t-butylstyrene, vinylpyridine, a mixture thereof, etc. Of these, styrene is particularly preferred.

The amount of the aromatic vinyl compound used is usually 60% by weight or less, and preferably from 50 to 5% by weight, based on all monomers.

Further, the third monomers include, for example, acrylonitrile, methyl methacrylate, ethyl methacrylate, methyl acrylate, ethyl acrylate, hydroxyethyl methacrylate and hydroxyethyl acrylate.

The amount of the third monomer used is usually less than 25% by weight, preferably 15% by weight or less, and more preferably 10% by weight or less, based on all monomers.

Further, in order to improve cold flow properties of the resulting rubber, a "bifunctional or higher functional monomer" can be copolymerized in the conjugated diolefin (co)polymer rubber of the present invention. In particular, when the "bifunctional or higher functional monomer" is copolymerized and coupling is conducted with a "bifunctional or higher functional coupling agent" described later in the conjugated diolefin (co)polymer rubber of the present invention, not only the cold flow properties, but also processing properties and physical properties of the resulting rubber composition can also be improved.

The "bifunctional or higher functional monomers" used herein include divinylbenzene, diisopropenylbenzene, trivinylbenzene, etc. The amount of the bifunctional or higher functional monomer used is 5% by weight or less, preferably from 0.001 to 5% by weight, and more preferably 0.001 to 0.1% by weight, based on the (co)polymer rubber. Exceeding 5% by weight results in inferior processing properties or physical properties of the resulting rubber composition in some cases.

As the (co)polymer rubber (i) of the present invention, preferred is a (co)polymer rubber of (A), (B), (C) or (D) described below:

(A) A (co)polymer rubber (hereinafter also referred to as "(co)polymer rubber (A)") in which (1) the content of polymerization units of the aromatic vinyl compound is from 0% by weight to less than 5% by weight based on the (co)polymer rubber, the content of polymerization units of the conjugated diolefin is more than 95% by weight to 100% by weight based on the (co)polymer rubber, and the content of polymerization units of the copolymerizable third monomer is from 0% by weight to less than 25% by weight based on the (co)polymer rubber, and (2) the vinyl bond content is 10 mol % or more, and preferably from 15 to 90 mol %, based on the polymerization units of the conjugated diolefin;

(B) A copolymer rubber (hereinafter also referred to as "copolymer rubber (B)") in which (1) the content of polymerization units of the aromatic vinyl compound is from 5% by weight to less than 30% by weight based on the copolymer rubber, the content of polymerization units of the conjugated diolefin is more than 70% by weight to 95% by weight based on the copolymer rubber, and the content of polymerization units of the copolymerizable third monomer is from 0% by weight to less than 25% by weight based on the copolymer rubber, and (2) the vinyl bond content is 50 mol % or more, and preferably from 50 mol % to less than 60 mol %, based on the polymerization units of the conjugated diolefin;

(C) A copolymer rubber (hereinafter also referred to as "copolymer rubber (C)") in which (1) the content of polymerization units of the aromatic vinyl compound is from 30 to 50% by weight based on the copolymer rubber, the content of polymerization units of the conjugated diolefin is 50 to 70% by weight based on the copolymer rubber, and the content of polymerization units of the copolymerizable third monomer is from 0 to 20% by weight based on the copolymer rubber, and (2) the vinyl bond content is from 15 to 50 mol %, based on the polymerization units of the conjugated diolefin; or (D) A copolymer rubber (hereinafter also referred to as "copolymer rubber (D)") in which (1) the content of polymerization units of the aromatic vinyl compound is from 5% by weight to 60% by weight based on the copolymer rubber, (3) the content of an aromatic vinyl compound single chain having one polymerization unit of the aromatic vinyl compound is less than 40% by weight based on the total bonded aromatic vinyl compound, and (4) the content of an aromatic vinyl compound long chain having 8 or more continuous aromatic vinyl compound units is 10% by weight or less based on the total bonded aromatic vinyl compound.

In (co)polymer rubber (A) of the present invention, the content of the aromatic vinyl compound bonded to the polymer chain, that is to say, the content of polymerization units of the aromatic vinyl compound, is from 0% by weight to less than 5% by weight, and more preferably from 0% by weight to 1% by weight, based on the (co)polymer rubber. When the content of the bonded aromatic vinyl compound is 5% by weight or more, low temperature characteristics deteriorate. Further, the content of the conjugated diolefin bonded to the polymer chain, that is to say, the content of polymerization units of the conjugated diolefin is from more than 95% by weight to 100% by weight, and preferably from 99% by weight to 100% by weight. Furthermore, the vinyl bond (1,2-bond and/or 3,4-bond) content is 10 mol % or more, and preferably from 15 mol % to less than 90 mol %, based on the polymerization units of the conjugated diolefin. When anionic polymerization is conducted using an ordinary organic alkali metal and/or alkali earth metal are used as the polymerization initiator, it is difficult to reduce the vinyl bond content to less than 10 mol %.

In copolymer rubber (B) of the present invention, the content of the bonded aromatic vinyl compound is from 5% by weight to less than 30% by weight, and more preferably from 10% by weight to 27% by weight, based on the copolymer rubber. When the content of the bonded aromatic vinyl compound is less than 5% by weight, wet-skid characteristics, wear resistance and failure characteristics deteriorate. When it is 30% by weight or more, a balance between hysteresis loss and wet-skid characteristics deteriorates. Further, the content of polymerization units of the conjugated diolefin is from more than 70% by weight to 95% by weight, and preferably from 73% by weight to 90% by weight. Furthermore, the vinyl bond content is 50 mol % or more, and preferably from 50 mol % to less than 60 mol %, based on the polymerization units of the conjugated diolefin. When the vinyl bond content is less than 50 mol %, a balance between hysteresis loss and wet-skid characteristics deteriorates. Further, in a method for synthesizing an ordinary (co)polymer of the aromatic vinyl compound and the conjugated diolefin, it is difficult to exceed 90 mol %.

Further, in copolymer rubber (C) of the present invention, the content of the bonded aromatic vinyl compound is from 30 to 50% by weight, and preferably from 30 to 45% by weight, based on the copolymer rubber. When the content of the bonded aromatic vinyl compound is less than 30% by weight, wet-skid characteristics, wear resistance and failure characteristics deteriorate. When it is more than 50% by weight, a balance between hysteresis loss and wet-skid characteristics deteriorates. Further, the content of polymerization units of the conjugated diolefin is from 50 to 70% by weight, and preferably from 55 to 70% by weight. Furthermore, the vinyl bond content is from 15 to 50 mol %, and preferably from 18 to 47 mol %, based on the polymerization units of the conjugated diolefin. When the vinyl bond content is less than 15 mol %, wet-skid characteristics are lowered to deteriorate steering stability. Exceeding 50 mol % results in inferior breaking strength and wear resistance, and in increased hysteresis loss.

Furthermore, in copolymer rubber (D) of the present invention, the content of the bonded aromatic vinyl compound is from 5 to 60% by weight, and preferably from 5 to 50% by weight, based on the copolymer rubber. Less than 5% by weight results in inferior breaking strength, failing to obtain a desired rubber composition, whereas exceeding 60% by weight unfavorably results in inferior wear resistance and rebound resilience. Further, the content of polymerization units of the conjugated diolefin is from 40 to 95% by weight, and preferably from 50 to 95% by weight. Less than 40% by weight results in inferior wear resistance and rebound resilience, whereas exceeding 95% by weight results in inferior breaking strength, failing to obtain a desired rubber composition. Still further, the content (amount used) of the third monomer is usually 25% by weight or less, and preferably 15% by weight or less.

Copolymer rubber (D) of the present invention contains the aromatic vinyl compound single chain having one polymerization unit of the aromatic vinyl compound in an amount of less than 40% by weight and preferably in an amount of 35% by weight or less, and the aromatic vinyl compound long chain having 8 or more continuous aromatic vinyl compound units in an amount of 10% by weight or less and preferably in an amount of 5% by weight or less, based on the total bonded aromatic vinyl compound. When the aromatic vinyl compound single chain is 40% by weight or more, wear resistance deteriorates. On the other hand, when the aromatic vinyl compound long chain exceeds 10% by weight, rebound resilience and wear resistance deteriorate. Here, the aromatic vinyl compound chains of the above-mentioned copolymer rubber are analyzed, for example, by a gel permeation chromatogram, after the copolymer rubber has been completely decomposed with ozone [Tanaka et al., *Polymer*, 22, 1721 (1981)].

The first production process is described below.

The polymerization reaction and the reaction with the compound having the primary amino group protected with the protective group and the alkoxysilyl group for obtaining the (co)polymer rubber of the present invention are usually conducted within the temperature range of 0 to 120° C., under either constant temperature conditions or elevated temperature conditions. The hydrolysis for deblocking the primary amino group protected is conducted by adding a 2-fold molar excess of water or acidic water in relation to the compound having the primary amino group protected with the protective group and the alkoxysilyl group to conduct the reaction for 10 minutes or more, preferably for 30 minutes or more. The polymerization system may be either a batch polymerization system or a continuous polymerization system.

Examples of the initiators of the organic alkali metals and/or the organic alkali earth metals used in the polymerization include alkyllithiums such as n-butyllithium, sec-butyllithium and t-butyllithium, alkylenedilithiums such as 1,4-dilithiobutane, phenyllithium, stilbenelithium, lithium-naphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, di-ethylaminobarium and barium stearate.

The amount of the initiator used is from 0.002 to 0.1 mmol, and preferably from 0.005 to 0.03 mmol, converted to the alkali metal atom or the alkali earth metal, per g of all monomer components.

Further, as the above-mentioned initiator, there can be used a reaction product of the organic alkali metal and/or the organic alkali earth metal with a secondary amine compound or a tertiary amine compound. As the organic alkali metal allowed to react with the above-mentioned secondary amine compound or tertiary amine compound, an organic lithium compound is preferred. More preferably, n-butyllithium or sec-butyllithium is used.

Examples of the secondary amine compounds allowed to react with the organic alkali metal and/or the organic alkali earth metal include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethylmorpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methylamino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]undecane, 3-aza-bicyclo[3.2.2]nonane and carbazole.

Further, examples of the tertiary amine compounds allowed to react with the organic alkali metal and/or the organic alkali earth metal include N,N-dimethyl-o-toluidine, N,N-dimethyl-p-toluidine, N,N-dimethyl-m-toluidine, α-picoline, β-picoline, γ-picoline, benzyldimethylamine, benzyldiethyl-amine, benzyldipropylamine, benzyldibutylamine, (o-methyl-benzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylenebenzylamine, N,N-tetramethylenebenzylamine, N,N-hexamethylenebenzylamine, N,N-tetramethylene(o-methylbenzyl)amine, N,N-tetramethylene-(p-methylbenzyl)amine and N,N-hexamethylene(p-methylbenzyl)amine.

Furthermore, in the polymerization, an ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bistetrahydrofurfuryl)propane, bi-stetrahydrofurfuryl formal, methyl ether of tetrahydro-furfuryl alcohol, ethyl ether of tetrahydrofurfuryl alcohol, butyl ether of tetrahydrofurfuryl alcohol, α-methoxytetrahydrofuran, dimethoxybenzene or dimethoxyethane and/or a tertiary amine compound such as triethylamine, pyridine, N,N,N',N'-tetramethylethylenediamine, dipiperidinoethane, methyl ether of N,N-diethylethanolamine, ethyl ether of N,N-diethylethanolamine or butyl ether of N,N-diethylethanolamine can be added to the polymerization system to adjust a microstructure (vinyl bond content) of a conjugated diolefin moiety of the diolefin-based (co)polymer, as needed.

The hydrocarbon solvents used in polymerizing the (co)polymer rubber of the present invention include, for example, pentane, hexane, heptane, octane, methylcyclopentane, cyclohexane, benzene, toluene, xylene, etc. Of these, cyclohexane and heptane are preferred.

The hydrocarbon solvent is used in such an amount as to give a total monomer concentration of usually 5 to 30% by weight, preferably about 10 to about 20% by weight.

When the reactivity of the initiator used in the present invention is intended to be improved, or when the aromatic vinyl compound introduced into the polymer is intended to be randomly arranged or a single chain of the aromatic vinyl compound is intended to be given, a potassium compound (a) may be added together with the initiator. As the potassium compound (a) added together with the initiator, there are used, for example, potassium a potassium alkoxide represented by potassium isopropoxide, potassium t-butoxide, potassium t-amyloxide, potassium n-heptaoxide, potassium benzyloxide or potassium phenoxide; a potassium salt of an organic carboxylic acid such as isovaleric acid, capric acid, lauric acid, palmitic acid, stearic acid, oleic acid, linolenic acid, benzoic acid, phthalic acid or 2-ethylhexanoic acid; a potassium salt of an organic sulfonic acid such as dodecylbenzenesulfonic acid, tetradecylbenzenesulfonic acid, hexadecylbenzenesulfonic acid or octadecylbenzenesulfonic acid; or a potassium salt of an organic phosphorous acid partial ester such as diethyl phosphite, diisopropyl phosphite, diphenyl phosphite, dibutyl phosphite or dilauryl phosphite.

These potassium compounds (a) can be added in an amount of 0.005 to 0.5 moles per gram atomic equivalent of alkali metal of initiator. Less than 0.005 mole results in no appearance of the effect of adding the potassium compound (a) (improvement in reactivity of the initiator, randomization of the aromatic vinyl compound or giving of the single chain), whereas exceeding 0.5 mole results in a decrease in polymerization activity to cause productivity to substantially decrease, and in a decrease in modification efficiency at the time when the reaction for modifying the polymer terminal with the functional group is conducted.

In order to allow the above-mentioned single chains and long chains of the aromatic vinyl compound to be present as a mixture at the above-mentioned specific ratio in the production of copolymer rubber (D) of the present invention, the above-mentioned potassium compound (a) is added together with the above-mentioned initiator. The amount of the potassium compound (a) is the same as described above. Less than 0.005 mole results in no appearance of the effect of adding the potassium compound (improvement in reactivity of the initiator, randomization of the aromatic vinyl compound or giving of the single chain and long chain), whereas exceeding 0.5 mole results in a decrease in polymerization activity to cause productivity to substantially decrease, and in a decrease in modification efficiency at the time when the reaction for modifying the polymer terminal with the functional group is conducted.

Further, together with the above-mentioned potassium salt (a), at least one compound (b) selected from the group consisting of an alcohol, a thioalcohol, an organic carboxylic acid, an organic sulfonic acid, an organic phosphorous acid, a primary amine and a secondary amine can be used in an amount of 0.1 to 5 moles per mole of potassium salt (a), and in an amount of 0.1 mole or less per gram atom of organic alkali metal and/or organic alkali earth metal.

Preferred examples of these compound (b) include aliphatic alcohols such as methyl alcohol, n-butyl alcohol, t-butyl alcohol, hexyl alcohol, 2-ethylhexyl alcohol, n-octyl alcohol and lauryl alcohol, various phenolic alcohol derivatives, various primary amines and secondary amines such as butylamine, dibutylamine, hexylamine, dihexylamine, octylamine, dioctylamine, benzylamine, dibenzylamine and aniline, thioalcohols such as butyl mercaptan, octyl mercaptan and dodecyl mercaptan, organic carboxylic acids such as octylic acid, stearic acid and hexanoic acid, organic phosphorous acids, organic sulfonic acids, etc.

In (co)polymer rubber (i) of the present invention, the molecular weight distribution measured by GPC may be polymodal, or the molecular weight distribution may be monomodal, and the ratio (Mw/Mn) of the weight average molecular weight (Mw) to the number average molecular weight (Mn) may be from 1.3 to 4.0.

As for (co)polymer rubber (i) of the present invention, the polymodal type and the monomodal type are each separately described below.

In (co)polymer rubber (i) of the present invention, the molecular weight distribution measured by GPC may be polymodal. When the molecular weight distribution is polymodal and the molecular weight distribution is narrow (Mw/Mn is less than 1.3), the viscosity at the time when the (co)polymer rubber is mixed with a reinforcing agent or other compounding agents increases to deteriorate processability. Deterioration in processability of a compound not only increases processing cost, but also causes poor dispersibility of the reinforcing agent or the other compounding agents, leading to a reduction in physical properties of the compound. When the molecular weight of raw rubber is reduced in order to decrease the viscosity of the compound, low hysteresis loss properties deteriorate, the adhesion of rubber increases to deteriorate handling, and cold flow properties increase to deteriorate storage stability. Further, when the molecular weight distribution is monomodal and the molecular weight distribution is wide (Mw/Mn is 4.0 or more), a low-molecular weight component increases to deteriorate low hysteresis loss performance and wear resistance performance.

The method for making polymodal the molecular weight distribution measured by GPC of (co)polymer rubber (i) of the present invention is not particularly limited, but there are, for example, the following methods:

Method (1): The conjugated diolefin or the conjugated diolefin and the aromatic vinyl compound are (co)polymerized, and then, at the time when the polymerization conversion rate has reached 90% to 100%, another specific functional coupling agent is added in addition to the coupling agent represented by formula (3) or (4) to react the coupling agents with active terminals of part of the polymer, thereby increasing the molecular weight to plural times. The amount of the coupling agents added is adjusted, thereby controlling the amount of a polymer whose molecular weight has been increased to plural times by adjusting the amount of the coupling agents added, and the amount of a polymer not reacted with the specific coupling agent. Thus, the molecular weight distribution can be made polymodal;

Method (2): In (co)polymerizing the conjugated diolefin or the conjugated diolefin and the aromatic vinyl compound, a small amount of a multifunctional monomer is allowed to exist. The multifunctional monomers include divinylbenzene and di-iso-propenylbenzene. The amount thereof added is from 0.001 to 10 parts by weight, and preferably from 0.01 to 3 parts by weight, based on 100 parts by weight of the total of the conjugated diolefin and the aromatic vinyl compound; and Method (3): In (co)polymerizing the conjugated diolefin or the conjugated diolefin and the aromatic vinyl compound, a reagent which can inactivate part of the polymerization active terminals (so-called polymerization terminator) is added at the time when the polymerization conversion rate is 50% or less. The polymerization terminals not inactivated further polymerize the residual monomer, so that the resulting polymer increases higher in molecular weight than the inactivated polymer to make the molecular weight distribution polymodal.

Of these, the method of adding the coupling agent of method (1) is preferred from the viewpoints of physical properties of the polymer and productivity. The specific coupling agents which are allowed to react with the polymerization active terminals at the time when the polymerization conversion rate has reached 90% to 100% include at least one compound selected from the group consisting of (a) an isocyanate compound and/or an isothiocyanate compound (hereinafter also referred to as "coupling agent (a)"), (b) an amide compound and/or an imide compound (hereinafter also referred to as "coupling agent (b)"), (c) a pyridyl-substituted ketone compound and/or a pyridyl-substituted vinyl compound (hereinafter also referred to as "coupling agent (c)"), (d) a silicon compound (hereinafter also referred to as "coupling agent (d)"), (e) an ester compound (hereinafter also referred to as "coupling agent (e)"), (f) a ketone compound (hereinafter also referred to as "coupling agent (f)") and (g) a tin compound (hereinafter also referred to as "coupling agent (g)").

On the other hand, in (co)polymer rubber (i) of the present invention, the molecular weight distribution measured by GPC may be monomodal, and the ratio (Mw/Mn) of the weight average molecular weight (Mw) to the number average molecular weight (Mn) may be from 1.3 to 4.0, preferably from 1.5 to 3.0, and more preferably from 1.5 to 2.5.

Even when the molecular weight distribution is monomodal, narrow molecular weight distribution (Mw/Mn is less than 1.3) results in an increase in the viscosity at the time when the (co)polymer rubber is mixed with a reinforcing agent or other compounding agents to deteriorate processability. Deterioration in processability of a compound not only increases processing cost, but also causes poor dispersibility of the reinforcing agent or the other compounding agents, leading to a reduction in physical properties of the compound. When the molecular weight of raw rubber is reduced with the intension of decreasing the viscosity of the compound, the low hysteresis loss properties of the compound deteriorate, the adhesion of rubber increases to deteriorate handling, and cold flow properties increase to deteriorate storage stability.

On the other hand, when the molecular weight distribution is wide (Mw/Mn exceeds 4.0), the low hysteresis loss properties of the compound deteriorate.

The method for making the molecular weight distribution monomodal and adjusting the ratio (Mw/Mn) of the weight average molecular weight (Mw) to the number average molecular weight (Mn) to 1.3 to 4.0 is not particularly limited, but there are, for example, the following methods:

Method (1): Polymerization is conducted while continuously charging a polymerization system with the solvent, the monomer(s) and the polymerization initiator, and the ether compound and the tertiary amine compound as needed (continuous polymerization system); and Method (2): A method in which a polymerization system is previously charged with the solvent and the polymerization initiator, and the ether compound and the tertiary amine compound as needed, and then, continuously or intermittently charged with the monomer(s) to conduct polymerization (monomer continuous addition system).

In the above-mentioned monomodal type (co)polymer rubber (i), it is preferred from the viewpoints of physical properties of the polymer (for example, a reduction in hysteresis loss properties or improvement in wear resistance and breaking strength) and productivity that polymerization terminating terminals of at least 5% to less than 50% of all (co)polymer chains are modified or coupled by use of at least one compound selected from the group consisting of coupling agents (a) to (g) described below.

Even when monomodal (co)polymer rubber (i) of the present invention having wide molecular weight distribution is coupled before the polymerization is terminated, it keeps monomodal without becoming polymodal because of its wide molecular weight distribution.

Specific examples of coupling agents (a) to (g) are as follows.

Preferred specific examples of the isocyanate compounds or the isothiocyanate compounds, which are coupling agent (a), include 2,4-tolylene diisocyanate, 2,6-tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate, phenyl-1,4-diisothiocyanate, etc.

Preferred specific examples of the amide compounds or the imide compounds, which are coupling agent (b), include amide compounds such as succinamide, phthalamide, N,N,N',N'-tetramethylphthalamide, oxamide and N,N,N',N'-tetramethyloxamide; and imide compounds such as succinimide, N-methylsuccinimide, maleimide, N-methylmaleimide, phthalimide, N-methylphthalimide.

Preferred specific examples of the pyridyl-substituted ketone compounds or the pyridyl-substituted vinyl compounds, which are coupling agent (c), include dibenzoylpyridine, diacetylpyridine, divinylpyridine, etc.

Preferred specific examples of the silicon compounds, which are coupling agent (d), include dibutyldichlorosilicon, methyltrichlorosilicon, methyldichlorosilicon, tetrachlorosilicon, triethoxymethylsilane, triphenoxymethylsilane, trimethoxysilane, methyltriethoxysilane, 4,5-epoxyheptyl-methyldimethoxysilane, bis(triethoxysilylpropyl) tetrasulfide, etc.

Preferred specific examples of the ester compounds, which are coupling agent (e), include diethyl adipate, diethyl malonate, diethyl phthalate, diethyl glutarate, diethyl maleate, etc.

Preferred specific examples of the ketone compounds, which are coupling agent (f), include N,N,N',N'-tetramethyl-4,4'-diaminobenzophenone, N,N,N',N'-tetraethyl(4,4'-diamino)benzophenone, N,N-dimethyl-1-aminobenzoquinone, N,N,N',N'-tetramethyl-1,3-diaminobenzoquinone, N,N-dimethyl-1-aminoanthraquinone, N,N,N$^1$,N'-tetramethyl-1,4-di-aminoanthraquinone, etc.

Preferred specific examples of the tin compounds, which are coupling agent (g), include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannyl)ethane, 1,4-bis(trichloro-stannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, dibutyltin bislaurate, etc. The above-mentioned coupling agents can be used either alone or as a mixture of two or more of them.

The above-mentioned coupling agents can be used in an amount of 0.05 to 50 moles, and preferably in an amount of 0.1 to 30 moles, per gram atom equivalent of alkali metal of the initiator. Less than 0.05 mole results in inferior physical properties of a rubber composition obtained, and in increased cold flow properties to deteriorate storage stability. On the other hand, exceeding 50 moles results in a reduction in reaction rate of the compound described in formula (3) or (4) necessary for obtaining the (co)polymer rubber (i) of the present invention to fail to obtain the performance to be expected.

The coupling rate in all (co)polymer chains with the above-mentioned coupling agent is usually 5% or more, and preferably from 10 to 35%.

In the production of copolymer rubber (D) of the present invention, the amount of the above-mentioned coupling agent used can be added in an amount of 0.4 mole or less, and preferably in an amount of 0.3 mole or less. Exceeding 0.4 mole results in a decrease in the conversion rate with the amino group-containing alkoxysilane compound used in the present invention to deteriorate its physical properties. The coupling rate in all (co)polymer chains of copolymer rubber (D) with the above-mentioned coupling agent is usually 40% or less, and preferably 30% or less.

As the above-mentioned coupling agent, the bifunctional or higher functional coupling agent may be used. By conducting coupling by the use of the "bifunctional or higher functional coupling agent", not only the cold flow properties, but also processing properties and physical properties of the resulting rubber composition can be improved.

Specific examples of bifunctional or higher functional coupling agents (a) include 2,4-tolylene diisocyanate, 2,6-tolylene diisocyanate, diphenylmethane diisocyanate, polymeric type diphenylmethane diisocyanate (C-MDI), isophorone diisocyanate, hexamethylene diisocyanate, 1,3,5-benzene triisocyanate and phenyl 1,4-diisothiocyanate, as preferred examples.

Specific examples of bifunctional or higher functional coupling agents (b) include amide compounds such as succinamide, phthalamide, N,N,N',N'-tetramethylphthalamide, oxamide and N,N,N',N'-tetramethyloxamide, and imide compounds such as succinimide, N-methylsuccinimide, maleimide, N-methyl-maleimide, phthalimide and N-methylphthalimide, as preferred examples.

Specific examples of bifunctional or higher functional coupling agents (c) include dibenzoylpyridine, diacetylpyridine and divinylpyridine, as preferred examples.

Specific examples of bifunctional or higher functional coupling agents (d) include dibutyldichlorosilicon, methyltrichlorosilicon, methyldichlorosilicon, tetrachlorosilicon, triethoxymethylsilane, triphenoxymethylsilane, trimethoxysilane, methyltriethoxysilane, 4,5-epoxyheptylmethyldimethoxysilane and bis(triethoxysilylpropyl) tetrasulfide, as preferred examples.

Specific examples of bifunctional or higher functional coupling agents (e) include diethyl adipate, diethyl malonate, diethyl phthalate, diethyl glutarate and diethyl maleate, as preferred examples.

Specific examples of bifunctional or higher functional coupling agents (f) include N,N-dimethyl-1-aminobenzoquinone, N,N,N',N'-tetramethyl-1,3-diaminobenzoquinone, N,N-dimethyl-1-aminoanthraquinone and N,N,N',N'-tetramethyl-1,4-diaminoanthraquinone, as preferred examples.

Specific examples of bifunctional or higher functional coupling agents (g) include tetrachlorotin, tetrabromotin, trichlorobutyltin, trichloromethyltin, trichlorooctyltin, dibromodimethyltin, dichlorodimethyltin, dichlorodibutyltin, dichlorodioctyltin, 1,2-bis(trichlorostannyl)ethane, 1,2-bis(methyldichlorostannylethane), 1,4-bis(trichloro-stannyl)butane, 1,4-bis(methyldichlorostannyl)butane, ethyltin tristearate, butyltin trisoctanoate, butyltin trisstearate, butyltin trislaurate, dibutyltin bisoctanoate, dibutyltin bisstearate, and dibutyltin bislaurate, as preferred examples.

The above-mentioned bifunctional or higher functional coupling agents can be used either alone or as a combination of two or more of them.

Of the above-mentioned bifunctional or higher functional coupling agents (a) to (g), preferred is (g) the tin compound.

When the conjugated diolefin and the aromatic vinyl compound are copolymerized using (g) the tin compound as the bifunctional or higher functional coupling agent, it is preferred that in polymerizing the conjugated diolefin and the aromatic vinyl compound by anionic polymerization and then coupling the resulting polymerization active terminal with the bifunctional or higher functional tin compound, the conjugated diolefin is added just before the coupling to conduct polymerization, thereby obtaining a conjugated diolefin (co)polymer rubber containing a conjugated diene unit-tin bonding chain (refer to Japanese Patent Examined Publication (Sho) 57-87407).

As described above, the conjugated diolefin is added just before the coupling to inhibit the formation of the bonding chain of an aromatic vinyl compound (styrene) unit and tin, thereby being able to obtain the rubber excellent in rolling frictional resistance characteristics and failure characteristics.

The amount of the above-mentioned bifunctional or higher functional coupling agent used can be added in an amount of 0.005 to 1 mole, and preferably in an amount of 0.01 to 0.5 mole, per gram atomic equivalent of the alkali metal of the initiator. Less than 0.005 mole results in the inferior effect of improving the cold flow properties of the resulting rubber, and in deterioration of the physical properties of a rubber vulcanizate in some cases. On the other hand, exceeding 1 mole results in increased unreacted products to emit an odor, in acceleration of the vulcanizing speed, or in deterioration of the physical properties of the rubber vulcanizate in some cases.

It is desirable that the above-mentioned bifunctional or higher functional coupling agent is bonded to 1% or more, preferably 5% or more of the (co)polymer chains.

Less than 5% results in the inferior effect of improving the cold flow properties, and in a reduction in the effect of improving processability and deterioration of the physical properties of the rubber vulcanizate in some cases.

The second production process of the present invention is described below.

The polymerization reaction by the use of the lithium amide initiator whose primary amino group is protected and the reaction with the alkoxysilane compound for obtaining the (co)polymer rubber of the present invention are usually conducted within the temperature range of 0 to 120° C., under either constant temperature conditions or elevated temperature conditions. The hydrolysis for deblocking the primary amino group protected is conducted by adding a 2-fold molar excess of water or acidic water in relation to the lithium amide initiator whose primary amino group is protected to conduct the reaction for 10 minutes or more, preferably for 30 minutes or more. The polymerization system may be either a batch polymerization system or a continuous polymerization system.

It should be understood that the matters described for the first production process are applied to matters which are not described herein for the second production process, as such or with modifications obvious to one skilled in the art.

The lithium amide initiators represented by the above-mentioned formula (7) include, for example, 3-[N,N-bis(trimethylsilyl)]-1-propyllithium, 3-[N,N-bis(trimethyl-silyl)]-2-methyl-1-propyllithium, 3-[N,N-bis(trimethyl-silyl)]-2,2-dimethyl-1-propyllithium, 4-[N,N-bis(trimethyl-silyl)]-1-butyllithium, 5-[N,N-bis(trimethylsilyl)]-1-pentyllithium and 8-[N,N-bis(trimethylsilyl)]-1-octyl-lithium.

The lithium amide initiators represented by the above-mentioned formula (8) include, for example, 3-(2,2,5,5-tetramethyl-2,5-disila-1-azacyclopentane)-1-propyllithium, 2-methyl-3-(2,2,5,5-tetramethyl-2,5-disila-1-azacyclopentane)-1-propyllithium, 2,2-dimethyl-3-(2,2,5,5-tetramethyl-2,5-disila-1-azacyclopentane)-1-propyllithium, 4-(2,2,5,5-tetramethyl-2,5-disila-1-azacyclopentane)-1-butyllithium and 6-(2,2,5,5-tetramethyl-2,5-disila-1-azacyclopentane)-1-hexyllithium.

As the above-mentioned lithium amide initiator, there may be used a synthetic compound obtained by reacting a corresponding halide and an organic lithium compound in a hydrocarbon solvent. The reaction of the halide and the organic lithium may be previously conducted in a reaction vessel different from a polymerization reactor.

The halides corresponding to the above-mentioned lithium amide initiators include the following formula (14) or the following formula (15):

wherein $R^1$, $R^4$, $R^5$ and $R^6$ have the same meanings as given for the above-mentioned formula (3), and X is a halogen atom,

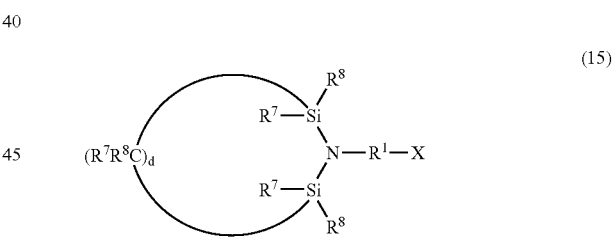

wherein $R^1$ have the same meaning as given for the above-mentioned formula (3), $R^7$ and $R^8$ are each independently hydrogen, an alkyl group having 1 to 20 carbon atoms or an aryl group, d is an integer of 1 to 7.

Further, the alkoxysilane compounds represented by the above-mentioned formula (9) include, for example, tetramethoxysilane, tetraethoxysilane, tetrapropoxysilane, tetrabutoxysilane, tetraphenoxysilane, tetratoluyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyl-dipropoxysilane, dimethyldibutoxysilane, dimethyldiphenoxysilane, diethyldimethoxysilane, diethyldiethoxysilane, diethyldipropoxysilane, diethyldibutoxysilane, diethyldiphenoxysilane, vinyltrimethoxysilane, vinyltriethoxysilane, vinyltripropoxysilane, vinyltributoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxychlorosilane, tripropoxychlorosilane, tributoxychlorosilane, triphenoxychlorosilane, dimethoxydichlorosilane, dipropoxydichlorosilane and diphenoxydichlorosilane.

The weight average molecular weight of (co)polymer rubber (i) obtained in the present invention is usually from 100,000 to 2,000,000, preferably from 150,000 to 1,700,000, and more preferably from 150,000 to 1,500,000. Less than 100,000 results in insufficient breaking strength, wear resistance, low hysteresis loss properties, etc. of the resulting rubber composition, whereas exceeding 2,000,000 results in inferior processability, and in deterioration of filler dispersibility at the time of kneading, which causes deterioration of breaking strength, wear resistance, low hysteresis loss properties and wet-skid properties.

The Mooney viscosity ($ML_{1+4}$, 100° C.) of (co)polymer rubber (i) obtained in the present invention is preferably within the range of 20 to 200. Less than 20 results in deterioration of breaking strength, wear resistance and low hysteresis loss properties, whereas exceeding 200 results in inferior processability. The (co)polymer having a Mooney viscosity ($ML_{1+4}$, 100° C.) exceeding 100 is unfavorable because of its inferior processability as it is. However, an extender oil such as an aromatic process oil or a naphthenic process oil, or a liquid polymer having a weight average molecular weight of 150,000 or less is added, thereby decreasing the Mooney viscosity to 100 or less, which also allows the (co)polymer to be used without a problem in processability. The extender oil used is not particularly limited, as long as it is an extender oil or a softening agent ordinarily used in a diene-base rubber. However, a mineral oil-based extender oil is preferably used. In general, mineral oil extender oils are mixtures of aromatic oils, alicyclic oils and aliphatic oils, and classified into the aromatic family, alicyclic family (naphthenic family) and aliphatic family (paraffinic family) according to the amount ratio thereof. Any of them can be used in the present invention. The viscosity-gravity constant (hereinafter referred to as V.G.C. for brevity) of the extender oil is preferably from 0.790 to 1.100, more preferably from 0.790 to 1.049, still more preferably from 0.790 to 0.999, and particularly preferably from 0.790 to 0.949. Above all, an aromatic mineral oil (aromatic oil) having a viscosity-gravity constant (V.G.C value) of 0.900 to 1.049 and an aliphatic mineral oil (naphthenic oil) having a V.G.C of 0.800 to 0.899 are preferably used in terms of low hysteresis loss properties/wet-skid resistance.

In copolymer rubber (D) of the present invention, the aromatic mineral oil (aromatic oil) having a viscosity-gravity constant (V.G.C value) of 0.900 to 1.049 and the aliphatic mineral oil (naphthenic oil) having a V.G.C of 0.800 to 0.899 are preferably used in terms of low hysteresis loss properties/wet-skid resistance.

Of these, the aromatic extender oils satisfying the above-mentioned viscosity-gravity constant include Diana Process Oil AC-12, AC460, AH-16 and AH-58 manufactured by Idemitsu Kosan Co., Ltd., Mobile Sol K, Mobile Sol 22 and Mobile Sol 130 manufactured by Exxon Mobil Co., Fukkol Aromax #3 manufactured by Fuji Kosan Co., Ltd., Kyoseki Process X50, X100 and X140 manufactured by Nikko Kyoseki Co., Ltd., Rezox No. 3 and Dutorex 729UK manufactured by Shell Chemicals Co., Ltd., Koumorex 200, 300, 500 and 700 manufactured by Nisseki Mitsubishi Co., Ltd., Esso Process Oil 110 and Esso Process Oil 120 manufactured by Exxon Mobil Co., Mitsubishi 34 Heavy Process Oil, Mitsubishi 44 Heavy Process Oil, Mitsubishi 38 Heavy Process Oil and Mitsubishi 39 Heavy Process Oil manufactured by Nisseki Mitsubishi Co., Ltd., etc.

Further, the naphthenic extender oils satisfying the above-mentioned viscosity-gravity constant include Diana Process Oil NS-24, NS-100, NM-26, NM-280 and NP-24 manufactured by Idemitsu Kosan Co., Ltd., Naprex 38 manufactured by Exxon Mobil Co., Fukkol FLEX#1060N, #1150N, #1400N, #2040N and #2050N manufactured by Fuji Kosan Co., Ltd., Kyoseki Process R25, R50, R200 and R1000 manufactured by Nikko Kyoseki Co., Ltd., Shellflex 371JY, Shellflex 371N, Shellflex 451, Shellflex N-40, Shellflex 22, Shellflex 22R, Shellflex 32R, Shellflex 100R, Shellflex 100S, Shellflex 100SA, Shellflex 220RS, Shellflex 220S, Shellflex 260, Shellflex 320R and Shellflex 680 manufactured by Shell Chemicals Co., Ltd., Koumorex No. 2 Process Oil manufactured by Nisseki Mitsubishi Co., Ltd., Esso Process Oil L-2 and Esso Process Oil 765 manufactured by Exxon Mobil Co., Mitsubishi 20 Light Process Oil manufactured by Nisseki Mitsubishi Co., Ltd., etc.

Furthermore, the paraffinic extender oils satisfying the above-mentioned viscosity gravity constant include Diana Process Oil PW-90, PW-380, PS-32, PS-90 and PS-430 manufactured by Idemitsu Kosan Co., Ltd., Fukkol Process P-100, P-200, P-300, P400 and P-500 manufactured by Fuji Kosan Co., Ltd., Kyoseki Process P-200, P-300, P-500, Kyoseki EPT 750, Kyoseki EPT 1000 and Kyoseki Process S90 manufactured by Nikko Kyoseki Co., Ltd., Lubrex 26, Lubrex 100 and Lubrex 460 manufactured by Shell Chemicals Co., Ltd., Esso Process Oil 815, Esso Process Oil 845 and Esso Process Oil B-1 manufactured by Exxon Mobil Co., Naprex 32 manufactured by Exxon Mobil Co., Mitsubishi 10 Light Process Oil manufactured by Nisseki Mitsubishi Co., Ltd. (former Mitsubishi Oil Co., Ltd.), etc.

Thus, (co)polymer rubber (i) of the present invention is oil extended with the extender oil, which makes it possible to homogeneously finely disperse the filler such as carbon black or silica in the (co)polymer rubber, thereby being able to improve processability and various characteristics of the vulcanizate. In addition, surprisingly, this can improve the mechanical strength of the resulting oil-extended (co)polymer rubber or the vulcanizate, particularly the wear resistance.

The compounding amount of the extender oil used in the present invention is from 10 to 100 parts by weight, and preferably from 15 to 90 parts by weight, based on 100 parts by weight of (co)polymer rubber (i). Less than 10 parts by weight results in poor wear resistance-improving effect and processability, whereas exceeding 100 parts by weight causes significant softening, resulting in poor processability.

The extender oil may be a liquid polymer (or a solution thereof) having a weight average molecular weight of 150,000 or less.

There is no particular limitation on the oil extending method, and examples thereof include a method of adding the extender oil to a polymerization solution of the above-mentioned (co)polymer rubber, followed by mixing in a solution state. This method can operationally omit a process of mixing the (co)polymer rubber and the extender oil, and is preferred because of excellent mixing uniformity of both. When the extender oil is added to the polymerization solution, it is preferably added after the termination of the polymerization, for example, after the addition of a terminal modifier or after the addition of the polymerization terminator (after the addition of a stabilizer). A necessary amount of the extender oil is added to the polymerization solution containing an organic solvent, and mixed well in a solution state (a first step). Then, ① a crumb is obtained by a steam stripping method of directly blowing steam into the polymerization solution containing the extender oil, or ② the polymer solution containing the extender oil is directly desolvated by a means such as an extruder or a devolatilizer to separate the oil-extended (co)polymer rubber from the solvent (a second step). The resulting wet oil-extended (co)polymer rubber is washed as needed, and dried with a vacuum drier, a hot air dryer, a roll or the like (a third step), thereby being able to isolate the desired oil-extended (co) polymer rubber.

Further, as the oil extending method, it is also possible to blend (co)polymer rubber (i) of the present invention and the extender oil in a molten state to prepare the oil-extended (co)polymer rubber. In this case, as a blending process, there is employed a single-screw extruder, a twin-screw extruder, a Banbury mixer, a roll, a kneader, a plastomill or the like, and the melt kneading temperature is suitably from 50 to 200° C.

The (co)polymer rubber of the present invention may be used alone or blended with natural rubber, polyisoprene rubber, polybutadiene rubber, emulsion-polymerized styrene-butadiene rubber or the like, and then kneaded with the reinforcing agent such as carbon black or silica and various compounding agents by means of a roll or a Banbury mixer, followed by the addition of sulfur, a vulcanization accelerator, etc., thereby being able to use as a belt, a vibration-proof rubber or another industrial product, starting with a rubber for a tire such as a tread, a sidewall or a carcass.

When the (co)polymer rubber of the present invention is used as the tire, especially as the tire tread, the reinforcing agents with which the (co)polymer rubber is filled include, for example, fillers such as carbon black and silica.

In particular, when the vulanizate is effectively reinforced to expect good wear resistance and breaking strength, carbon black is suitably used. The filling amount of the filler is preferably from 20 to 120 parts by weight, and more preferably from 30 to 110 parts by weight, based on 100 parts by weight of all rubber components. As the carbon black, preferred is carbon black manufactured by the furnace process and having a nitrogen adsorption specific surface area of 50 to 200 m$^2$/g and a DBP oil absorption of 80 to 200 ml/100 g, and one of the FEF class, the HAF class, the ISAF class or the SAF class can be preferably used. In particular, one of a high aggregation type is preferred.

Further, particularly for the low fuel consumption tire application, the use of silica is preferred for the purpose of reducing the hysteresis loss of the vulcanizate to give good rolling resistance and to improve wet-skid resistance. As the silica, there can be used any of wet process silica, dry process silica and synthetic silicate silica. High in reinforcing effect is silica having a small particle size. One of a small particle size and high aggregation type (high surface area, high oil absorption) is good in dispersibility in the rubber, so that it is particularly preferred in respect to physical properties and processability. Further, the use of silica of a high dispersible type also improves dispersibility in the rubber, and is preferred in terms of physical properties and processability.

The average particle size of the silica is preferably from 5 to 60 µm, and particularly preferably from 10 to 35 µm, by the primary particle size. The filling amount of the silica is preferably from 20 to 120 parts by weight, and more preferably from 30 to 110 parts by weight, based on 100 parts by weight of all rubber components.

Further, when silica is used as the filler, various known silane coupling agents can be used in order to increase its reinforcing effect. The silane coupling agent means a compound having both a constituent component reactable with the silica surface such as an alkoxysilyl group and a constituent component reactable with the rubber, particularly a carbon-carbon double bond, such as a polysulfide, a mercapto group or an epoxy group, in its molecule. For example, bis(3-triethoxysilylpropyl)-tetrasulfide, bis-(3-triethoxysilylpropyl)disulfide, 3-mercaptopropyltrimethoxysilane, 3-triethoxysilylpropyl-N,N-dimethylthiocarbamoyltetrasulfide, 3-triethoxysilyl-propylbenzothiazoletetrasulfide or the like is well known as the silane coupling agent.

Further, the use of carbon black and silica in combination within the range of 20 to 120 parts by weight based on 100 parts by weight of all rubber components allows good wear resistance and breaking strength to be compatible with a balance between low hysteresis loss performance and wet grip performance.

When silica is used as the filler, it is desirable that the filler contains at least 1 part by weight of silica and further contains the coupling agent in an amount of 0.5 to 20% by weight based on the silica. This improves the dispersibility of the silica, and improves the binding ratio of the silica and the rubber, so that the reinforcing effect of the silica and the rubber is further increased to obtain the effect of improving breaking strength, wear resistance and low hysteresis loss properties.

Further, the use of carbon black and silica in combination within the range of 20 to 120 parts by weight based on 100 parts by weight of all rubber components allows good wear resistance and breaking strength to be compatible with a balance between low hysteresis loss performance and wet grip performance.

Further, a carbon-silica dual phase filler can be mixed with the (co)polymer rubber of the present invention, thereby being able to obtain excellent advantages similar to those obtained when the carbon black and the silica are used in combination therewith.

The carbon-silica dual phase filler is so-called silica coating carbon black in which silica is chemically bonded to the surface of carbon black. Specifically, it is sold from Cabot Corporation as CRX2000, CRX2002 or CRX2006 (trade name). The amount of the carbon-silica dual phase filler incorporated is preferably from 1 to 100 parts by weight, and more preferably from 5 to 95 parts by weight, based on 100 parts by weight of the total of the rubber components.

In the present invention, the carbon-silica dual phase filler can be used in combination with a filling agent other than that. The simultaneously usable filling agents include carbon black, silica, calcium carbonate and magnesium carbonate, but there is no limitation thereon. Carbon black and silica are preferred among others.

These simultaneously usable filling agents are incorporated preferably in an amount of 3 to 100 parts by weight, and more preferably in an amount of 5 to 95 parts by weight, based on 100 parts by weight of the total of the rubber components.

On the other hand, when the rubber composition is prepared using the above-mentioned oil-extended (co)polymer rubber, it is preferred that the above-mentioned oil-extended (co)polymer rubber is contained in an amount of 30% by weight or more based on all rubber components, and that carbon black is contained in an amount of 2 to 100 parts by weight, and/or silica is contained in an amount of 30 to 100 parts by weight, as the fillers, based on 100 parts of all rubber components. When the silica is contained, the silane coupling agent is preferably contained in an amount of 5 to 20% by weight based on the silica. This improves the dispersibility of the silica, and improves the binding ratio of the silica and the rubber, so that the effect of improving breaking strength, wear resistance and low hysteresis loss properties is obtained.

Further, when the rubber composition is prepared using the above-mentioned oil-extended (co)polymer rubber, it is also a preferred embodiment that the above-mentioned oil-extended (co)polymer rubber is contained in an amount of 30% by weight or more based on all rubber components, that (a) carbon black and silica are contained in an amount of 30 to 100 parts by weight as the total amount thereof, (b) the carbon-silica dual phase filler in an amount of 30 to 100 parts by weight, or (c) the carbon-silica dual phase filler and carbon black ad/or silica in an amount of 30 to 100 parts by weight as the total amount thereof, and that a silane coupling agent is contained in an amount of 5 t 20% by weight based on the total amount of the silica and the carbon-silica dual phase filler. This improves the dispersibility of the silica, and improves the binding ratio of the silica and the rubber, so that the effect of improving breaking strength, wear resistance and low hysteresis loss properties is obtained.

A method for kneading the rubber composition obtained using the (co)polymer rubber (containing the oil-extended polymer rubber) of the present invention is not particularly limited. However, when the filler contains silica, the kneading can also be carried out by the following method, in order to sufficiently achieve reinforcement with silica and more improve the physical properties of vulcanized rubber.

Methods for kneading the rubber composition containing the (co)polymer rubber (containing the oil-extended polymer rubber) of the present invention, silica, the silane coupling agent, zinc white and a vulcanizing agent include (a) a method of mixing silica with the (co)polymer rubber, followed by kneading to prepare a first rubber composition, then, mixing the silane coupling agent with the first rubber composition, followed by kneading to prepare a second rubber composition, and subsequently, mixing zinc white and the vulcanizing agent with the second rubber composition, followed by kneading, or (b) a method of mixing silica with the (co)polymer rubber, followed by kneading to prepare a first rubber composition, then, mixing the silane coupling agent with the first rubber composition, followed by kneading, further mixing zinc white, continuing the kneading to prepare a second rubber composition, and subsequently mixing the vulcanizing agent with the second rubber composition, followed by kneading.

According to the above-mentioned kneading methods, no silane coupling agent coexists in kneading the (co)polymer rubber and silica, so that the kneading temperature can be elevated to about 170 to about 180° C. to raise the reactivity of the (co)polymer rubber of the present invention and silica. Accordingly, silica can be sufficiently dispersed by fewer kneading times to improve the performance.

In the rubber composition of the present invention, the vulcanizing agent can be used preferably within the range of 0.5 to 10 parts by weight, and more preferably within the range of 1 to 6 parts by weight, based on 100 parts by weight of all rubber components.

The vulcanizing agents include typically sulfur, and additionally a sulfur-containing compound, peroxide, etc.

Further, a vulcanization accelerator such as a sulfenamide-based accelerator, a guanidine-based accelerator or a thiuram-based accelerator may be used in an amount according to need. Furthermore, zinc white, a vulcanization auxiliary, an antiaging agent, a processing aid, etc. may be used in an amount according to need.

In addition, various compounding agents for the rubber composition obtained using the (co)polymer rubber of the present invention are not particularly limited. However, the following compatibilizing agents, as well as various compounding agents such as a vulcanizing agent, a vulcanization accelerator, zinc white, an antiaging agent, an antiscorching agent, a tackifier and another filler, can also be added at the time of kneading, in order to improve processability at the time of kneading or to more improve a balance among wet-skid characteristics, low hysteresis loss and wear resistance.

The preferred compatibilizing agent is an organic compound selected from an epoxy group-containing compound, a carboxylic acid compound, a carboxylic acid ester compound, a ketone compound, an ether compound, an aldehyde compound, a hydroxyl group-containing compound and an amino group-containing compound, or a silicone compound selected from an alkoxysilane compound, a siloxane compound and an aminosilane compound.

Specific examples of the organic compounds of the compatibilizing agents include the following compounds:

Epoxy group-containing compounds: butyl glycidyl ether, diglycidyl ether, propylene oxide, neopentyl glycol diglycidyl ether, an epoxy resin, epoxidized soybean oil, epoxidized fatty acid ester, etc.

Carboxylic acid esters: adipic acid, octylic acid, methacrylic acid, etc.

Carboxylic acid ester compounds: an acrylic acid ester, diethylene acrylate, ethyl methacrylate, an orthoacetic acid ester, ethyl acetoacetate, butyl acetate, isopropyl acetate, dimethyl carbonate, p-hydroxyphenylacetic acid, a polyester-based plasticizer, stearic acid-based plasticizer, etc.

Ketone compounds: methylcyclohexane, acetylacetone, etc.

Ether compounds: isopropyl ether, dibutyl ether, etc.

Aldehyde compounds: undecylene aldehyde, decyl aldehyde, vanillin, 3,4-dimethoxybenzaldehyde, cuminaldehyde, etc.

Amino group-containing compounds: n-propylamine, isopropylamine, di-n-propylamine, diisopropylamine, triethylamine, 3-ethoxypropylamine, n-hexylamine, n-octylamine, 2-ethylhexylamine, isopropanolamine, ethylenediamine, N-ethylethylenediamine, ethyleneimine, hexamethylenediamine, 3-lauryloxypropylamine, aminophenol, aniline, 3-isopropoxy-aniline, phenylenediamine, aminopyridine, N-methyldiethanolamine, N-methylethanolamine, 3-amino-1-propanol, ethylamine hydrochloride, n-butylamine hydrochloride, etc.

Hydroxyl group-containing compounds: isopropyl alcohol, butanol, octanol, octanediol, ethylene glycol, methylcyclohexanol, 2-mercaptoethanol, 3-methyl-3-methoxy-1-butanol, 3-methyl-1,5-pentanediol, 1-octadecanol, diethylene glycol, butylene glycol, dibutylene glycol, triethylene glycol, etc.

Above all, the epoxy group-containing groups, the amino group-containing compounds and the hydroxyl group-containing compounds are preferred.

Specific examples of the silicone compounds of the compatibilizing agents include Alkoxysilane compounds: trimethylmethoxysilane, tri-methylethoxysilane, dimethyldimethoxysilane, methyltriethoxysilane, methyltriphenoxysilane, tetraethoxysilane, methyldiethoxysilane, vinyltrimethoxysilane, etc.

Siloxane compounds: a dimethylsiloxane oligomer, a silicone oil, an amino-modified silicone oil, an epoxy-modified silicone oil, a carboxyl-modified silicone oil, a polyether-modified silicone oil, an alkyl-modified silicone oil, a higher fatty acid ester-modified silicone oil, a higher alkoxy-modified silicone oil, a higher fatty acid ester-containing silicone oil, etc.

Aminosilane compounds: hexamethyldisilazane, nonamethyltrisilazane, anilitrimethylsilane, bis(dimethyl-amino)dimethylsilane, bis(diethylamino)dimethylsilane, triethylaminosilane, etc. Above all, the silazane compounds and bis(dimethylamino)dimethylsilane are preferred.

(Co)Polymer Rubber (ii)

(Co)polymer rubber (ii) of the present invention containing an alkoxysilyl group bonded to a (co)polymer chain, and a compound residue derived from a compound having two or more alkoxysilyl groups on the same carbon atom is obtained from a conjugated diolefin (co)polymer rubber obtained from either a conjugated diolefin or a conjugated diolefin and an aromatic vinyl compound, and the compound having two or more alkoxysilyl groups on the same carbon atom.

(Co)polymer rubber (ii) of the present invention is obtained by polymerizing either a conjugated diolefin or a conjugated diolefin and an aromatic vinyl compound (and a third copolymerizable component according to circumstances) in a hydrocarbon solvent by anionic polymerization using an organic alkali metal and/or an organic alkali earth metal as initiators, reacting an alkoxysilane-based compound (coupling agent) with a polymerization active terminal thereof at the time when the polymerization has substantially completed to cause coupling of an alkoxysilyl group with a (co)polymer chain, and further adding a compound having two or more alkoxyl groups on the same carbon atom before the (co)polymer rubber is dried, followed by treatment (the above-mentioned production method is referred to as "production method 1-3"). The compound having two or more alkoxyl groups on the same carbon atom includes compounds represented by the above-mentioned formulas (5) and/or (6).

This inhibits the alkoxysilyl group bonded to the (co)polymer chain from being converted to a silanol group after hydrolysis to condense, so that the Mooney viscosity of the resulting (co)polymer rubber can be stabilized and the variation of the Mooney viscosity of the (co)polymer rubber with the elapse of time can be restrained.

The above-mentioned polymerization reaction is usually conducted at a polymerization temperature ranging from 0 to 120° C. for a polymerization time ranging from 1 to 120 minutes, under either constant temperature conditions or elevated temperature conditions. Further, the polymerization may be either a batch type or continuous polymerization.

The hydrocarbon solvents, conjugated diolefins, aromatic vinyl compounds, third monomers and initiators (such as an organic alkali metal, a secondary amine and a tertiary amine) used in production method 1-3 of the present invention are the same as used in the above-mentioned first production method.

Further, the alkoxysilane-based compounds used in production method 1-3 of the present invention also include an amino group-containing alkoxysilane-based compound, and include the above-mentioned alkoxysilane compound represented by formula (9), the above-mentioned alkoxysilane compound containing the amino group protected with the protective group, etc.

The amount of the alkoxysilane-based compound used in the above-mentioned coupling reaction can be added usually in an amount of 0.05 to 5.0 moles, and preferably in an amount of 0.1 to 2.0 moles, per gram atom equivalent of alkali metal or alkali earth metal of the initiator.

Further, in production method 1-3, when the reactivity of the initiator is intended to be improved, or when the aromatic vinyl compound introduced into the polymer is intended to be randomly arranged or a single chain of the aromatic vinyl compound is intended to be given, the above-mentioned potassium compound may be added together with the polymerization initiator.

In the present invention, as described above, either a conjugated diolefin or a conjugated diolefin and an aromatic vinyl compound are polymerized by anionic polymerization, and the above-mentioned alkoxysilane-based compound is allowed to react with a polymerization active terminal thereof by coupling reaction. The coupling is usually from 0 to 120° C., and preferably from 50 to 100° C., and the reaction time is from 1 to 30 minutes, and preferably from 5 to 20 minutes.

Further, the compound having two or more alkoxyl groups on the same carbon atom may be added at any time of at the start of the polymerization, at the termination of the polymerization, after the coupling reaction, at solvent separation and before drying. However, it is preferred that the compound is added to the polymerization system after the coupling reaction, in terms of efficient dispersion into the polymer.

The temperature at the time of addition of the above-mentioned compound having two or more alkoxyl groups on the same carbon atom is usually from 0 to 100° C., and preferably from 20 to 80° C., and the addition time (treating time) is usually from 1 to 30 minutes, and preferably from 5 to 20 minutes.

The above-mentioned compounds (5) include, for example, tetramethoxymethane, tetraethoxymethane, tetra-n-propoxy-methane, trimethyl orthoformate, triethyl orthoformate, tri-n-propyl orthoformate, triisopropyl orthoformate, tri-butyl orthoformate, trimethyl orthoacetate, triethyl ortho-acetate, trimethyl orthopropionate, triethyl orthopropionate, trimethyl ortho-n-butyrate, triethyl ortho-n-butyrate, trimethyl orthovalerate, triethyl orthovalerate, trimethyl orthobenzoate, triethyl orthobenzoate, dimethoxymethane, diethoxymethane, acetaldehyde dimethyl acetal, acetaldehyde diethyl acetal, 1,1-dimethoxypropane, 1,1-diethoxypropane, benzaldehyde dimethyl acetal, phenylacetaldehyde dimethyl acetal, 2-chloro-1,1,1-trimethoxyethane, 2-bromo-1,1,1-tri-methoxyethane, 2-bromo-1,1-dimethoxyethane, 2-chloro-1,1-dimethoxyethane, 3,3-dimethoxy-1-propene, etc., and preferred are triethyl orthoformate, tri-n-propyl orthoformate and diethoxymethane.

The above-mentioned compounds (6) include, for example, 1,1,3,3-tetramethoxypropane, 1,1,3,3-tetraethoxypropane, 1,1,3,3-tetramethoxybutane, 1,1,3,3-tetraethoxybutane, etc., and preferred is 1,1,3,3-tetraethoxypropane.

The amount of the above-mentioned compound (5) and/or (6) added is a 0.1-fold molar excess or more, preferably an equimolar excess or more, and more preferably from an equimolar to a 15-fold excess, in relation to the alkoxysilane-based compound to be reacted with the polymerization active terminal. Less than a 0.1-fold molar excess results in an increase in Mooney viscosity after drying. Further, the effect of restraining the variation of the Mooney viscosity with the elapse of time is also unfavorably insufficient.

Further, the amount of the above-mentioned compound (5) and/or (6) added is 0.005 part by weight or more, preferably 0.05 part by weight or more, and more preferably from 0.05 to 1.0 part by weight, based on 100 parts by weight of the conjugated diolefin (co)polymer rubber.

The weight average molecular weight of (co)polymer rubber (ii) of the present invention is usually from 100,000 to 2,000,000, and preferably from 150,000 to 1,700,000. Less than 100,000 results in insufficient breaking strength, wear resistance, low hysteresis loss properties, etc. of the resulting rubber composition, whereas exceeding 2,000,000 results in inferior processability, and in deterioration of filler dispersibility at the time of kneading, which causes deterioration of breaking strength, wear resistance, low hysteresis loss properties and wet-skid properties.

The Mooney viscosity ($ML_{1+4}$, 100° C.) of (co)polymer rubber (ii) of the present invention is preferably within the range of 20 to 200. Less than 20 results in deterioration of breaking strength, wear resistance and low hysteresis loss properties, whereas exceeding 200 results in inferior processability.

The (co)polymer rubber (ii) of the present invention can be oil extended to obtain an oil-extended (co)polymer rubber, similarly to the above-mentioned (co)polymer rubber (i), which can be kneaded with a reinforcing agent, compounding agent, etc. and vulcanized to use for various industrial products. When the reinforcing agent such as silica, a silane coupling agent or carbon black, the vulcanizing agent, etc. are used, the kind thereof and the amount thereof used are also the same as described above.

Rubber-Inorganic Compound Composites

Conjugated diolefin (co)polymer rubber (I) used in the rubber-inorganic compound composite of the present invention is the above-mentioned conjugated diolefin (co)polymer rubber (i) and/or conjugated diolefin (co)polymer rubber (ii). The above-mentioned (co)polymer rubber (i) component has both the primary amino group and the alkoxysilyl group, thereby having an affinity for (II) an inorganic compound such as silica, carbon black or the compound represented by the above-mentioned formula (10), which makes it possible to blend (II) this inorganic compound uniformly and in large amounts.

In the present invention, the extender oil may be added to component (I) to form an oil-extended rubber, and then, (II) the inorganic compound may be mixed to form the oil-extended rubber-inorganic compound composite of the present invention, or components (I) and (II) may be blended to form a rubber-inorganic compound composite, and then, the extender oil may be mixed to form the oil-extended rubber-inorganic compound composite. Preferred is the former.

Further, the amount of the extender oil in the oil-extended rubber-inorganic compound composite of the present invention is from 10 to 100 parts by weight based on 100 parts by weight of the rubber matter of the rubber-inorganic compound composite. When the extender oil is less than 10 parts by weight, the effect of addition is not observed. On the other hand, exceeding 100 parts by weight results in a reduction in breaking strength.

There is no particular limitation on (II) the inorganic compound mixed with the rubber-inorganic compound composite of the present invention, as long as it is an inorganic compound. Examples thereof include clay, calcium carbonate, magnesium carbonate, etc., as well as silica, carbon black (including the carbon-silica dual phase filler) and the compound represented by the above-mentioned formula (10). Above all, silica, a combination of carbon black and silica, the carbon-silica dual phase filler or a combination of the carbon-silica dual phase filler and carbon black and/or silica is preferably used.

Further, specific examples of compounds (10) are preferably lamellar inorganic compounds, and include, for example, swellable mica, montmorillonite, bentonite, saponite, hectorite, organic modified swellable mica, organic modified montmorillonite, organic modified bentonite, organic modified saponite, organic modified hectorite, etc.

Using the lamellar compound, viscoelasticity becomes adjustable.

As (II) the inorganic compound, particularly for low fuel consumption tire application, the use of silica is preferred. The specific surface area (BET method) thereof is preferably from 45 to 280 m$^2$/g.

Further, when good wear resistance and breaking strength are expected, carbon black described above is suitably used as (II) the inorganic compound.

Furthermore, it is also possible to incorporate carbon black and silica together. By using carbon black and silica together as (II) the inorganic compounds, these fillers having the reinforcing action are homogeneously finely dispersed in the rubber, thereby being able to provide the rubber excellent in roll processability, extrusion properties, etc.

In the present invention, the carbon-silica dual phase filler can be incorporated in the same manner as described above.

The compounding amount of (II) the inorganic compound described above is from 1 to 1,000 parts by weight, and preferably from 20 to 200 parts by weight, based on 100 parts by weight of (I) the conjugated diolefin (co)polymer rubber. Less than 1 part by weight results in insufficiency of the improving effect according to complexing, whereas exceeding 1,000 parts by weight results in too small the amount of the rubber based on the inorganic compound, which make it difficult to take out the composite.

The rubber-inorganic compound composite of the present invention may be produced by blending component (II) with a solution of a polymer of compound (I) (a wet blend method), or by dry blending components (I) and (II) (a dry blend method).

Here, in the case of the wet blend method, there can be mentioned, for example, a method of adding (II) the inorganic compound to a polymer solution of (I) the conjugated diolefin (co)polymer rubber, followed by mixing in a slurry state. This method can operationally omit a process of mixing compound (I) and compound (II), and is preferred because of excellent mixing uniformity of both. When (II) the inorganic compound is added to the polymer solution, it is preferably added after the termination of the polymerization, for example, after the addition of the terminal modifier or after the addition of the polymerization terminator. A necessary amount of (II) the inorganic compound is added to the polymer solution containing an organic solvent, and mixed well in a slurry state (a first step). Then, ① a crumb is obtained by a steam stripping method of blowing steam into the polymer slurry solution containing (II) the inorganic compound, or ② the polymer slurry solution containing (II) the inorganic compound is directly desolvated by a means such as an extruder or a devolatilizer to separate the rubber-inorganic compound composite from the solvent (a second step). The resulting wet rubber-inorganic compound composite is dried with a vacuum drier, a hot air dryer, a roll or the like as needed (a third step), thereby being able to isolate the desired rubber-inorganic compound composite.

Further, in the case of the dry blend method, it is also possible to blend (I) the conjugated diolefin (co)polymer rubber and (II) the inorganic compound to prepare the rubber-inorganic compound composite. In this case, as a blending process, there is employed a single-screw extruder, a twin-screw extruder, a Banbury mixer, a roll, a kneader, a plastomill or the like, and the kneading temperature is suitably from 50 to 200° C.

Composite-Containing Rubber Compositions

The (oil-extended) rubber-inorganic compound composite of the present invention is prepared as a rubber composition by incorporating another rubber component, a filler containing (II) the inorganic compound, etc., as well as (I) the (co)polymer used in the present invention.

That is to say, as for the rubber-inorganic compound composite of the present invention, another component such as natural rubber, polyisoprene rubber, polybutadiene rubber or emulsion-polymerized styrene-butadiene rubber, a variety of filler such as carbon black or silica containing (II) the inorganic compound of the present invention, and a variety of compounding agent, as well as (I) the (co)polymer rubber [oil-extended (co)polymer rubber] of the present invention, are kneaded by means of a roll or a Banbury mixer, followed by the addition of sulfur, a vulcanization accelerator, etc., thereby being able to use as a belt, another vibration-proof rubber or another industrial product, starting with a rubber for a tire such as a tread, a sidewall or a carcass, as well as a vibration-damping material for an constraint board.

Here, as for the ratio of the filler containing (II) the inorganic compound to the rubber component containing component (I) in the rubber composition containing the composite of the present invention, the filler is from 20 to 120 parts by weight based on 100 parts by weight of the rubber component. Less than 20 parts by weight results in insufficiency of the improving effect according to the filler, whereas exceeding 120 parts by weight results in too hard a material prepared to be put to practical use.

In the rubber composition containing the composite of the present invention, in order to improve hysteresis loss characteristics, it is desirable to incorporate at least 1 part by weight of the filler, preferably 5 to 100 parts by weight of silica, and further 0.5 to 20% by weight of the silane coupling agent based on silica. When the compounding amount of silica is less than 1 part by weight, improvement of hysteresis loss characteristics is not sufficient.

Further, silica (including the carbon-silica dual phase filler) and the silane coupling agent may be incorporated either in the preparation of the rubber-inorganic compound composite of the present invention or in the preparation of the rubber composition of the present invention.

When silica or a combination of carbon black and silica is used as the filler, or when the carbon-silica dual phase filler is used as the filler, the use of the silane coupling agent can enhance the reinforcing effect thereof.

A vulcanizing agent, a vulcanization accelerator, zinc white, a vulcanization auxiliary, an antiaging agent, a processing aid, etc. can be used in the rubber composition containing the composite of the present invention in the same manner as described above ad needed.

A method for kneading the rubber composition containing the composite of the present invention is not particularly limited. However, when the filler contains silica, the kneading can also be carried out by the following method, in order to sufficiently achieve reinforcement with silica and to more improve the physical properties of vulcanized rubber.

Methods for kneading the rubber composition containing the rubber-inorganic compound composite of the present invention, the other rubber component, silica, the silane coupling agent, zinc white and the vulcanizing agent include (a) a method of mixing silica with the rubber-inorganic compound composite and the other rubber component, followed by kneading to prepare a first rubber composition, then, mixing the silane coupling agent with the first rubber composition, followed by kneading to prepare a second rubber composition, and subsequently, mixing zinc white and the vulcanizing agent with the second rubber composition, followed by kneading, or (b) a method of mixing silica with the rubber-inorganic compound composite and the other rubber composition, followed by kneading to prepare a first rubber composition, then, mixing the silane coupling agent with the first rubber composition, followed by kneading, further mixing zinc white, continuing the kneading to prepare a second rubber composition, and subsequently mixing the vulcanizing agent with the second rubber composition, followed by kneading.

According to the above-mentioned kneading methods, no silane coupling agent coexists in kneading the rubber-inorganic compound composite and the other rubber component with silica, so that the kneading temperature can be elevated to about 170 to about 180° C. Accordingly, silica can be sufficiently dispersed by fewer kneading times.

Various compounding agents for the rubber composition containing the composite of the present invention are not particularly limited. However, in order to improve processability at the time of kneading or to more improve a balance among wet-skid characteristics, low hysteresis loss and wear resistance, the above-mentioned compatibilizing agent can also be added at the time of kneading.

EXAMPLES

The present invention will be illustrated in greater detail with reference to the following examples, but the invention should not be construed as being limited by these examples.

Various measurements in the examples were made in accordance with the following methods.

(1) Vinyl Content of Conjugated Diolefin Moiety

The content was determined by 270-MHz $^1$H-NMR.

(2) Bonded Styrene Content

The content was determined by 270-MHz $^1$H-NMR.

(3) Contents of Styrene Single Chain Having One Styrene Unit and Styrene Long Chain Having 8 or More Continuous Styrene Units A styrene-butadiene copolymer rubber was decomposed with ozone according to the method of Tanaka et al. [Polymer, 22, 1721 (1981)], and then, analyzed by gel permeation chromatography (GPC) (HLC-8120 GPC manufactured by Tosoh Corporation).

(4) Glass Transition Temperature

The temperature was determined in accordance with ASTM D3418.

(4) Weight Average Molecular Weight

The molecular weight was determined in terms of polystyrene, using GPC.

(5) Molecular Weight Distribution

According to an elution curve of GPC [the same as the above (3)], it was judged whether the molecular weight distribution of a (co)polymer rubber was monomodal or bimodal. Further, for the molecular weight distribution, Mw/Mn was determined by the ratio of the weight average molecular weight (Mw) to the number molecular weight (Mn) in terms of polystyrene.

(6) Coupling Rate

The coupling rate was calculated from the peak area ratio of a polymer before coupling and a polymer whose molecular weight was increased by coupling, based on a GPC curve obtained by measurement using the above-mentioned GPC. For a polymer whose molecular weight distribution was monomodal, the coupling rate was calculated from the weight average molecular weight before coupling and the weight average molecular weight after coupling.

(7) Mooney Viscosity ($ML_{1+4}$, 100° C.)

The Mooney viscosity was measured by preheating at a temperature of 100° C. for 1 minute with an L rotor with a rotor operation time of 4 minutes in accordance with JIS K6300.

(8) Evaluation of Heating Acceleration of Polymer Rubber

A polymer rubber was allowed to stand in a thermostatic chamber having a temperature of 90° C. and a humidity of 50%, and the Mooney viscosity after 1 day and 2 days was measured (changes in Mooney viscosity with time were measured).

(9) Primary Amino Group Content (mmol/kg)

A (co)polymer was first dissolved in toluene, and then, precipitated in a large amount of methanol to separate an amino group-containing compound which was not bound to the (co)polymer rubber, followed by drying. Using the (co)polymer rubber subjected to this treatment as a sample, the total amino group content was determined by the "total amine value test method" described in JIS K7237. Subsequently, using the (co)polymer rubber subjected to this treatment as a sample, the contents of secondary amino groups and tertiary amino groups were determined by the "acetylacetone blocked method". o-Nitrotoluene was used as a solvent for dissolving the sample, and acetylacetone was added thereto. The potentiometric titration was conducted using a perchloric acid-acetic acid solution. The primary amino group content (mmol) was determined by subtracting the secondary amino group content and the tertiary amino group content from the total amino group content, and the content (mmol/kg) of primary amino groups bound to the polymer was determined by dividing by the weight of the polymer used for analysis.

(10) Tertiary Amino Group Content (mmol/kg)

A polymer was first dissolved in toluene, and then, precipitated in a large amount of methanol to separate an amino group-containing compound which was not bound to the (co)polymer rubber, followed by drying. Using the (co)polymer rubber subjected to this treatment as a sample, the tertiary amino group content was determined by the "acetylation method". o-Nitrotoluene and acetic acid were used as solvents for dissolving the sample, and a mixed solution of formic acid and acetic anhydride was added thereto. The potentiometric titration was conducted using a perchloric acid-acetic acid solution. The content (mmol/kg)

of tertiary amino groups bound to the polymer was determined by dividing the third amino group content (mmol), the determined value, by the weight of the polymer used for analysis.

(11) Alkoxysilyl Group Content (mmol/kg)

The alkoxysilyl group content was determined by the absorption at 1160 cm$^{-1}$ caused by a Si—C bond according to an infrared absorption spectrum.

(12) Cold Flow C/F (mg/min)

The cold flow was measured by extruding a polymer through a ¼-inch orifice at a pressure of 3.5 lb/in$_2$ at a temperature of 50° C. In order to obtain a steady state, the polymer was allowed to stand for 10 minutes, and then, the extrusion rate was measured. The value was indicated by milligrams per minute (mg/min). A smaller value shows better storage stability.

(13) Evaluation of Physical Properties of Vulcanized Rubber

A (co)polymer rubber was kneaded in a 250-cc Labo Plastomill according to each of compounding formulations shown in Tables, and then, vulcanized at 145° C. for a specific period of time. Using the resulting vulcanized rubber, various measurements of (a) to (e) described below were conducted.

(a) Tensile Strength (300% modulus): The tensile strength was measured in accordance with JIS K6301. It is indicated by an index number, and a larger value shows a higher and better tensile strength.

(b) tan δ: tan δ (50° C.) was measured under conditions of a strain under tension of 0.1%, a frequency of 10 Hz and 50° C., using a dynamic spectrometer of Rheometrix (US). It is indicated by an index number, and a larger value shows lower and better rolling resistance (hysteresis loss).

tan δ (0° C.) was also measured at a strain under tension of 1%, a frequency of 10 Hz and 0° C., using the same instrument. It is indicated by an index number, and a larger value shows larger and better wet-skid resistance.

tan δ (25° C.) was also measured at a strain under tension of 0.5%, frequencies of 1 Hz and 100 Hz and 25° C., using the same instrument. It is indicated by an index number, and a larger value shows more excellent and better damping characteristics.

(c) Dynamic-to-static modulus ratio: E' (elastic modulus) at 25° C. was measured using the above-mentioned dynamic spectrometer, and the ratio of E'$_{100Hz}$ at a frequency of 100 Hz to E'$_{1Hz}$ at a frequency of 1 Hz was calculated. Higher magnification (closer to 1) shows more excellent and better vibration proofing performance.

Further, low dynamic-to-static modulus ratio and high tan δ result in an excellent balance between damping characteristics and vibration proofing performance, which is preferred as a vibration-proof rubber.

(d) Lambourn Wear Index: Using a Lambourn type wear tester, the index was expressed as the amount of wear at a slip rate of 25%, and the measurement temperature was room temperature. A larger index shows better wear resistance.

(e) Kneading Processability: The unity and gloss of a damp rubber were visually inspected and evaluated.

Example 1

An autoclave reactor having an internal volume of 5 liters in which the atmosphere was replaced with nitrogen was charged with 2,750 g of cyclohexane, 41.3 g of tetrahydrofuran, 125 g of styrene and 365 g of 1,3-butadiene. After the temperature of the contents of the reactor was adjusted to 20° C., 325 mg of n-butyllithium was added to initiate polymerization. The polymerization was conducted under adiabatic conditions, and the maximum temperature reached 85° C.

At the time when the polymerization conversion reached 99%, 10 g of butadiene was added, followed by further polymerization for 5 minutes. Then, 1,560 mg of N,N-bis-(trimethylsilyl)aminopropylmethyldimethoxysilane was added, followed by polymerization for 15 minutes. After 2,6-di-tert-butyl-p-cresol was added to the polymer solution after reaction, 187.5 g (37.5 parts based on 100 parts of rubber components contained in the polymer solution) of an extender oil (manufactured by Fuji Kosan Co., Ltd., trade name: "Fukkol Aromax #3", V.G.C=0.963) (hereinafter also referred to as "A-Oil") was further added. Then, desolvation was conducted by steam stripping, and a rubber was dried with a hot roll controlled to 110° C. to obtain an oil-extended rubber. This oil-extended rubber is named copolymer rubber P-1. The composition and physical properties of copolymer rubber P-1 thus obtained are shown in Table 3.

Example 2

Copolymer rubber P-2 was obtained in the same manner as with Example 1 with the exception that the kind and amount of the additive were changed to 1-trimethylsilyl-2,2-dimethoxy-1-aza-2-silacyclopentane and 1,120 mg. The composition and physical properties of copolymer rubber P-2 thus obtained are shown in Table 3.

Example 3

Copolymer rubber P-3 was obtained in the same manner as with Example 1 with the exception that the initiator was changed to piperidine as a secondary amine and n-butyllithium in order to introduce a tertiary amino group into a polymerization initiating terminal. The composition and physical properties of copolymer rubber P-3 thus obtained are shown in Table 3.

Example 4

Copolymer rubber P-4 was obtained in the same manner as with Example 1 with the exception that no extender oil was added. The composition and physical properties of copolymer rubber P-4 thus obtained are shown in Table 3.

Example 5

Synthesis by Continuous Process

An autoclave reactor having an internal volume of 16 liters in which the atmosphere was replaced with nitrogen was continuously charged with 1,3-butadiene at 25.0 g/minute and styrene at 14.05 g/minute as monomers, cyclohexane at 237.1 g/minute and tetrahydrofuran at 3.0 g/minute as solvents, and n-butyllithium at 18.67 mg/minute. The temperature of the reactor was controlled at 75° C.

The polymer solution was continuously discharged at 279.2 g/minute from the first reactor, and N,N-bis(trimethylsilyl)-aminopropylmethyldimethoxysilane was added at 90 mg/minute, and continuously introduced into a second reactor to conduct reaction. At an outlet of the second reactor, di-tert-butyl-p-cresol was added in an amount of 0.7 part by weight based on 100 parts by weight of rubber.

An extender oil was further added in an amount of 14.64 g/minute (corresponding to 37.5 parts based on 100 parts of rubber components contained in the polymer solution). Then, desolvation was conducted by steam stripping, and a rubber was dried with a hot roll controlled to 110° C. to obtain an oil-extended rubber. This oil-extended rubber is named copolymer rubber P-5. The composition and physical properties of copolymer rubber P-5 thus obtained are shown in Table 3.

Example 6

Synthesis by Batch Process

Copolymer rubber P-6 was obtained in the same manner as with Example 1 with the exception that 10 g of butadiene was added at the time when the polymerization conversion reached 99%, followed by further reaction for 5 minutes, thereafter, 1,250 g of N,N-bis(trimethylsilyl)aminopropyl-methyldimethoxysilane was added, followed by reaction for 10 minutes, and then, 43.19 of SiCl$_4$ was further added, followed by reaction for 15 minutes.

Example 7

Copolymer rubber P-7 was obtained in the same manner as with Example 6 with the exception that the extender oil added was changed to an extender oil (manufactured by Fuji Kosan Co., Ltd., trade name: Fukkol Flex #1400N, V.G.C=0.901) (hereinafter also referred to as "N-Oil").

Comparative Examples 1, 2 and 4 to 7

Copolymer rubbers Q-1, Q-2 and Q-4 to Q-7 were obtained in the same manner as with Example 1 with the exception that the polymer formulation was changed to ones shown in Table 2. The composition and physical properties of the resulting copolymer rubbers are shown in Table 4.

Comparative Example 3

Synthesis by Continuous Process

Copolymer rubber Q-3 was obtained in the same manner as with Example 5 with the exception that the polymerization formulation was changed to ones shown in Table 2. The composition and physical properties of the resulting copolymer rubbers are shown in Table 4.

Examples 8 to 14

Compounded rubbers each prepared according to compounding formulation I shown in Table 5 using copolymer rubbers P-1 to P-7 synthesized in Examples 1 to 7 were vulcanized, and the physical properties were evaluated. Results thereof are shown in Table 6.

Comparative Examples 8 to 14

Compounded rubbers each prepared according to compounding formulation I shown in Table 5 using copolymer rubbers Q-1 to Q-7 synthesized in Comparative Examples 1 to 7 were vulcanized, and the physical properties were evaluated. Results thereof are shown in Table 6.

Examples 15 to 21

Compounded rubbers each prepared according to compounding formulation II shown in Table 5 using copolymer rubbers P-1 to P-7 synthesized in Examples 1 to 7 were vulcanized, and the physical properties were evaluated. Results thereof are shown in Table 7.

Comparative Examples 15 to 21

Compounded rubbers each prepared according to compounding formulation II shown in Table 5 using copolymer rubbers Q-1 to Q-7 synthesized in Comparative Examples 1 to 7 were vulcanized, and the physical properties were evaluated. Results thereof are shown in Table 7.

Examples 22 to 25

Compounded rubbers each prepared according to compounding formulation III (Examples 22 and 23) and compounding formulation IV (Examples 24 and 25) shown in Table 5 using copolymer rubbers P-1 and P-2 synthesized in Examples 1 and 2 were vulcanized, and the physical properties were evaluated. Results thereof are shown in Table 8.

Comparative Examples 22 to 25

Compounded rubbers each prepared according to compounding formulation III (Comparative Examples 22 and 23) and compounding formulation IV (Comparative Examples 24 and 25) shown in Table 5 using copolymer rubbers Q-1 and Q-4 synthesized in Comparative Examples 1 and 4 were vulcanized, and the physical properties were evaluated. Results thereof are shown in Table 8.

Example 26

A compounded rubber prepared according to compounding formulation V shown in Table 5 using copolymer rubber P-1 synthesized in Example 1 was vulcanized, and the physical properties were evaluated. Results thereof are shown in Table 8.

Comparative Example 26

A compounded rubber prepared according to compounding formulation V shown in Table 5 using copolymer rubber Q-1 synthesized in Comparative Example 1 was vulcanized, and the physical properties were evaluated. Results thereof are shown in Table 8.

Example 27

A compounded rubber prepared according to compounding formulation VI shown in Table 5 using copolymer rubber P-4 synthesized in Example 4 was vulcanized, and the physical properties were evaluated. Results thereof are shown in Table 9.

Comparative Example 27

A compounded rubber prepared according to compounding formulation VI shown in Table 5 using copolymer rubber Q-2 synthesized in Comparative Example 2 was vulcanized, and the physical properties were evaluated. Results thereof are shown in Table 9.

The following are known from the results of Tables 6 to 11.

From the results of evaluation in carbon black compounding of Tables 6 and 7, the case of Examples 8 to 14 in which the conjugated diolefin copolymer rubbers of the invention were used has good processability, and the wet-skid characteristics (tan δ at 0° C.), the low hysteresis loss properties (tan δ at 50° C.) and the wear resistance are concurrently balanced in a high level, without impairing the breaking strength. This is also similar for all of silica compounding of Tables 7 to 9 (Examples 15 to 21), compounding having a combination of carbon black and silica (examples 22 to 25) and carbon-silica dual phase filler compounding (Example 26) of Table 8 and low silica filling compounding (Example 27) of Table 9.

On the other hand, in the case of Comparative Examples 11 and 16 in which conjugated diolefin copolymer rubber Q-4 having only the primary amino group was used, the effect of improving various physical properties particularly in silica compounding is small. Further, in the case of Comparative Examples 12 and 19 in which conjugated diolefin copolymer rubber Q-5 having only the alkoxysilyl group was used, the effect of improving various physical properties particularly in carbon black compounding is small. Also in the case of Comparative Examples 13 and 20 in which conjugated diolefin copolymer rubber Q-6 having the tertiary group and the alkoxysilyl group was used, the improvement of various physical properties in the conjugated diolefin (co)polymer rubber of the invention is not attained.

From the results of evaluation in compounding of Table 8 in which carbon black and silica were used in combination and the amount of the silane coupling agent was reduced (comparison between Examples 24 and 25 and Comparative Examples 24 and 25), it is known more significantly that the conjugated diolefin (co)polymer rubbers of the invention improves the wet-skid characteristics and low hysteresis loss properties without impairing the processability, breaking strength and wear resistance.

Further, as apparent from Tables 1 to 9, Examples 1 to 3 and 5 are examples in which the rubbers modified with N,N-bis(trimethylsilyl)aminopropylmethyldimethoxysilane and previously oil-extended were used, and Examples 6 and 7 are examples in which the rubbers modified with N,N-bis(tri-methylsilyl)aminopropylmethyldimethoxysilane/silicon tetrachloride and previously oil-extended were used. The physical properties intended in the invention are obtained.

In contrast, Comparative Examples 1 and 3 are examples in which the rubbers modified with silicon tetrachloride alone and previously oil-extended were used, and it is known that the physical properties are inferior to those of Examples described above.

Example 28

A reaction vessel having an internal volume of 5 liters in which the atmosphere was replaced with nitrogen was charged with 3,000 g of cyclohexane, 550 g of 1,3-butadiene and 21.2 g of tetrahydrofuran.

After the polymerization initiating temperature was adjusted to 30° C., 337 mg of n-butyllithium was added to conduct polymerization. At the time when the polymerization conversion reached 100%, 1,620 mg of N,N-bis(trimethyl-silyl) aminopropylmethyldimethoxysilane was added, and reacted for 15 minutes. Then, 2,6-di-tert-butyl-p-cresol was added to the polymer solution, desolvation was conducted by steam stripping, and a rubber was dried with a hot roll of 110° C. to obtain rubber P-8. The properties of this rubber P-8 are as shown in Table 10. Using this rubber, a rubber composition was obtained according to compounding formulation II of Table 5. Results thereof are shown in Table 11.

Example 29

Rubber P-9 shown in Table 10 was obtained in the same manner as with Example 28 with the exception that 1,250 g of N,N-bis(trimethylsilyl)aminopropylmethyldimethoxysilane, the modifier, was added, followed by reaction for 10 minutes, and then, 66.1 mg of $SnCl_4$ was further added, followed by reaction for 10 minutes, and a rubber composition shown in Table 11 was obtained in the same manner as with Example 28.

Comparative Example 28

Rubber Q-8 shown in Table 10 was obtained in the same manner as with Example 28 with the exception that 1,620 mg of N,N-bis(trimethylsilyl)aminopropylmethyldimethoxysilane of rubber P-8 was changed to 308 mg of tin tetrachloride, and a rubber composition shown in Table 11 was obtained in the same manner as with Example 28.

Example 30

A reaction vessel having an internal volume of 5 liters in which the atmosphere was replaced with nitrogen was charged with 3,000 g of cyclohexane, 550 g of isoprene and 24 g of tetrahydrofuran. After the polymerization initiating temperature was adjusted to 30° C., 337 mg of n-butyllithium was added to conduct polymerization.

At the time when the polymerization conversion reached 100%, 1,620 mg of N,N-bis(trimethylsilyl)aminopropylmethyldimethoxysilane was added, and reacted for 10 minutes.

Then, 2,6-di-tert-butyl-p-cresol was added to the polymer solution, desolvation was conducted by steam stripping, and a rubber was dried with a hot roll of 110° C. to obtain rubber P-10. The properties of this rubber P-10 are as shown in Table 10. Using this rubber, a rubber composition was obtained according to compounding formulation II of Table 5. Results thereof are shown in Table 11.

Comparative Example 29

Rubber Q-9 shown in Table 10 was obtained in the same manner as with Example 28 with the exception that 1,620 mg of N,N-bis(trimethylsilyl)aminopropylmethyldimethoxysilane of rubber P-8 was changed to 308 mg of tin tetrachloride, and a rubber composition shown in Table 11 was obtained in the same manner as with Example 28.

TABLE 1

|  | Example | | | | | | |
|---|---|---|---|---|---|---|---|
|  | 1 | 2 | 3 | 4 | 5 | 6 | 7 |
| Copolymer Rubber | P-1 | P-2 | P-3 | P-4 | P-5*6 | P-6 | P-7 |
| Polymerization Formulation | Batch | Batch | Batch | Batch | Continuous | Batch | Batch |
| Solvent: Cyclohexane (g) | 2,750 | 2,750 | 2,750 | 2,750 | 237.1 | 2,750 | 2,750 |
| Vinyl Content Adjustor: Tetrahydrofuran (g) | 41.3 | 41.3 | 41.3 | 19.25 | 3.0 | 41.3 | 41.3 |
| Polymerization Monomer: | | | | | | | |
| Styrene (g) | 125 | 125 | 125 | 180 | 14.05 | 125 | 125 |
| Butadiene (g) | 375 | 375 | 375 | 320 | 25.0 | 375 | 375 |
| Initiator: | | | | | | | |
| n-BuLi*1 (mg) | 325 | 325 | 325 | 215 | 18.67 | 325 | 325 |
| Piperidine (mg) | 0 | 0 | 256 | 0 | 0 | 0 | 0 |
| Additive: | | | | | | | |
| N—Si-1*2 (mg) | 1,560 | 0 | 1,560 | 1,030 | 90 | 1250 | 1250 |
| N—Si-2*3 (mg) | 0 | 1,120 | 0 | 0 | 0 | 0 | 0 |
| $SiCl_4$ (mg) | 0 | 0 | 0 | 0 | 0 | 43.1 | 43.1 |
| Extender Oil: | | | | | | | |
| A-Oil (g)*4 | 187.5 | 187.5 | 187.5 | 0 | 14.64 | 187.5 | 0 |
| N-Oil (g)*5 | 0 | 0 | 0 | 0 | 0 | 0 | 187.5 |

*1n-BuLi: n-Butyllithium
*2N—Si-1: N,N-Bis(trimethylsilyl)aminopropylmethyldimethoxysilane
*3N—Si-2: 1-Trimethylsilyl-2,2-dimethoxy-1-aza-2-silacyclopentane
*4A-Oil: Manufactured by Fuji Kosan Co., Ltd., Fukkol Aromax #3
*5N-Oil: Manufactured by Fuji Kosan Co., Ltd., trade name: Fukkol Flex #1400N
*6Copolymer Rubber P-5: The amount added per minute by the continuous process

TABLE 2

|  | Comparative Example | | | | | | |
|---|---|---|---|---|---|---|---|
|  | 1 | 2 | 3 | 4 | 5 | 6 | 7 |
| (Co)polymer Rubber | Q-1 | Q-2 | Q-3*3 | Q-4 | Q-5 | Q-6 | Q-7 |
| Polymerization Formulation | Batch | Batch | Continuous | Batch | Batch | Batch | Batch |
| Solvent: Cyclohexane (g) | 2,750 | 2,750 | 237.1 | 2,750 | 2,750 | 2,750 | 2,750 |
| Vinyl Content Adjustor: Tetrahydrofuran (g) | 41.3 | 19.25 | 3.0 | 41.3 | 41.3 | 41.3 | 41.3 |
| Polymerization Monomer: | | | | | | | |
| Styrene (g) | 125 | 180 | 14.05 | 125 | 125 | 125 | 125 |
| Butadiene (g) | 375 | 320 | 0 | 375 | 375 | 375 | 375 |
| Initiator: | | | | | | | |
| n-BuLi (mg) | 325 | 215 | 18.67 | 325 | 325 | 325 | 325 |
| Piperidine (mg) | 0 | 0 | 0 | 0 | 0 | 256 | 0 |
| Additive: | | | | | | | |
| SiOR-1*1 (mg) | 0 | 0 | 1 | 0 | 1270 | 1270 | 0 |
| $SiCl_4$ (mg) | 172 | 114 | 10 | 0 | 0 | 0 | 172 |
| $NH_2$-1*2 (mg) | 0 | 0 | 0 | 1,205 | 0 | 0 | 0 |

TABLE 2-continued

|  | Comparative Example | | | | | | |
|---|---|---|---|---|---|---|---|
|  | 1 | 2 | 3 | 4 | 5 | 6 | 7 |
| Extender Oil: | | | | | | | |
| A-Oil (g) | 187.5 | 0 | 14.64 | 187.5 | 187.5 | 187.5 | 0 |
| N-Oil (g) | 0 | 0 | 0 | 0 | 0 | 0 | 187.5 |

*1 SiOR-1: Methyltriphenoxysilane
*2 $NH_2$-1: N,N-Bis(trimethylsilyl)-3-chloropropylamine
*3 (Co)polymer rubber Q-3: The amount added per minute by the continuous process

TABLE 3

|  | Example | | | | | | |
|---|---|---|---|---|---|---|---|
|  | 1 | 2 | 3 | 4 | 5 | 6 | 7 |
| (Co)polymer Rubber | P-1 | P-2 | P-3 | P-4 | P-5 | P-6 | P-7 |
| Bonded Styrene Content (wt %) | 25 | 25 | 25 | 36 | 37 | 25 | 25 |
| Vinyl Content (mol %) | 55 | 55 | 54 | 42 | 43 | 55 | 55 |
| Glass Transition Temperature (° C.) | −32 | −32 | −33 | −31 | −31 | −32 | −36 |
| Weight Average Molecular Weight (ten thousand) | 31 | 28 | 30 | 40 | 60 | 35 | 35 |
| Mooney Viscosity | 42 | 36 | 40 | 80 | 39 | 44 | 41 |
| Primary Amino Group Content (mmol/kg) | 6.3 | 5.7 | 5.9 | 3.7 | 3.0 | 5.9 | 5.9 |
| Tertiary Amino Group Content (mmol/kg) | — | — | 6.3 | — | — | — | — |
| Alkoxysilyl Group Content (mmol/kg) | 6.0 | 10.3 | 5.6 | 3.6 | 2.8 | 5.8 | 5.9 |
| Mode of Molecular Weight Distribution | Monomodal | Bimodal | Monomodal | Monomodal | Monomodal | Bimodal | Bimodal |
| Mw/Mn | 1.1 | 1.5 | 1.1 | 1.1 | 2.0 | 1.5 | 1.5 |

TABLE 4

|  | Comparative Example | | | | | | |
|---|---|---|---|---|---|---|---|
|  | 1 | 2 | 3 | 4 | 5 | 6 | 7 |
| (Co)polymer Rubber | Q-1 | Q-2 | Q-3 | Q-4 | Q-5 | Q-6 | Q-7 |
| Bonded Styrene Content (wt %) | 25 | 36 | 36 | 25 | 25 | 25 | 25 |
| Vinyl Content (mol %) | 55 | 42 | 43 | 55 | 55 | 55 | 55 |
| Glass Transition Temperature (° C.) | −32 | −31 | −31 | −32 | −32 | −32 | −36 |
| Weight Average Molecular Weight (ten thousand) | 76 | 77 | 115 | 28 | 32 | 30 | 76 |
| Mooney Viscosity | 45 | 40 | 80 | 28 | 46 | 44 | 40 |
| Primary Amino Group Content (mmol/kg) | — | — | — | 3.8 | — | — | — |
| Tertiary Amino Group Content (mmol/kg) | — | — | — | — | — | 6.0 | — |
| Alkoxysilyl Group Content (mmol/kg) | — | — | — | — | 9.0 | 5.7 | — |
| Mode of Molecular Weight Distribution | Bimodal | Bimodal | Monomodal | Monomodal | Bimodal | Bimodal | Bimodal |
| Mw/Mn | 1.6 | 1.6 | 2.2 | 1.1 | 1.4 | 1.5 | 1.6 |

TABLE 5

| Compounding Formulation (phr) | I | II | III | IV | V | VI |
|---|---|---|---|---|---|---|
| (Co)polymer Rubber*1 | 100 | 70 | 100 | 100 | 70 | 80 |
| Extender Oil (A-Oil)*2 | 37.5 | 37.5 | 37.5 | 37.5 | 37.5 | 10 |
| Butadiene Rubber BR01*3 | 0 | 30 | 0 | 0 | 30 | 0 |
| Natural Rubber RSS No. 3*4 | 0 | 0 | 0 | 0 | 0 | 20 |
| Carbon Black N339*5 | 70 | 0 | 40 | 40 | 0 | 0 |
| Silica AQ*6 | 0 | 70 | 30 | 30 | 0 | 50 |
| Dual Phase Filler CRX2002*7 | 0 | 0 | 0 | 0 | 70 | 0 |
| Silane Coupling Agent Si69*8 | 0 | 5.6 | 2.4 | 0.3 | 1.4 | 4.0 |
| Stearic Acid | 2.0 | 2.0 | 2.0 | 2.0 | 2.0 | 2.0 |
| Antioxidant 810NA*9 | 1.0 | 1.0 | 1.0 | 1.0 | 1.0 | 1.0 |
| Zinc Oxide | 3.0 | 3.0 | 3.0 | 3.0 | 3.0 | 3.0 |
| Vulcanization Accelerator NS*10 | 1.0 | 0 | 0 | 0 | 0 | 0 |
| Vulcanization Accelerator CZ*11 | 0 | 1.5 | 1.5 | 1.5 | 1.5 | 1.5 |
| Vulcanization Accelerator D*12 | 0.5 | 1.0 | 1.0 | 1.0 | 1.0 | 1.0 |
| Sulfur | 1.5 | 1.5 | 1.5 | 1.5 | 1.5 | 1.5 |

*1 When a (co)polymer rubber previously oil-extended is used, the amount of the (co)polymer rubber is indicated as the amount of only a rubber portion obtained by removing extender oil components from the oil-extended (co)polymer rubber.

TABLE 5-continued

| Compounding Formulation (phr) | I | II | III | IV | V | VI |
|---|---|---|---|---|---|---|

*2 When a copolymer rubber previously oil-extended is used, the amount of the extender oil is indicated as the total amount of an extender oil contained in the oil-extended (co)polymer rubber and an extender oil additionally added in kneading.
*3 BR01 manufactured by JSR Corporation
*4 Natural rubber RSS No. 3
*5 Diablack N339 manufactured by Mitsubishi Chemical Corporation
*6 Nipsil AQ manufactured by Nippon Silica Industrial Co., Ltd.
*7 CRX2002 manufactured by Cabot Corporation
*8 Si69 manufactured by Degussa AG
*9 NOCRAC 810Na manufactured by Ouchishinko Chemical Industrial Co., Ltd.
*10 NOCCELER NS-F manufactured by Ouchishinko Chemical Industrial Co., Ltd.
*11 NOCCELER CZ manufactured by Ouchishinko Chemical Industrial Co., Ltd.
*12 NOCCELER D manufactured by Ouchishinko Chemical Industrial Co., Ltd.

TABLE 6

| | Example | | | | | | | Comparative Example | | | | | | |
|---|---|---|---|---|---|---|---|---|---|---|---|---|---|---|
| | 8 | 9 | 10 | 11 | 12 | 13 | 14 | 8 | 9 | 10 | 11 | 12 | 13 | 14 |
| Compounding Formulation No. (Table 5) | I | I | I | I | I | I | I | I | I | I | I | I | I | I |
| (Co)polymer Rubber No. | P-1 | P-2 | P-3 | P-4 | P-5 | P-6 | P-7 | Q-1 | Q-2 | Q-3 | Q-4 | Q-5 | Q-6 | Q-7 |
| Kneading Processability | ◉ | ◉ | ◉ | ◉ | ◉ | ◉ | ◉ | ◉ | ◉ | ◉ | ◉ | ◉ | ◉ | ◉ |
| Tensile Strength (Index Number)*1 | 112 | 112 | 116 | 108 | 110 | 112 | 108 | 100 | 108 | 110 | 103 | 100 | 110 | 96 |
| tan δ (0° C.) (Index Number)*1 | 132 | 124 | 109 | 127 | 133 | 133 | 127 | 100 | 105 | 108 | 111 | 102 | 125 | 94 |
| tan δ (50° C.) (Index Number)*1 | 120 | 120 | 136 | 117 | 118 | 118 | 126 | 100 | 100 | 107 | 110 | 102 | 101 | 108 |
| Wear Resistance (Index Number)*1 | 109 | 109 | 110 | 104 | 108 | 108 | 109 | 100 | 108 | 110 | 94 | 100 | 97 | 101 |

*1 Index Number; Calculated taking the value of Comparative Example 8 as 100

TABLE 7

| | Example | | | | | | | Comparative Example | | | | | | |
|---|---|---|---|---|---|---|---|---|---|---|---|---|---|---|
| | 15 | 16 | 17 | 18 | 19 | 20 | 21 | 15 | 16 | 17 | 18 | 19 | 20 | 21 |
| Compounding Formulation No. (Table 5) | II | II | II | II | II | II | II | II | II | II | II | II | II | II |
| (Co)polymer Rubber No. | P-1 | P-2 | P-3 | P-4 | P-5 | P-6 | P-7 | Q-1 | Q-2 | Q-3 | Q-4 | Q-5 | Q-6 | Q-7 |
| Kneading Processability | ◉ | ◉ | ◉ | ◉ | ◉ | ◉ | ◉ | ◉ | ◉ | ◯ | ◉ | ◉ | ◉ | ◉ |
| Tensile Strength (Index Number) | 100 | 101 | 102 | 100 | 102 | 102 | 100 | 100 | 105 | 107 | 98 | 100 | 108 | 47 |
| tan δ (0° C.) (Index Number) | 126 | 121 | 137 | 117 | 131 | 125 | 117 | 100 | 97 | 99 | 105 | 109 | 114 | 95 |
| tan δ (50° C.) (Index Number) | 130 | 128 | 130 | 123 | 128 | 128 | 135 | 100 | 100 | 101 | 100 | 115 | 112 | 107 |
| Wear Resistance (Index Number)*1 | 113 | 115 | 107 | 124 | 128 | 111 | 112 | 100 | 106 | 115 | 105 | 116 | 100 | 102 |

TABLE 8

| | Example | | | | | Comparative Example | | | | |
|---|---|---|---|---|---|---|---|---|---|---|
| | 22 | 23 | 24 | 25 | 26 | 22 | 23 | 24 | 25 | 26 |
| Compounding Formulation No. (Table 5) | III | III | IV | IV | V | III | III | IV | IV | V |
| (Co)polymer Rubber No. | P-1 | P-2 | P-1 | P-2 | P-1 | Q-1 | Q-4 | Q-1 | Q-4 | Q-1 |
| Kneading Processability | ◉ | ◉ | ◯ | ◯ | ◉ | ◉ | ◉ | X | X | ◉ |

TABLE 8-continued

|  | Example | | | | | Comparative Example | | | | |
| --- | --- | --- | --- | --- | --- | --- | --- | --- | --- | --- |
|  | 22 | 23 | 24 | 25 | 26 | 22 | 23 | 24 | 25 | 26 |
| Tensile Strength (Index Number) | 110 | 109 | 100 | 100 | 112 | 100 | 100 | 85 | 90 | 102 |
| tan δ (0° C.) (Index Number) | 128 | 122 | 119 | 118 | 130 | 100 | 110 | 93 | 105 | 101 |
| tan δ (50° C.) (Index Number) | 125 | 123 | 115 | 110 | 125 | 100 | 105 | 88 | 100 | 101 |
| Wear Resistance (Index Number) | 108 | 106 | 100 | 105 | 110 | 100 | 100 | 80 | 90 | 100 |

TABLE 9

|  | Example 27 | Comparative Example 27 |
| --- | --- | --- |
| Compounding Formulation No. (Table 5) | VI | VI |
| (Co)polymer Rubber No. | P-4 | Q-2 |
| Kneading Processability | ⊚ | ⊚ |
| Strength (Index Number) | 100 | 100 |
| tan δ (0° C.) (Index Number) | 108 | 100 |
| tan δ (50° C.) (Index Number) | 116 | 100 |
| Wear Resistance (Index Number) | 110 | 100 |

TABLE 10

|  | Example 28 | Example 29 | Comparative Example 28 | Example 30 | Comparative Example 29 |
| --- | --- | --- | --- | --- | --- |
| (Co)polymer Rubber | P-8 | P-9 | Q-8 | P-10 | Q-9 |
| Vinyl Content (mol %) | 51 | 51 | 50 | 52 | 53 |
| Glass Transition Temperature (° C.) | −43 | −43 | −43 | −35 | −34 |
| Weight Average Molecular Weight (ten thousand) | 27 | 26 | 27 | 26 | 27 |
| Mooney Viscosity | 38 | 46 | 80 | 39 | 77 |
| Primary Amino Group Content (mmol/kg) | 5.9 | 6.0 | 0 | 6.1 | 0 |
| Tertiary Amino Group Content (mmol/kg) | — | — | — | — | — |
| Alkoxysilyl Group Content (mmol/kg) | 5.9 | 6.0 | 6.0 | 6.0 | 0 |
| Mode of Molecular Weight Distribution | Monomodal | Bimodal | Bimodal | Monomodal | Bimodal |
| Mw/Mn | 1.1 | 1.5 | 1.6 | 1.1 | 1.6 |

TABLE 11

|  | Example 28 | Example 29 | Comparative Example 28 | Example 30 | Comparative Example 29 |
| --- | --- | --- | --- | --- | --- |
| Compounding Formulation No. (Table 5) | II | II | II | II | II |
| (Co)polymer Rubber No. | P-8 | P-9 | Q-8 | P-10 | Q-9 |
| Kneading Processability | ○ | ⊚ | ⊚ | Δ | ⊚ |
| Tensile Strength (Index Number) | 115 | 116 | 100 | 103 | 95 |
| tan δ (0° C.) (Index Number) | 130 | 128 | 100 | 180 | 140 |
| tan δ (50° C.) (Index Number) | 115 | 114 | 100 | 105 | 86 |
| Wear Resistance (Index Number) | 108 | 107 | 100 | 132 | 88 |

Example 31

An autoclave reactor having an internal volume of 5 liters in which the atmosphere was replaced with nitrogen was charged with 2,750 g of cyclohexane, 41.3 g of tetrahydrofuran, 125 g of styrene, 365 g of 1,3-butadiene and 148 mg (0.41 mmol) of potassium dodecylbenzenesulfonate (DBS-K). After the temperature of the contents of the reactor was adjusted to 20° C., 325 mg (5.07 mmol) of n-butyllithium was added to initiate polymerization.

The polymerization was conducted under adiabatic conditions, and the maximum temperature reached 85° C.

At the time when the polymerization conversion reached 99%, 10 g of butadiene was added, followed by further polymerization for 5 minutes. Then, 1,560 mg of N,N-bis-(trimethylsilyl)aminopropylmethyldimethoxysilane was added, followed by polymerization for 15 minutes. After 2,6-di-tert-butyl-p-cresol was added to the polymer solution after reaction, 187.5 g (37.5 parts based on 100 parts of rubber components contained in the polymer solution) of an extender oil (A-Oil) was further added. Then, desolvation was conducted by steam stripping, and a rubber was dried with a hot roll controlled to 110° C. to obtain an oil-extended rubber. This oil-extended rubber is named copolymer rubber P-11.

Example 32

An oil-extended rubber was obtained in the same manner as with Example 31 with the exception that 1,120 mg of 1-trimethylsilyl-2,2-dimethoxy-1-aza-2-silacyclopentane was added as the terminal modifier without using N,N-bis-(tri-methylsilyl)aminopropylmethyldimethoxysilane. This oil-extended rubber is named copolymer rubber P-12.

Example 33

An oil-extended rubber was obtained in the same manner as with Example 31 with the exception that 1,248 g of N,N-bis-(trimethylsilyl)aminopropylmethyldimethoxysilane used as the terminal modifier was added, followed by reaction for 15 minutes, and then, 42.5 mg (0.25 mmol) of silicon tetrachloride was further added, followed by reaction for 15 minutes. This oil-extended rubber is named copolymer rubber P-13.

Example 34

An oil-extended rubber was obtained in the same manner as with Example 33 with the exception that 45.6 mg of potassium t-butoxide (t-BuOK) was added without using potassium dodecylbenzenesulfonate (DBS-K). This oil-extended rubber is named copolymer rubber P-14.

Example 35

An oil-extended rubber was obtained in the same manner as with Example 33 with the exception that 26.4 mg (0.5 time the molar quantity of DBS-K) of 2-ethylhexyl alcohol (2-EHOH) was added together with 148 mg of potassium dodecyl-benzenesulfonate (DBS-K). This oil-extended rubber is named copolymer rubber P-15.

Example 36

An oil-extended rubber was obtained in the same manner as with Example 33 with the exception that 187.5 g of N-Oil was added without using A-Oil as the extender oil. This oil-extended rubber is named copolymer rubber P-16.

Polymerization formulations of copolymer rubbers P-11 to P-16 are shown in Table 12, and properties of copolymer rubbers P-11 to P-16 thus obtained are shown in Table 13.

Further, compounded rubbers prepared using copolymer rubbers P-11 to P-16 according to compounding formulations shown in Table 14 were vulcanized, and physical properties thereof were evaluated. Results thereof are shown in Tables 15 to 18.

Example 37

A polymerization formulation of oil-extended rubber P-1 obtained by Example 1 is shown in Table 12, and properties of copolymer rubber P-1 thus obtained are shown in Table 13.

Further, compounded rubbers prepared using copolymer rubber P-1 according to compounding formulations shown in Table 14 were vulcanized, and physical properties thereof were evaluated. Results thereof are shown in Tables 15 to 19.

Comparative Example 30

An oil-extended rubber was obtained in the same manner as with Example 31 (copolymer rubber P-11) with the exception that 171.6 mg (1.01 mmol) of silicon tetrachloride was added to conduct reaction for 15 minutes without adding N,N-bis(tri-methylsilyl)aminopropylmethyldimethoxysilane used as the terminal modifier. This oil-extended rubber is named copolymer rubber Q-10.

A polymerization formulation of copolymer rubber Q-10 is shown in Table 12, and properties of copolymer rubber Q-10 thus obtained are shown in Table 13.

Further, compounded rubbers prepared using copolymer rubber Q-10 according to compounding formulations shown in Table 14 were vulcanized, and physical properties thereof were evaluated. Results thereof are shown in Tables 15 to 19.

Comparative Example 31

An oil-extended rubber was obtained in the same manner as with Comparative Example 30 with the exception that 187.5 g of N-Oil was added without using A-Oil as the extender oil. This oil-extended rubber is named copolymer rubber Q-11.

Examples 38 and 39 and Comparative Examples 32 and 33

Polymers were obtained in the same manner as with Example 31 according to polymerization formulations described in Table 12. Steam stripping and hot roll drying were performed without adding the extender oil to polymer solutions thus obtained, thereby obtaining oil-unextended rubbers P-17, P-18, Q-12 and Q-13.

Properties of the resulting copolymer rubbers are shown in Table 13. Further, compounded rubbers prepared using these rubbers according to compounding formulations shown in Table 14 were vulcanized, and physical properties thereof were evaluated. Results thereof are shown in Table 18.

As apparent from Tables 12 to 20, the copolymer rubbers of the present invention are improved in failure characteristics, wear resistance and low hysteresis loss characteristics without impairing wet-skid characteristics in any of compounding using silica, compounding using carbon black and compounding using silica and carbon black.

In contrast, in Comparative Examples using copolymer rubbers P-1A and Q-12 in which single chains and long chains of the aromatic vinyl compounds are out of the scope of the present invention, the failure characteristics and wear resistance are inferior.

Further, copolymer rubbers Q-10, Q-11 and Q-13 not modified with the amino group-containing alkoxysilane compound are insufficient in a balance among tensile strength, wet-skid performance, wear resistance and hysteresis loss characteristics.

TABLE 12

|  | Example | | | | | | Comparative Example | | Example | | Comparative Example | |
| --- | --- | --- | --- | --- | --- | --- | --- | --- | --- | --- | --- | --- |
|  | 31 | 32 | 33 | 34 | 35 | 36 | 30 | 31 | 35 | 36 | 32 | 33 |
| Copolymer Rubber Polymerization Formulation | P-11 | P-12 | P-13 | P-14 | P-15 | P-16 | Q-10 | Q-11 | P-17 | P-18 | Q-12 | Q-13 |
| Solvent: Cyclohexane (g) | 2750 | 2750 | 2750 | 2750 | 2750 | 2750 | 2750 | 2750 | 2750 | 2750 | 2750 | 2750 |
| Vinyl Content Adjustor: Tetrahydrofuran (g) | 41.3 | 41.3 | 41.3 | 41.3 | 41.3 | 41.3 | 41.3 | 41.3 | 19.3 | 19.3 | 19.3 | 19.3 |
| Monomer: |  |  |  |  |  |  |  |  |  |  |  |  |
| Styrene (g) | 125 | 125 | 125 | 125 | 125 | 125 | 125 | 125 | 180 | 180 | 180 | 180 |
| Butadiene (g) | 375 | 375 | 375 | 375 | 375 | 375 | 375 | 375 | 320 | 320 | 320 | 320 |
| Polymerization Initiator (mg): |  |  |  |  |  |  |  |  |  |  |  |  |
| n-Bu-Li | 325 | 325 | 325 | 325 | 325 | 325 | 325 | 325 | 215 | 215 | 215 | 215 |
| Piperidine | 0 | 0 | 0 | 0 | 0 | 0 | 0 | 0 | 0 | 257 | 0 | 0 |
| DBS-K*1 | 148 | 148 | 148 | 0 | 148 | 148 | 148 | 148 | 122 | 122 | 0 | 122 |
| t-BuOK*2 | 0 | 0 | 0 | 45.6 | 0 | 0 | 0 | 0 | 0 | 0 | 0 | 0 |
| 2-EHOH*3 | 0 | 0 | 0 | 0 | 26.4 | 0 | 0 | 0 | 0 | 0 | 0 | 0 |
| Additive (mg): |  |  |  |  |  |  |  |  |  |  |  |  |
| N—Si-3*4 | 1560 | 0 | 1248 | 1248 | 1248 | 1248 | 0 | 0 | 927 | 927 | 927 | 0 |
| N—Si-2*5 | 0 | 1120 | 0 | 0 | 0 | 0 | 0 | 0 | 0 | 0 | 0 | 0 |
| SnCl$_4$ | 0 | 0 | 0 | 0 | 0 | 0 | 0 | 0 | 32.8 | 32.8 | 32.8 | 197 |
| SiCl$_4$ | 0 | 0 | 42.5 | 42.5 | 42.5 | 42.5 | 171.6 | 171.6 | 0 | 0 | 0 | 0 |
| Extender Oil: |  |  |  |  |  |  |  |  |  |  |  |  |
| A-Oil (g) | 187.5 | 187.5 | 187.5 | 187.5 | 187.5 | 0 | 187.5 | 0 | 0 | 0 | 0 | 0 |
| N-Oil (g) | 0 | 0 | 0 | 0 | 0 | 187.5 | 0 | 187.5 | 0 | 0 | 0 | 0 |

*1DBS-K: Potassium dodecylbenzenesulfonate
*2t-BuOK: Potassium t-butoxide
*32-EHOH: 2-Ethylhexyl alcohol
*4N—Si-3: N,N-Bis(triethoxysilyl)aminopropylmethyldimethoxysilane
*5N—Si-2: 1-Trimethylsilyl-2,2-dimethoxy-1-aza-2-silacyclopentane

TABLE 13

|  | Example | | | | | | | Comparative Example | | Example | | Comparative Example | |
| --- | --- | --- | --- | --- | --- | --- | --- | --- | --- | --- | --- | --- | --- |
|  | 31 | 32 | 33 | 34 | 35 | 36 | 37 | 30 | 31 | 35 | 36 | 32 | 33 |
| Copolymer Rubber Results of Evaluation | P-11 | P-12 | P-13 | P-14 | P-15 | P-16 | P-1 | Q-10 | Q-11 | P-17 | P-18 | Q-12 | Q-13 |
| Bonded Styrene Content (wt %) | 25 | 25 | 25 | 25 | 25 | 25 | 25 | 25 | 25 | 36 | 35 | 36 | 35 |
| Vinyl Content (%) | 55 | 56 | 56 | 55 | 55 | 56 | 56 | 55 | 55 | 42 | 42 | 43 | 43 |
| ST1 (%) | 33 | 32 | 32 | 34 | 36 | 32 | 70 | 33 | 32 | 36 | 35 | 58 | 37 |
| ST > 8 (%) | 1 | 1 | 0 | 1 | 2 | 0 | 2 | 1 | 1 | 2 | 1 | 7 | 2 |
| Weight Average Molecular Weight (ten thousand) | 31 | 30 | 35 | 35 | 34 | 35 | 32 | 46 | 43 | 40 | 41 | 39 | 67 |
| Glass Transition Temperature (° C.) | −37 | −38 | −37 | −37 | −36 | −38 | −32 | −36 | −37 | −36 | −35 | −31 | −34 |
| Mooney Viscosity | 42 | 42 | 44 | 44 | 44 | 41 | 44 | 45 | 43 | 80 | 80 | 82 | 81 |
| Primary Amino Group Content (mmol/kg) | 6.3 | 6.1 | 5.4 | 5.5 | 5.6 | 5.4 | 6.1 | 0 | 0 | 3.5 | 3.5 | 3.4 | 0 |
| Tertiary Amino Group Content (mmol/kg) | — | — | — | — | — | — | — | — | — | — | 3.7 | — | — |
| SiOR Group Content (mmol/kg) | 6 | 5.9 | 5.2 | 5.2 | 5.3 | 5.3 | 5.8 | 0 | 0 | 3.3 | 3.2 | 3.2 | 0 |

TABLE 14

|  | Compounding Formulation (phr) | | | | |
| --- | --- | --- | --- | --- | --- |
|  | I | II | III | IV | VI |
| (Co)polymer Rubber*1 | 100 | 70 | 100 | 100 | 80 |
| Extender Oil (A-Oil)*2 | 37.5 | 37.5 | 37.5 | 37.5 | 10 |
| Butadiene Rubber BR01 | 0 | 30 | 0 | 0 | 0 |
| Natural Rubber RSS No. 3 | 0 | 0 | 0 | 0 | 20 |
| Carbon Black N339 | 70 | 0 | 40 | 40 | 0 |
| Silica AQ | 0 | 70 | 30 | 30 | 50 |
| Silane Coupling Agent Si69 | 0 | 5.6 | 2.4 | 0.3 | 4.0 |
| Stearic Acid | 2.0 | 2.0 | 2.0 | 2.0 | 2.0 |
| Antioxidant 810NA | 1.0 | 1.0 | 1.0 | 1.0 | 1.0 |
| Zinc Oxide | 3.0 | 3.0 | 3.0 | 3.0 | 3.0 |
| Vulcanization Accelerator NS | 1.0 | 0 | 0 | 0 | 0 |
| Vulcanization Accelerator CZ | 0 | 1.5 | 1.5 | 1.5 | 1.5 |
| Vulcanization Accelerator D | 0.5 | 1.0 | 1.0 | 1.0 | 1.0 |
| Sulfur | 1.5 | 1.5 | 1.5 | 1.5 | 1.5 |

*1 When a copolymer rubber previously oil-extended is used, the amount of the copolymer rubber is indicated as the amount of only a rubber portion obtained by removing extender oil components from the oil-extended copolymer rubber.

*2 When a copolymer rubber previously oil-extended is used, the amount of the extender oil is indicated as the total amount of an extender oil contained in the oil-extended copolymer rubber and an extender oil additionally added in kneading.

TABLE 15

|  | Example | | | | | | | Comparative Example | |
| --- | --- | --- | --- | --- | --- | --- | --- | --- | --- |
|  | 31 | 32 | 33 | 34 | 35 | 36 | 37 | 30 | 31 |
| Copolymer Rubber | P-11 | P-12 | P-13 | P-14 | P-15 | P-16 | P-1 | Q-10 | Q-11 |
| Compounding Formulation | I | I | I | I | I | I | I | I | I |
| Tensile Strength (Index Number) | 112 | 110 | 110 | 111 | 112 | 108 | 96 | 100 | 95 |
| tan δ (0° C.) (Index Number) | 125 | 122 | 123 | 121 | 122 | 115 | 110 | 100 | 95 |
| tan δ (50° C.) (Index Number) | 120 | 116 | 118 | 117 | 118 | 128 | 125 | 100 | 105 |
| Wear Resistance (Index Number) | 110 | 107 | 109 | 109 | 112 | 110 | 93 | 100 | 101 |

TABLE 16

|  | Example | | | | | | | Comparative Example | |
| --- | --- | --- | --- | --- | --- | --- | --- | --- | --- |
|  | 31 | 32 | 33 | 34 | 35 | 36 | 37 | 30 | 31 |
| Copolymer Rubber | P-11 | P-12 | P-13 | P-14 | P-15 | P-16 | P-1 | Q-10 | Q-11 |
| Compounding Formulation | II | II | II | II | II | II | II | II | II |
| Tensile Strength (Index Number) | 115 | 112 | 112 | 113 | 114 | 110 | 96 | 100 | 93 |
| tan δ (0° C.) (Index Number) | 122 | 120 | 122 | 120 | 123 | 113 | 109 | 100 | 95 |
| tan δ (50° C.) (Index Number) | 125 | 122 | 124 | 123 | 125 | 132 | 130 | 100 | 107 |
| Wear Resistance (Index Number) | 115 | 112 | 115 | 115 | 119 | 115 | 94 | 100 | 101 |

TABLE 17

|  | Example | | | | Comparative Example | | Example | | Comparative Example |
| --- | --- | --- | --- | --- | --- | --- | --- | --- | --- |
|  | 33 | 34 | 36 | 37 | 30 | 31 | 35 | 37 | 30 |
| Copolymer Rubber | P-13 | P-14 | P-16 | P-1 | Q-10 | Q-11 | P-13 | P-1 | Q-10 |
| Compounding Formulation | III | III | III | III | III | III | IV | IV | IV |
| Tensile Strength (Index Number) | 111 | 112 | 108 | 95 | 100 | 94 | 105 | 94 | 91 |
| tan δ (0° C.) (Index Number) | 123 | 121 | 114 | 109 | 100 | 95 | 117 | 103 | 96 |
| tan δ (50° C.) (Index Number) | 121 | 121 | 130 | 127 | 100 | 106 | 117 | 122 | 94 |

TABLE 17-continued

|  | Example | | | | Comparative Example | | Example | | Comparative Example |
| --- | --- | --- | --- | --- | --- | --- | --- | --- | --- |
|  | 33 | 34 | 36 | 37 | 30 | 31 | 35 | 37 | 30 |
| Wear Resistance (Index Number) | 112 | 112 | 113 | 93 | 100 | 101 | 107 | 86 | 92 |

TABLE 18

|  | Example | | Comparative Example | |
| --- | --- | --- | --- | --- |
|  | 38 | 39 | 32 | 33 |
| Copolymer Rubber | P-17 | P-18 | Q-12 | Q-13 |
| Compounding Formulation | VI | VI | VI | VI |
| Tensile Strength (Index Number) | 118 | 121 | 95 | 100 |
| tan δ (0° C.) (Index Number) | 120 | 123 | 110 | 100 |
| tan δ (50° C.) (Index Number) | 133 | 138 | 125 | 100 |
| Wear Resistance (Index Number) | 118 | 120 | 91 | 100 |

Example 40

An autoclave reactor having an internal volume of 5 liters in which the atmosphere was replaced with nitrogen was charged with 2,500 g of cyclohexane, 25 g of tetrahydrofuran, 100 g of styrene, 390 g of 1,3-butadiene and 0.125 g of divinylbenzene. After the temperature of the contents of the reactor was adjusted to 10° C., 375 mg of n-butyllithium was added to initiate polymerization. The polymerization was conducted under adiabatic conditions, and the maximum temperature reached 85° C.

At the time when the polymerization conversion reached 99%, 10 g of butadiene was added, followed by further polymerization for 5 minutes. Then, 1,570 mg of N,N-bis-(trimethylsilyl)aminopropylmethyldiethoxysilane was added, followed by reaction for 15 minutes. 2,6-Di-tert-butyl-p-cresol was added to the polymer solution after reaction. Then, desolvation was conducted by steam stripping, and a rubber was dried with a hot roll controlled to 110° C. to obtain a copolymer rubber. This copolymer rubber is named copolymer rubber P-19. The composition and physical properties of copolymer rubber P-19 thus obtained are shown in Table 21.

A compounded rubber prepared according to compounding formulation I shown in Table 23 using copolymer rubber P-19 was vulcanized, and the physical properties were evaluated. Results thereof are shown as Example 47 in Table 24.

Example 41

An autoclave reactor having an internal volume of 5 liters in which the atmosphere was replaced with nitrogen was charged with 2,500 g of cyclohexane, 25 g of tetrahydrofuran, 100 g of styrene and 390 g of 1,3-butadiene. After the temperature of the contents of the reactor was adjusted to 10° C., 375 mg of n-butyllithium was added to initiate polymerization. The polymerization was conducted under adiabatic conditions, and the maximum temperature reached 85° C.

At the time when the polymerization conversion reached 99%, 10 g of butadiene was added, followed by further polymerization for 5 minutes. Then, 100 mg of tin tetrachloride was added, followed by reaction for 5 minutes, and successively, 1,020 mg of N,N-bis(trimethylsilyl)aminopropylmethyldiethoxysilane was added, followed by reaction for 15 minutes. 2,6-Di-tert-butyl-p-cresol was added to the polymer solution after reaction. Then, desolvation was conducted by steam stripping, and a rubber was dried with a hot roll controlled to 110° C. to obtain copolymer rubber P-20. The composition and physical properties of copolymer rubber P-20 thus obtained are shown in Table 21.

A compounded rubber prepared according to compounding formulation I shown in Table 23 using copolymer rubber P-20 was vulcanized, and the physical properties were evaluated. Results thereof are shown as Example 48 in Table 24.

Example 42

Copolymer rubber P-21 was obtained in the same manner as with Example 40 with the exception that the additive was changed to tin tetrachloride and N,N-bis(trimethylsilyl)aminopropylmethyldiethoxysilane. The composition and physical properties of copolymer rubber P-21 thus obtained are shown in Table 21. A compounded rubber prepared according to compounding formulation I shown in Table 23 using copolymer rubber P-21 was vulcanized, and the physical properties were evaluated. Results thereof are shown as Example 49 in Table 24.

Example 43

Copolymer rubber P-22 was obtained in the same manner as with Example 40 with the exception that the additive was changed to N,N-bis(trimethylsilyl)aminopropyltriethoxysilane. The composition and physical properties of copolymer rubber P-22 thus obtained are shown in Table 21.

A compounded rubber prepared according to compounding formulation I shown in Table 23 using copolymer rubber P-22 was vulcanized, and the physical properties were evaluated. Results thereof are shown as Example 50 in Table 24.

Example 44

Continuous Process

An autoclave reactor having an internal volume of 16 liters in which the atmosphere was replaced with nitrogen was continuously charged with 1,3-butadiene at 25.0 g/minute and styrene at 14.05 g/minute as monomers, cyclohexane at 237.1 g/minute and tetrahydrofuran at 3.0 g/minute as solvents, and n-butyllithium at 18.67 mg/minute. The temperature of the reactor was controlled at 75° C.

The polymer solution was continuously discharged at 279.2 g/minute from the first reactor, and silicon tetrachloride was added thereto at 2.0 mg/minute, followed by line mixing. Then, successively, N,N-bis(trimethylsilyl)aminopropylmethyldimethoxysilane was added at 90 mg/minute, and continuously introduced into a second reactor to conduct reaction. At an outlet of the second reactor, di-tert-butyl-p-cresol was added in an amount of 0.7 part by weight based on 100 parts by weight of rubber. An extender oil (A-Oil) was further added in an amount of 14.64 g/minute (corresponding to 37.5 parts based on 100 parts of rubber components contained in the polymer solution). Then, desolvation was conducted by steam stripping, and a rubber was dried with a hot roll controlled to 110° C. to obtain an oil-extended rubber. This oil-extended rubber is named copolymer rubber P-23. The composition and physical properties of copolymer rubber P-23 thus obtained are shown in Table 21.

A compounded rubber prepared according to compounding formulation II shown in Table 23 using copolymer rubber P-23 was vulcanized, and the physical properties were evaluated. Results thereof are shown as Example 52 in Table 24.

Comparative Examples 34 and 35 and Example 45

Copolymer rubbers Q-14, Q-15 and P-24 were obtained in the same manner as with Example 40 with the exception that the additive was changed to ones shown in Table 20 without adding divinylbenzene.

The compositions and physical properties of copolymer rubbers Q-14, Q-15 and P-24 thus obtained are shown in Table 22.

Compounded rubbers prepared according to compounding formulation I shown in Table 23 using copolymer rubbers Q-14, Q-15 and P-24 were vulcanized, and the physical properties were evaluated. Results thereof are shown as Comparative Examples 37 and 38 and Example 51 in Table 24.

Comparative Example 36 and Example 46

Continuous Process

Copolymer rubbers Q-16 and P-25 were obtained in the same manner as with Example 44 with the exception that the additives were changed to ones shown in Table 20. The compositions and physical properties of copolymer rubbers Q-16 and P-25 thus obtained are shown in Table 22.

Compounded rubbers prepared according to compounding formulation II shown in Table 23 using copolymer rubbers Q-16 and P-25 were vulcanized, and the physical properties were evaluated. Results thereof are shown as Comparative Example 39 and Example 53 in Table 24.

The results of Tables 21, 22, 24 and 25 show the following.

The compositions and physical properties of the rubbers of Tables 21 and 22 show that cold flow properties are substantially improved in Examples 40 to 42 using the conjugated diolefin (co)polymer rubbers of the present invention, compared to Example 45. Further, from the results of evaluation in silica compounding of Table 24, Examples 47 to 50 using the conjugated diolefin (co)polymer rubbers of the present invention improved in cold flow properties have good failure strength without impairing processability, and wet-skid characteristics (tan δ at 0° C.), hysteresis loss properties (tan δ at 50° C.) and wear resistance are balanced on a high level at the same time. This is also similar for the cold flow properties of the (co)polymer rubbers obtained by the continuous process in Tables 21 and 22 (Example 44, Comparative Example 36 and Example 46), and for the results of evaluation in carbon black compounding of Table 25 (Example 52, Comparative Example 39 and Example 53).

In particular, in Example 49 using the conjugated diolefin (co)polymer rubber of the present invention (Example 42) in which the bifunctional or higher functional monomer is used in combination with the bifunctional or higher functional coupling agent, it is more remarkably known that the cold flow properties and the physical properties of vulcanized rubber are highly balanced.

TABLE 19

|  | Example | | | | |
|---|---|---|---|---|---|
|  | 40 | 41 | 42 | 43 | 44 |
| Copolymer Rubber | P-19 | P-20 | P-21 | P-22 | P-23*4 |
| Polymerization Formulation | Batch | Batch | Batch | Batch | Continuous |
| Solvent: Cyclohexane (g) | 2,500 | 2,500 | 2,500 | 2,500 | 237.1 |
| Vinyl Content Adjustor: Tetrahydrofuran (g) | 25 | 25 | 25 | 25 | 3.0 |
| Polymerization Monomer: |  |  |  |  |  |
| Styrene (g) | 100 | 100 | 100 | 100 | 14.05 |
| Butadiene (g) | 400 | 400 | 400 | 400 | 25.0 |

TABLE 19-continued

|  | Example | | | | |
|---|---|---|---|---|---|
|  | 40 | 41 | 42 | 43 | 44 |
| Divinylbenzene (g) | 0.125 | 0 | 0.05 | 0.025 | 0 |
| Initiator: n-BuLi*1 (mg) | 375 | 375 | 375 | 375 | 18.67 |
| Additive: | | | | | |
| SnCl₄ (mg) | 0 | 100 | 60 | 0 | 0 |
| SiCl₄ (mg) | 0 | 0 | 0 | 0 | 2.0 |
| N—Si-1 (mg)*1 | 0 | 0 | 0 | 0 | 77 |
| N—Si-4 (mg)*2 | 1570 | 1020 | 1255 | 0 | 0 |
| N—Si-5 (mg)*3 | 0 | 0 | 0 | 680 | 0 |
| Extender Oil: A-Oil (g) | 0 | 0 | 0 | 0 | 14.64 |

*1N—Si-1: N,N-Bis(trimethylsilyl)aminopropylmethyldimethoxysilane
*2N—Si-4: N,N-Bis(trimethylsilyl)aminopropylmethyldiethoxysilane
*3N—Si-5: N,N-Bis(trimethylsilyl)aminopropyltriethoxysilane
*4Copolymer rubber P-23: The amount added per minute by the continuous process

TABLE 20

|  | Comparative Example | | Example | Comparative Example | Example |
|---|---|---|---|---|---|
|  | 34 | 35 | 45 | 36 | 46 |
| Copolymer Rubber | Q-14 | Q-15 | P-24 | Q-16*1 | P-25*1 |
| Polymerization Formulation | Batch | Batch | Batch | Continuous | Continuous |
| Solvent: Cyclohexane (g) | 2,500 | 2,500 | 2,500 | 237.1 | 237.1 |
| Vinyl Content Adjustor: Tetrahydrofuran (g) | 25 | 25 | 25 | 3.0 | 3.0 |
| Polymerization Monomer: | | | | | |
| Styrene (g) | 100 | 100 | 100 | 14.05 | 14.05 |
| Butadiene (g) | 400 | 400 | 400 | 25.0 | 25.0 |
| Divinylbenzene (g) | 0 | 0 | 0 | 0 | 0 |
| Initiator: n-BuLi (mg) | 375 | 375 | 375 | 18.67 | 18.67 |
| Additive: | | | | | |
| SnCl4 (mg) | 300 | 0 | 0 | 0 | 0 |
| SiCl4 (mg) | 0 | 200 | 0 | 10 | 0 |
| N—Si-1 (mg)*1 | 0 | 0 | 0 | 0 | 90 |
| N—Si-4 (mg)*2 | 0 | 0 | 1570 | 0 | 0 |
| N—Si-5 (mg)*3 | 0 | 0 | 0 | 0 | 0 |
| Extender Oil: A-Oil (g) | 0 | 0 | 0 | 14.64 | 14.64 |

*1Copolymer rubber Q-16 or P-25: The amount added per minute by the continuous process

TABLE 21

| | Example | | | | |
|---|---|---|---|---|---|
| | 40 | 41 | 42 | 43 | 44 |
| Copolymer Rubber | P-19 | P-20 | P-21 | P-22 | P-23 |
| Properties of Copolymer Rubber | | | | | |
| Bonded Styrene Content (wt %) | 20 | 20 | 21 | 20 | 36 |
| Vinyl Content (mol %) | 56 | 55 | 55 | 54 | 43 |
| Glass Transition Temperature (° C.) | −36 | −36 | −35 | −36 | −31 |
| Weight Average Molecular Weight (ten thousand) | 30 | 38 | 43 | 33 | 73 |
| Coupling Rate (%) | 26 | 35 | 40 | 55 | 15 |
| Mooney Viscosity | 35 | 42 | 41 | 45 | 48 |
| Primary Amino Group Content (mmol/kg) | 7.4 | 4.5 | 5.9 | 3.9 | 2.8 |
| Alkoxysilyl Group Content (mmol/kg) | 6.9 | 4.2 | 5.7 | 6.2 | 2.7 |
| Cold Flow (mg/min) | 2.0 | 0.9 | 0.6 | 1.5 | 0.7 |

TABLE 22

| | Comparative Example | Example | Comparative Example | Example | Example |
|---|---|---|---|---|---|
| | 34 | 35 | 45 | 36 | 46 |
| Copolymer Rubber | Q-14 | Q-15 | P-24 | Q-16 | P-25 |
| Properties of Copolymer Rubber | | | | | |
| Bonded Styrene Content (wt %) | 20 | 20 | 20 | 36 | 37 |
| Vinyl Content (mol %) | 55 | 56 | 55 | 43 | 43 |
| Glass Transition Temperature (° C.) | −36 | −36 | −36 | −31 | −31 |
| Weight Average Molecular Weight (ten thousand) | 64 | 60 | 22 | 115 | 60 |
| Coupling Rate (%) | 75 | 70 | 2 | 45 | 0 |
| Mooney Viscosity | 74 | 71 | 24 | 80 | 39 |
| Primary Amino Group Content (mmol/kg) | — | — | 7.7 | — | 3.0 |
| Alkoxysilyl Group Content (mmol/kg) | — | — | 7.3 | — | 2.8 |
| Cold Flow (mg/min) | 0.1 | 0.1 | 9.2 | 0.1 | 3.6 |

TABLE 23

| | Compounding Formulation (phr) | |
|---|---|---|
| | VI | I |
| (Co)polymer Rubber*1 | 80 | 100 |
| Extender Oil (A-Oil)*2 | 10 | 37.5 |
| Natural Rubber RSS No. 3*3 | 20 | 0 |
| Carbon Black N339 | 0 | 70 |
| Silica AQ | 50 | 0 |
| Silane Coupling Agent Si69 | 4.0 | 0 |
| Stearic Acid | 2.0 | 2.0 |
| Antioxidant 810NA | 1.0 | 1.0 |
| Zinc Oxide | 3.0 | 3.0 |
| Vulcanization Accelerator NS | 0 | 1.0 |
| Vulcanization Accelerator CZ | 1.5 | 0 |
| Vulcanization Accelerator D | 1.0 | 0.5 |
| Sulfur | 1.5 | 1.5 |

*1When a copolymer rubber previously oil-extended is used, the amount of the copolymer rubber is indicated as the amount of only a rubber portion obtained by removing extender oil components from the oil-extended copolymer rubber.
*2When a copolymer rubber previously oil-extended is used, the amount of the extender oil is indicated as the total amount of an extender oil contained in the oil-extended copolymer rubber and an extender oil additionally added in kneading.
*3Natural rubber RSS No. 3

TABLE 24

| | Example | | | | Comparative Example | | Example |
|---|---|---|---|---|---|---|---|
| | 47 | 48 | 49 | 50 | 37 | 38 | 51 |
| Compounding Formulation No. (Table 5) | I | I | I | I | I | I | I |
| (Co) polymer Rubber No. | P-18 | P-19 | P-20 | P-21 | Q-14 | Q-15 | P-24 |
| Kneading Processability | ○ | ⊙ | ⊙ | ○ | ⊙ | ○ | ⊙ |
| Tensile Strength (Index Number) | 123 | 107 | 117 | 113 | 100 | 120 | 112 |
| tan δ (0° C.) (Index Number) | 110 | 105 | 156 | 138 | 100 | 92 | 110 |
| tan δ (50° C.) (Index Number) | 121 | 115 | 123 | 135 | 100 | 93 | 126 |
| Wear Resistance (Index Number) | 110 | 108 | 116 | 119 | 100 | 103 | 110 |

TABLE 25

|  | Example 52 | Comparative Example 39 | Example 53 |
|---|---|---|---|
| Compounding Formulation No. (Table 5) | II | II | II |
| (Co)polymer Rubber No. | P-22 | Q-16 | P-25 |
| Kneading Processability | ⊚ | ⊚ | ⊚ |
| Tensile Strength (Index Number) | 110 | 100 | 100 |
| tan δ (0° C.) (Index Number) | 126 | 100 | 123 |
| tan δ (50° C.) (Index Number) | 108 | 100 | 110 |
| Wear Resistance (Index Number) | 113 | 100 | 98 |

Example 54

An autoclave reactor having an internal volume of 5 liters in which the atmosphere was replaced with nitrogen was charged with 2,500 g of cyclohexane, 25 g of tetrahydrofuran, 100 g of styrene and 400 g of 1,3-butadiene. After the temperature of the contents of the reactor was adjusted to 10° C., 325 mg of n-butyllithium was added to initiate polymerization. The polymerization was conducted under adiabatic conditions, and the maximum temperature reached 85° C.

After the polymerization was further conducted for 3 minutes from the time when the polymerization conversion reached 99%, 740 mg of N,N-bis(trimethylsilyl)aminopropyltriethoxysilane was added, followed by reaction for 15 minutes to obtain a polymer solution. After 3,010 mg of triethyl orthoformate was added as an additive to the resulting polymer solution, 2,6-di-tert-butyl-p-cresol was further added. Then, desolvation was conducted by steam stripping, and a rubber was dried with a hot roll controlled to 110° C. to obtain copolymer rubber P-26. The Mooney viscosity of the resulting copolymer rubber and results of evaluation of heating acceleration using the copolymer rubber are shown in Table 26.

Example 55

Copolymer rubber P-27 was obtained in the same manner as with Example 54 with the exception that 3,860 mg of tri-n-propyl orthoformate was added as the additive to the polymer solution. Results of evaluation of the resulting copolymer rubber are shown in Table 26.

Example 56

Copolymer rubber P-28 was obtained in the same manner as with Example 54 with the exception that 3,290 mg of bis(2-ethoxyethyl)ether was added as the additive to the polymer solution. Results of evaluation of the resulting copolymer rubber are shown in Table 26.

Example 57

Copolymer rubber P-29 was obtained in the same manner as with Example 54 with the exception that no additive was added to the polymer solution. Results of evaluation of the resulting copolymer rubber are shown in Table 26.

Example 58

An autoclave reactor having an internal volume of 5 liters in which the atmosphere was replaced with nitrogen was charged with 2,500 g of cyclohexane, 25 g of tetrahydrofuran, '100 g of styrene and 400 g of 1,3-butadiene. After the temperature of the contents of the reactor was adjusted to 10° C., 325 mg of n-butyllithium was added to initiate polymerization. The polymerization was conducted under adiabatic conditions, and the maximum temperature reached 85° C.

After the polymerization was further conducted for 3 minutes from the time when the polymerization conversion reached 99%, 360 mg of methyltriethoxysilane was added, followed by reaction for 15 minutes to obtain a polymer solution.

After 4,470 mg of 1,1,3,3-tetraethoxypropane was added as an additive to the resulting polymer solution, 2,6-di-tert-butyl-p-cresol was further added.

Then, desolvation was conducted by steam stripping, and a rubber was dried with a hot roll controlled to 110° C. to obtain copolymer rubber P-30. Results of evaluation of the resulting copolymer rubber are shown in Table 27.

Example 59

Copolymer rubber P-31 was obtained in the same manner as with Example 58 with the exception that 3,010 mg of triethyl orthoformate was added as the additive to the polymer solution. Results of evaluation of the resulting copolymer rubber are shown in Table 27.

Example 60

Copolymer rubber P-32 was obtained in the same manner as with Example 58 with the exception that 2,110 mg of diethoxymethane was added as the additive to the polymer solution. Results of evaluation of the resulting copolymer rubber are shown in Table 27.

Comparative Example 40

Copolymer rubber Q-17 was obtained in the same manner as with Example 58 with the exception that no additive was added to the polymer solution. Results of evaluation of the resulting copolymer rubber are shown in Table 27.

The results of Tables 26 and 27 show the following.

In the case of Examples 54 to 59 according to the production method of the present invention, it is known that the Mooney viscosity after drying is low, and that changes in Mooney viscosity after heating acceleration are also very small.

TABLE 26

|  | Example | | | |
|---|---|---|---|---|
|  | 54 | 55 | 56 | 57 |
| Copolymer Rubber | P-26 | P-27 | P-28 | P-29 |
| Compounding Formulation |  |  |  |  |
| Solvent: Cyclohexane (g) | 2,500 | 2,500 | 2,500 | 2,500 |
| Vinyl Content Adjustor: Tetrahydrofuran (g) | 25 | 25 | 25 | 25 |

TABLE 26-continued

|  | Example | | | |
|---|---|---|---|---|
|  | 54 | 55 | 56 | 57 |
| Polymerization Monomer: | | | | |
| Styrene (g) | 100 | 100 | 100 | 100 |
| Butadiene (g) | 400 | 400 | 400 | 400 |
| Initiator: n-Butyllithium (mg) | 325 | 325 | 325 | 325 |
| Alkoxysilane-Based Compound: N-Si-5*1 (mg) | 740 | 740 | 740 | 740 |
| Additive: | | | | |
| TEOF (mg)*2 | 3,010 | 0 | 0 | 0 |
| TPOF (mg)*3 | 0 | 3,860 | 0 | 0 |
| BEEE (mg)*4 | 0 | 0 | 3,290 | 0 |
| Results of Evaluation | | | | |
| Mooney Viscosity after Drying | 39 | 40 | 46 | 52 |
| Evaluation of Heating Acceleration: | | | | |
| After 1 day | 40 | 43 | 77 | 87 |
| After 2 days | 41 | 45 | 89 | 88 |

*1N-Si-5: N,N-Bis(trimethylsilyl)aminopropyltriethoxysilane
*2TEOF: Triethyl orthoformate
*3TPOF: Tri-n-propyl orthoformate
*4BEEE: Bis(2-ethoxyethyl)ether

TABLE 27

|  | Example | | | Comparative Example |
|---|---|---|---|---|
|  | 58 | 59 | 60 | 40 |
| Copolymer Rubber Compounding Formulation | P-30 | P-31 | P-32 | Q-17 |
| Solvent: Cyclohexane (g) | 2,500 | 2,500 | 2,500 | 2,500 |
| Vinyl Content Adjustor: Tetrahydrofuran (g) | 25 | 25 | 25 | 25 |
| Polymerization Monomer: | | | | |
| Styrene (g) | 100 | 100 | 100 | 100 |
| Butadiene (g) | 400 | 400 | 400 | 400 |
| Initiator: | | | | |
| n-Butyllithium (mg) | 325 | 325 | 325 | 325 |
| Alkoxysilane-Based Compound: | | | | |
| Methyltriethoxysilane | 360 | 360 | 360 | 360 |
| Additive: | | | | |
| TEP (mg)*1 | 4,470 | 0 | 0 | 0 |
| TEOF (mg)*2 | 0 | 3,010 | 0 | 0 |
| DEM (mg)*3 | 0 | 0 | 2,110 | 0 |
| Results of Evaluation | | | | |
| Mooney Viscosity after Drying | 36 | 37 | 37 | 47 |
| Evaluation of Heating Acceleration: | | | | |
| After 1 day | 38 | 38 | 41 | 66 |
| After 2 days | 39 | 39 | 44 | 73 |

*1TEP: 1,1,3,3-Tetraethoxypropane
*2TEOF: Triethyl orthoformate
*3DEM: Diethoxymethane

Example 61

Preparation of Composite A-1 and Evaluation Thereof

One hundred grams of copolymer rubber P-1 obtained in Example 1 (copolymer: 72.7 g, extender oil: 27.3 g) and 72.7 g of silica AQ ("Nipsil AQ" manufactured by Nippon Silica Industrial Co., Ltd.) were kneaded with a Labo Plastomill to prepare composite A-1.

A compounded rubber prepared according to compounding formulation VII shown in Table 28 was vulcanized, and the physical properties were evaluated. Results thereof are shown in Table 30.

Example 62

Preparation of Compounded Rubber and Evaluation Thereof

A compounded rubber prepared according to compounding formulation II shown in Table 28 was vulcanized, and the physical properties were evaluated. Results thereof are shown in Table 30.

Comparative Example 41

Preparation of Composition B-1 and Evaluation Thereof

Using copolymer rubber Q-7 prepared in Comparative Example 7, composition B-1 was prepared in the same manner as with Example 61.

A compounded rubber prepared according to compounding formulation VII shown in Table 28 using composition B-1 was vulcanized, and the physical properties were evaluated. Results thereof are shown in Table 30.

Example 63

Preparation of Composite A-2 and Evaluation Thereof

One hundred grams of copolymer rubber P-1 and 72.7 g of carbon black ("Diablack N339" manufactured by Mitsubishi Chemical Corporation) were kneaded with a Labo Plastomill to prepare composite A-2. A compounded rubber prepared according to compounding formulation VIII shown in Table 28 was vulcanized, and the physical properties were evaluated. Results thereof are shown in Table 30.

Comparative Example 42

Preparation of Composition B-2 and Evaluation Thereof)

Using copolymer rubber Q-7 prepared in Comparative Example 7, composition B-2 was prepared in the same manner as with Example 63. A compounded rubber prepared according to compounding formulation I shown in Table 28 using composition B-2 was vulcanized, and the physical properties were evaluated. Results thereof are shown in Table 30.

Example 64

Preparation of Composite A-3 and Evaluation Thereof

Using lipophilic smectite (manufactured by CO—OP Chemical Co., Ltd., trade name: "Lucentite SAN"), a 10-wt % toluene dispersion was prepared. Five hundred grams of this dispersion of the inorganic compound (inorganic compound content: 50 g) and 696 g of a diene-based rubber solution (copolymer rubber P-1 before desolvation) (copolymer content: 100 g, extender oil content: 37.5 g) were mixed and stirred, and then, poured into 2 liters of water. Desolvation was conducted by steam stripping, followed by drying with a hot air dryer to obtain composite A-3.

This composite A-3 was heated in an electric furnace at 640° C. for 8 hours to perform ashing. As a result, the ash content was 33% by weight. The lamellar inorganic compound (Lucentite SAN) calculated from this ash content was 50 parts based on 100 parts of rubber, and the ratio of the lamellar inorganic compound incorporated into the rubber composition by desolvating with the rubber polymer compound was 100%.

Composite A-3 was kneaded according to compounding formulation 1x shown in Table 29 by the use of a Banbury mixer (manufactured by Kobe Steel, Ltd.). Thereafter, the kneaded product was cooled, and a vulcanizing agent was further incorporated thereto using a sheet-forming mold having a size of 15×15×0.2 cm. Then, press vulcanization was conducted at 160° C. for 20 minutes to prepare a vulcanized rubber sheet in accordance with the JIS, which was subjected to various kinds of evaluation. Results thereof are shown in Table 32.

Example 65

Lipophilic smectite was kneaded together with copolymer rubber P-1 according to compounding formulation X shown in Table 29, and a vulcanized rubber sheet was prepared and evaluated in the same manner as with Example 64. Results thereof are shown in Table 32.

Comparative Example 43

Preparation of Composition B-3 and Evaluation Thereof

Composition B-3 was prepared in the same manner as with Example 64 with the exception that copolymer rubber Q-7 (before desolvation) was used in place of copolymer rubber solution P-1 (before desolvation). Using this composition B-3, kneading was conducted according to compounding formulation X shown in Table 29, and a vulcanized rubber sheet was prepared and evaluated in the same manner as with Example 64. Results thereof are shown in Table 32.

For the rubber-inorganic compound composites of the present invention, the rubber compositions using these are excellent in processability, and when they are subjected to vulcanization treatment to form the vulcanized rubbers, the vulcanized rubbers are excellent in low hysteresis loss properties (tan δ at 50° C.), and good in failure strength (a comparison of Example 61 with Example 62 and Comparative Example 41, and a comparison of Example 63 with Comparative Example 42). Accordingly, the rubber-inorganic compound composites of the present invention are useful for materials for treads of tires for low fuel consumption, large sized tires and high performance tires.

On the other hand, it is preferred that a vibration-proof rubber has low dynamic-to-static modulus ratio and high tan δ (25° C.). However, they are inconsistent with each other. It is known that Example 64 is superior to Example 65 and Comparative Example 43 in a balance between dynamic-to-static modulus ratio and tan δ (25° C.). Accordingly, for the rubber-inorganic compound composites of the present invention, it is known that the vulcanized rubbers obtained therefrom are useful for vibration-proof materials.

TABLE 28

| Compounding Formulation (phr) Composite | VII | II | VIII | I |
|---|---|---|---|---|
| Copolymer Rubber*1 | 70 | | 70 | |
| Extender Oil (A-Oil) | 26.3 | | 26.3 | |
| Silica AQ | 70 | | 0 | |
| Carbon Black N339 | 0 | | 70 | |
| Copolymer Rubber*1 | 0 | 70 | 30 | 100 |
| Butadiene Rubber BR01 | 30 | 30 | 0 | 0 |
| Extender Oil (A-Oil) | 11.2 | 37.5 | 11.2 | 37.5 |
| Silica AQ | 0 | 70 | 0 | 0 |
| Carbon Black N339 | 0 | 0 | 0 | 70 |
| Silane Coupling Agent Si69 | 5.6 | 5.6 | 0 | 0 |
| Stearic Acid | 2.0 | 2.0 | 2.0 | 2.0 |
| Antioxidant 810NA | 1.0 | 1.0 | 1.0 | 1.0 |
| Zinc Oxide | 3.0 | 3.0 | 3.0 | 3.0 |
| Vulcanization Accelerator NS | 0 | 0 | 1.0 | 1.0 |
| Vulcanization Accelerator CZ | 1.5 | 1.5 | 0 | 0 |
| Vulcanization Accelerator D | 1.0 | 1.0 | 0.5 | 0.5 |
| Sulfur | 1.5 | 1.5 | 1.5 | 1.5 |

*1When a copolymer rubber previously oil-extended is used, the amount of the copolymer rubber is indicated as the amount of only a rubber portion obtained by removing extender oil components from the oil-extended copolymer rubber.

TABLE 29

| Compounding Formulation (phr) Composite | IX | X |
|---|---|---|
| Copolymer Rubber*1 | 100 | |
| Extender Oil (A-Oil) | 37.5 | |
| Lamellar Filler*2 | 50 | |
| Copolymer Rubber*1 | 0 | 100 |
| Extender Oil (A-Oil) | 0 | 37.5 |
| Lamellar Filler*2 | 0 | 50 |
| Stearic Acid | 2.0 | 2.0 |
| Antioxidant 810NA | 1.0 | 1.0 |
| Zinc Oxide | 3.0 | 3.0 |
| Vulcanization Accelerator NS | 1.0 | 1.0 |
| Vulcanization Accelerator D | 0.5 | 0.5 |
| Sulfur | 1.5 | 1.5 |

*1When a copolymer rubber previously oil-extended is used, the amount of the copolymer rubber is indicated as the amount of only a rubber portion obtained by removing extender oil components from the oil-extended copolymer rubber.
*2Manufactured by CO.OP Chemical Co., Ltd., trade name: "Lucentite SAN"

TABLE 30

|  | Example 61 | Example 62 | Comparative Example 41 |
|---|---|---|---|
| Compounding Formulation No. (Table 28) | VII | II | VII |
| Composite (Rubber) No. | A-1 | P-1 | B-1 |
| Kneading Processability | ⊚ | ○ | ⊚ |
| Tensile Strength (Index Number) | 117 | 110 | 100 |
| tan δ (0° C.) (Index Number) | 127 | 128 | 100 |
| tan δ (50° C.) (Index Number) | 128 | 118 | 100 |
| Wear Resistance (Index Number) | 112 | 107 | 100 |

TABLE 31

|  | Example 63 | Comparative Example 42 |
|---|---|---|
| Compounding Formulation No. (Table 28) | VIII | I |
| Composite (Rubber) No. | A-2 | B-2 |
| Kneading Processability | ⊚⊚ | ⊚ |
| Tensile Strength (Index Number) | 102 | 100 |
| tan δ (0° C.) (Index Number) | 128 | 100 |
| tan δ (50° C.) (Index Number) | 132 | 100 |
| Wear Resistance (Index Number) | 115 | 100 |

TABLE 32

|  | Example 64 | Example 65 | Comparative Example 43 |
|---|---|---|---|
| Compounding Formulation No. (Table 29) | IX | X | IX |
| Composite (Rubber) | A-3 | P-1 | B-3 |
| Kneading Processability | ⊚ | ○ | ⊚ |
| Tensile Strength (Index Number) | 180 | 93 | 100 |
| 1 Hz (25° C.); |  |  |  |
| tan δ (Index Number) | 121 | 92 | 100 |
| E' (MPa) | 9.3 | 8.3 | 7.8 |
| 10 Hz (25° C.); |  |  |  |
| tan δ (Index Number) | 158 | 106 | 100 |
| E' (MPa) | 14.5 | 12.9 | 13.2 |
| Dynamic-to-static modulus ratio (E'$_{100\,Hz}$/E'$_{1\,Hz}$) | 1.56 | 1.55 | 1.69 |

INDUSTRIAL APPLICABILITY

According to the present invention, it is possible to provide a conjugated diolefin (co)polymer rubber useful for a material for a tread of a tire for low fuel consumption, a large sized tire or a high performance tire, which is excellent in processability without depending on the kind and combination of filler incorporated, and excellent in a balance among wet-skid characteristics, low hysteresis loss properties, wear resistance and failure strength, when it is subjected to vulcanization treatment to form a vulcanized rubber; a process for producing the same; a rubber composition; and a tire.

Further, according to the present invention, it is further possible to provide a conjugated diolefin (co)polymer rubber improved in cold flow and excellent in a balance among various characteristics; a process for producing the same; etc.

Still further, according to the present invention, it is possible to provide a conjugated diolefin (co)polymer rubber in which the conjugated diolefin (co)polymer rubber having an alkoxysilyl group bound to a (co)polymer chain can be stably produced with respect to Mooney viscosity, and the subsequent variation in Mooney viscosity with the elapse of time can also be restrained.

Furthermore, in a rubber-inorganic compound composite of the present invention, (I) a conjugated diolefin (co) polymer rubber having both a primary amino group and an alkoxysilyl group is used. Accordingly, the composite is a composite in which (II) an inorganic compound is blended with this rubber component in large amounts and homogeneously. A rubber composition using this composite is excellent in processability, and excellent in low hysteresis loss properties, satisfactory in failure strength, and further having low dynamic-to-static modulus ratio and high tan δ, when it is subjected to vulcanization treatment to form a vulcanized rubber. The composition is therefore useful as a vibration-proof material, as well as a material for a tread of a tire for low fuel consumption, a large sized tire or a high performance tire.

The invention claimed is:

1. A conjugated diolefin (co)polymer rubber, which is represented by the following formula (1) or (2):

(1)

wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

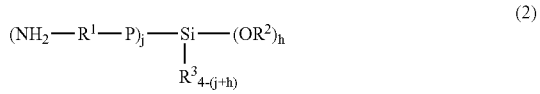

(2)

wherein P, $R^1$, $R^2$ and $R^3$ have the same definitions as given for the above-mentioned formula (1), j is an integer of 1 to 3, and h is an integer of 1 to 3, with the proviso that j+h is an integer of 2 to 4.

2. The conjugated diolefin (co)polymer rubber according to claim 1, wherein the content of the primary amino group is from 0.5 to 200 mmol/kg of (co)polymer rubber polymer, and the content of

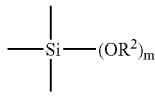

of formula (1) or

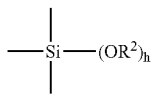

of formula (2) is from 0.5 to 200 mmol/kg of (co)polymer rubber polymer.

3. The conjugated diolefin (co)polymer rubber according to claim 1, wherein (1) the content of polymerization units of the aromatic vinyl compound is from 0% by weight to less than 5% by weight based on the (co)polymer rubber, the content of polymerization units of the conjugated diolefin is from more than 95% by weight to 100% by weight based on the (co)polymer rubber, and the content of polymerization units of a copolymerizable third monomer is from 0% by weight to less than 25% by weight based on the (co)polymer rubber, and (2) a vinyl bond content is 10 mol % or more based on the polymerization units of the conjugated diolefin.

4. The conjugated diolefin copolymer rubber according to claim 1, wherein (1) the content of polymerization units of the aromatic vinyl compound is from 5% by weight to less than 30% by weight based on the copolymer rubber, the content of polymerization units of the conjugated diolefin is from more than 70% by weight to 95% by weight based on the copolymer rubber, and the content of polymerization units of a copolymerizable third monomer is from 0% by weight to less than 25% by weight based on the copolymer rubber, and (2) a vinyl bond content is 50 mol % or more based on the polymerization units of the conjugated diolefin.

5. The conjugated diolefin copolymer rubber according to claim 1, wherein (1) the content of polymerization units of the aromatic vinyl compound is from 30 to 50% by weight based on the copolymer rubber, the content of polymerization units of the conjugated diolefin is from 50 to 70% by weight based on the copolymer rubber, and the content of polymerization units of a copolymerizable third monomer is from 0 to 20% by weight based on the copolymer rubber, and (2) a vinyl bond content is from 15 to 50 mol % based on the polymerization units of the conjugated diolefin.

6. The conjugated diolefin copolymer rubber according to claim 1, wherein (1) the content of polymerization units of the aromatic vinyl compound is from 5% by weight to 60% by weight based on the copolymer rubber, (2) a content of an aromatic vinyl compound single chain having one polymerization unit of the aromatic vinyl compound is less than 40% by weight based on the total bonded aromatic vinyl compound, and (3) a content of an aromatic vinyl compound long chain having 8 or more continuous aromatic vinyl compound units is 10% by weight or less based on the total bonded aromatic vinyl compound.

7. The conjugated diolefin (co)polymer rubber according to claim 1, which has a weight average molecular weight of 150,000 to 2,000,000.

8. The conjugated diolefin (co)polymer rubber according to claim 1, wherein a molecular weight distribution measured by GPC is polymodal.

9. The conjugated diolefin (co)polymer rubber according to claim 1, wherein a molecular weight distribution measured by GPC is monomodal, and a ratio (Mw/Mn) of a weight average molecular weight (Mw) to a number average molecular weight (Mn) is from 1.3 to 4.0.

10. The conjugated diolefin (co)polymer rubber according to claim 1, wherein a bifunctional or higher functional monomer is copolymerized in the (co)polymer chain, and/or at least part of the (co)polymer chains are coupled by use of a bifunctional or higher functional coupling agent.

11. The conjugated diolefin (co)polymer rubber according to claim 10, wherein a content of polymerization units of the bifunctional or higher functional monomer is from 0.001 to 5% by weight based on the (co)polymer rubber.

12. The conjugated diolefin (co)polymer rubber according to claim 10, wherein the bifunctional or higher functional coupling agent is a tin compound.

13. The conjugated diolefin (co)polymer rubber according to claim 1, comprising a compound residue derived from a compound having two or more alkoxyl groups on the same carbon atom.

14. A conjugated diolefin (co)polymer rubber obtained from either a conjugated diolefin or a conjugated diolefin and an aromatic vinyl compound, wherein the (co)polymer rubber contains an alkoxysilyl group bonded to a (co)polymer chain, and a compound residue derived from a compound having two or more alkoxyl groups on the same carbon atom.

15. A process for producing the conjugated (co)polymer rubber according to claim 1, which comprises polymerizing either a conjugated diolefin or a conjugated diolefin and an aromatic vinyl compound in a hydrocarbon solvent by anionic polymerization using at least one compound selected from the group consisting of an organic alkali metal and an organic alkali earth metal as an initiator, then reacting a polymerization active terminal thereof with at least one amino group-containing alkoxysilane compound represented by the following formula (3) or (4), and thereafter conducting hydrolysis:

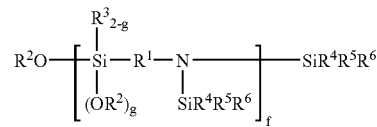

wherein $R^1$ is an alkylene group having 1 to 12 carbon atoms, $R^2$ and $R^3$ are each independently an alkyl group having 1 to 20 carbon atoms, an allyl group or an aryl group, $R^4$, $R^5$ and $R^6$ are each independently an alkyl group having 1 to 20 carbon atoms or aryl group, or two of them may combine with each other to form a ring together with silicon atoms to which they are bonded, g is an integer of 1 or 2, and f is an integer of 1 to 10,

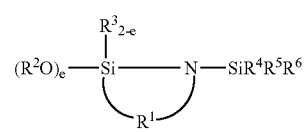

wherein $R^1$ is an alkylene group having 1 to 12 carbon atoms, $R^2$ and $R^3$ are each independently an alkyl group having 1 to 20 carbon atoms, an allyl group or an aryl group, $R^4$, $R^5$ and $R^6$ have the same definitions as given for the above-mentioned formula (3), and e is an integer of 1 or 2.

16. A process for producing the conjugated diolefin copolymer rubber according to claim 6, which comprises, in polymerizing a conjugated diolefin and an aromatic vinyl compound in a hydrocarbon solvent by anionic polymerization using at least one compound selected from the group consisting of an organic alkali metal and an organic alkali earth metal as an initiator, using (a) at least one potassium salt selected from the group consisting of a potassium alkoxide, a potassium phenoxide, a potassium salt of an organic carboxylic acid, a potassium salt of an organic sulfonic acid and a potassium salt of an organic phosphorous acid partial ester in an amount of 0.01 to 0.5 mole per gram atom of the organic alkali metal and/or the organic alkali earth metal and (b) at least one selected from the group consisting of an alcohol, a thioalcohol, an organic carboxylic acid, an organic sulfonic acid, an organic phosphorous acid, a primary amine and a secondary amine in an amount of 0.1 to 5 moles per mole of (a) the potassium salt and in an amount of 0.1 mole or less per gram atom of the organic alkali metal and/or the organic alkali earth metal, reacting a polymerization active terminal thus obtained with at least one amino group-containing alkoxysilane compound represented by the following formula (3) or (4):

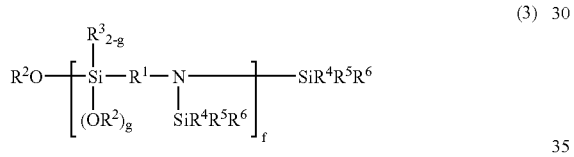

(3)

wherein $R^1$ is an alkylene group having 1 to 12 carbon atoms, $R^2$ and $R^3$ are each independently an alkyl group having 1 to 20 carbon atoms, an allyl group or an aryl group, $R^4$, $R^5$ and $R^6$ are each independently an alkyl group having 1 to 20 carbon atoms, or two of them may combine with each other to form a ring together with silicon atoms to which they are bonded, g is an integer of 1 or 2, and f is an integer of 1 to 10,

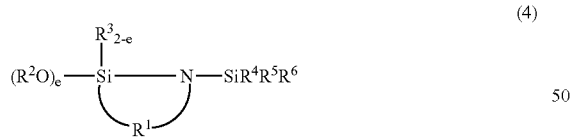

(4)

wherein $R^1$ is an alkylene group having 1 to 12 carbon atoms, $R^2$ and $R^3$ are each independently an alkyl group having 1 to 20 carbon atoms, an allyl group or an aryl group, $R^4$, $R^5$ and $R^6$ have the same definitions as given for the above-mentioned formula (3), and e is an integer of 1 or 2, and thereafter conducting hydrolysis.

17. A process for producing the conjugated diolefin copolymer rubber according to claim 13 comprising polymerizing either a conjugated diolefin or a conjugated diolefin and an aromatic vinyl compound in a hydrocarbon solvent by anionic polymerization using at least one compound selected from the group consisting of an organic alkali metal and an organic alkali earth metal as an initiator, and then reacting a polymerization active terminal thereof with an alkoxysilane-based compound to produce a conjugated diolefin (co)polymer rubber having an alkoxysilyl group bonded to a (co)polymer chain, wherein a compound having two or more alkoxyl groups on the same carbon atom, which is represented by the following formula (5) or (6), is added to conduct treatment:

(5)

wherein $R^1$ and $R^2$, which may be the same or different, and each of which may be the same or different when pluralities of $R^1$'s and $R^2$'s are present, are each an alkyl group having 1 to 20 carbon atoms, an aryl group, a vinyl group or an alkyl halide group, n is an integer of 0 to 2, m is an integer of 0 to 2, and k is an integer of 2 to 4, with the proviso that n+m+k is 4,

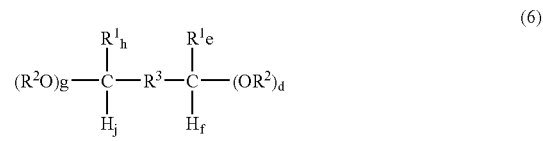

(6)

wherein $R^1$ and $R^2$ are defined as in formula (5), $R^3$ is an alkylene group having 1 to 12 carbon atoms, h is an integer of 0 or 1, j is an integer of 0 or 1, and g is an integer of 2 or 3, with the proviso that h+j+g is 3, f is an integer of 0 or 1, e is an integer of 0 or 1, and d is an integer of 2 or 3, with the proviso that f+e+d is 3.

18. The process for producing a conjugated diolefin (co)polymer rubber according to claim 17, wherein the alkoxysilane-based compound further comprises an amino group.

19. A process for producing the conjugated diolefin (co) polymer rubber according to claim 1, which comprises polymerizing either a conjugated diolefin or a conjugated diolefin and an aromatic vinyl compound in a hydrocarbon solvent by anionic polymerization using a lithium amide initiator represented by the following formula (7) or (8):

(7)

wherein $R^1$ is an alkylene group having 1 to 12 carbon atoms, and $R^4$, $R^5$ and $R^6$ are each independently an alkyl group having 1 to 20 carbon atoms or aryl group, or two of them may combine with each other to form a ring together with silicon atoms to which they are bonded,

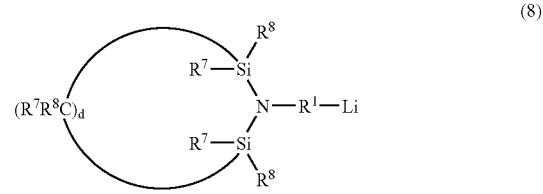

(8)

wherein $R^1$ is an alkylene group having 1 to 12 carbon atoms, $R_7$ and $R_8$ are each independently hydrogen, an alkyl group having 1 to 20 carbon atoms or an aryl group, and d is an integer of 1 to 7, then, reacting a polymerization active terminal thereof with a compound represented by the following formula (9):

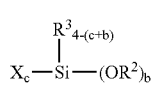 (9)

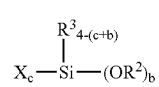 (9)

wherein $R_2$ and $R_3$ are each independently an alkyl group having 1 to 20 carbon atoms, an allyl group or an aryl group, X is a halogen atom, c is an integer of 0 to 2, and b is an integer of 1 to 4, with the proviso that c+b is an integer of 2 to 4, and thereafter conducting hydrolysis.

20. A process for producing the conjugated diolefin copolymer rubber according to claim 6, which comprises, in polymerizing a conjugated diolefin and an aromatic vinyl compound in a hydrocarbon solvent by anionic polymerization using the lithium amide initiator represented by the following formula (7) or (8):

$$(R^4R^5R^6Si)_2-N-R^1-Li \qquad (7)$$

wherein $R^1$ is an alkylene group having 1 to 12 carbon atoms, and $R^4$, $R^5$ and $R^6$ are each independently an alkyl group having 1 to 20 carbon atoms or aryl group, or two of them may combine with each other to form a ring together with silicon atoms to which they are bonded,

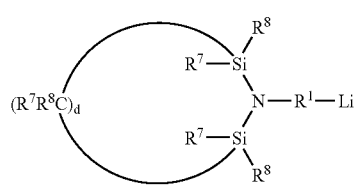 (8)

wherein $R^1$ is an alkylene group having 1 to 12 carbon atoms, $R_7$ and $R_8$ are each independently hydrogen, an alkyl group having 1 to 20 carbon atoms or an aryl group, and d is an integer of 1 to 7, using (a) at least one potassium salt selected from the group consisting of a potassium alkoxide, a potassium phenoxide, a potassium salt of an organic carboxylic acid, a potassium salt of an organic sulfonic acid and a potassium salt of an organic phosphorous acid partial ester in an amount of 0.01 to 0.5 mole per gram atom of an organic alkali metal and/or an organic alkali earth metal and (b) at least one selected from the group consisting of an alcohol, a thioalcohol, an organic carboxylic acid, an organic sulfonic acid, an organic phosphorous acid, a primary amine and a secondary amine in an amount of 0.1 to 5 moles per mole of (a) the potassium salt and in an amount of 0.1 mole or less per gram atom of the organic alkali metal and/or the organic alkali earth metal, reacting a polymerization active terminal thus obtained with an alkoxysilane compound represented by the following formula (9):

wherein $R_2$ and $R_3$ are each independently an alkyl group having 1 to 20 carbon atoms, an allyl group or an aryl group, X is a halogen atom, c is an integer of 0 to 2, and b is an integer of 1 to 4, with the proviso that c+b is an integer of 2 to 4, and thereafter conducting hydrolysis.

21. An oil-extended (co)polymer rubber containing an extender oil in an amount of 10 to 100 parts by weight based on 100 parts by weight of the conjugated diolefin (co)polymer rubber according to claim 1.

22. The oil-extended (co)polymer rubber according to claim 21, wherein a viscosity gravity constant (V. G. C) of the extender oil is from 0.790 to 1.100.

23. A rubber composition containing a filler in an amount of 20 to 120 parts by weight based on 100 parts by weight of all rubber components comprising the conjugated diolefin (co)polymer rubber according to claim 1 in an amount of 30% by weight or more based on all rubber components.

24. The rubber composition according to claim 23, wherein at least 1 part by weight of the filler is silica, and the rubber composition further comprises a silane coupling agent in an amount of 0.5 to 20% by weight based on the silica.

25. A rubber-inorganic compound composite comprising (I) the conjugated diolefin (co)polymer rubber according to claim 1 and (II) an inorganic compound.

26. The rubber-inorganic compound composite according to claim 25, wherein inorganic compound (II) is blended in an amount of 1 to 1,000 parts by weight based on 100 parts by weight of component (I).

27. The rubber-inorganic compound composite according to claim 25, wherein inorganic compound (II) is at least one selected from the group consisting of silica, carbon black and a compound represented by the following formula (10):

$$vM^1 \cdot wM^2 \cdot xSiO_y \cdot zH_2O \cdot nA \qquad (10)$$

wherein $M^1$ represents Na or K, $M^2$ is at least one metal selected from Mg, Fe, Al, Ti, Mn and Ca, a metal oxide or a metal hydroxide, A represents F or Cl, v is a number of 0 to 1, w is a number of 1 to 5, x is a number of 0 to 10, z is a number of 2 to 5, 0 to 10 and n is a number of 0 to 2.

28. A tire comprising at least one selected from the group consisting of a tread member comprising the copolymer rubber according to claim 23 and a sidewall member comprising the copolymer rubber according to claim 23.

29. A tire comprising at least one selected from the group consisting of a tread member comprising the copolymer rubber according to claim 24 and a sidewall member comprising the copolymer rubber according to claim 24.

* * * * *